United States Patent
Zhu et al.

(10) Patent No.: US 11,909,906 B2
(45) Date of Patent: *Feb. 20, 2024

(54) METHOD AND APPARATUS FOR PUSHING NOTIFICATION, MOBILE TERMINAL, AND GRAPHICAL USER INTERFACE

(71) Applicant: HONOR DEVICE CO., LTD., Shenzhen (CN)

(72) Inventors: Guo Zhu, Nanjing (CN); Dawei Li, Shenzhen (CN); Ning Ding, Nanjing (CN); Yongning Wang, Nanjing (CN); Bo Ye, Shenzhen (CN); Xueyan Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,481

(22) Filed: Feb. 23, 2021

(65) Prior Publication Data

US 2021/0227069 A1 Jul. 22, 2021

Related U.S. Application Data

(63) Continuation of application No. 16/331,961, filed as application No. PCT/CN2016/098627 on Sep. 9, 2016, now Pat. No. 10,979,551.

(51) Int. Cl.
*H04M 1/72484* (2021.01)
*H04M 1/725* (2021.01)
(Continued)

(52) U.S. Cl.
CPC ........ *H04M 1/72484* (2021.01); *G06Q 10/10* (2013.01); *H04M 1/725* (2013.01); *H04W 68/005* (2013.01)

(58) Field of Classification Search
CPC ............ H04M 1/72484; H04M 1/725; H04M 1/72436; H04M 1/72469;
(Continued)

(56) References Cited

U.S. PATENT DOCUMENTS 7,356,490 B1  4/2008  Jacobi et al.
9,104,299 B2  8/2015  Li et al.
(Continued)

FOREIGN PATENT DOCUMENTS

CN  101237335 A  8/2008
CN  102833056 A  12/2012
(Continued)

OTHER PUBLICATIONS

Zhang Zhiliang, "Let the lock screen display more information", CP CFAN, dated 2016, total 4 pages.
(Continued)

*Primary Examiner* — Nimesh Patel
(74) *Attorney, Agent, or Firm* — WOMBLE BOND DICKINSON (US) LLP

(57) ABSTRACT

According to a method for pushing a notification provided in some embodiments of the present disclosure, a to-be-notified event is obtained; a first notification condition and a second notification condition are determined; a first notification page is displayed on the display when the first notification condition is met, to display, to a user, first association information when the first notification condition is met, for example, event status information, to-be-executed behavior information, and operation association information; and a second notification page is displayed on the display when the second notification condition is met after the first notification page is displayed, to display, to the user, second association information when the second notification condition is met. A plurality of notification pages are pushed (Continued)

for a to-be-notified event, and each notification page is pushed when a notification condition is met as the event develops.

20 Claims, 58 Drawing Sheets

(51) Int. Cl.
*G06Q 10/10* (2023.01)
*H04W 68/00* (2009.01)

(58) Field of Classification Search
CPC ....... H04M 1/724634; H04M 2201/34; H04M 2201/36; H04M 2201/38; H04M 1/72451; H04M 1/72552; H04M 1/72572; H04M 1/72536; H04M 2242/04; H04M 2242/30; H04M 2250/22; H04M 3/567; H04M 1/72538; H04M 1/0268; H04M 1/7253; H04M 1/72569; H04M 2207/18; H04M 2250/02; H04M 2250/10; G06Q 10/10; G06Q 10/1093; G06Q 10/02; G06Q 30/0267; G06Q 20/3825; G06Q 30/0261; G06Q 50/12; G06Q 50/265; G06Q 50/01; G06Q 10/0833; H04W 68/005; H04W 4/029; H04W 4/90; H04W 4/021; H04W 12/08; H04W 4/80; H04W 12/0027; H04W 4/023; H04W 12/00503; H04W 12/1206; H04W 4/025; H04W 4/04; H04W 4/026; H04W 4/60; H04W 64/00; H04W 84/042; H04W 48/10; H04W 4/16; H04W 4/21; H04W 76/50; H04W 88/16; H04W 8/26; H04L 67/26; H04L 67/42; H04L 63/08; H04L 63/102; H04L 63/20; H04L 67/303; H04L 67/18; H04L 67/306; H04L 67/02; H04L 67/22; H04L 51/24; H04L 12/1859; H04L 12/1895; H04L 51/26; H04L 51/32; H04L 63/105; H04L 67/12; G06F 3/04842; G06F 3/0488; G06F 3/0481; G06F 3/04817; G06F 21/88; G06F 16/29; G06F 2221/2111; G06F 9/542

See application file for complete search history.

(56) References Cited

U.S. PATENT DOCUMENTS

| | | | |
|---|---|---|---|
| 9,842,364 B2 | 12/2017 | Hu | |
| 9,854,010 B2 | 12/2017 | Raghavan et al. | |
| 10,979,551 B2 * | 4/2021 | Zhu .................. | H04M 1/72484 |
| 11,321,660 B2 | 5/2022 | Imaeda et al. | |
| 2009/0029681 A1 | 1/2009 | Clemow et al. | |
| 2009/0156173 A1 | 6/2009 | Wang | |
| 2009/0253454 A1 | 10/2009 | Sampson | |
| 2011/0173638 A1 | 7/2011 | Nakamae | |
| 2012/0030133 A1 | 2/2012 | Rademaker | |
| 2014/0038561 A1 | 2/2014 | Wang et al. | |
| 2016/0142505 A1 | 5/2016 | Kim et al. | |
| 2016/0174035 A1 | 6/2016 | Hughes et al. | |
| 2016/0246492 A1 | 8/2016 | Baldassari et al. | |
| 2016/0249319 A1 | 8/2016 | Dotan-Cohen et al. | |
| 2017/0272564 A1 | 9/2017 | Duarte et al. | |
| 2017/0344253 A1 | 11/2017 | Zhang | |

FOREIGN PATENT DOCUMENTS

| | | |
|---|---|---|
| CN | 102883056 A | 1/2013 |
| CN | 104238914 A | 12/2014 |
| CN | 104253741 A | 12/2014 |
| CN | 104322040 A | 1/2015 |
| CN | 104376075 A | 2/2015 |
| CN | 104461510 A | 3/2015 |
| CN | 104486430 A | 4/2015 |
| CN | 104700256 A | 6/2015 |
| CN | 104714771 A | 6/2015 |
| CN | 104735548 A | 6/2015 |
| CN | 104954560 A | 9/2015 |
| CN | 104954580 A | 9/2015 |
| CN | 105117095 A | 12/2015 |
| CN | 105187624 A | 12/2015 |
| CN | 105321061 A | 2/2016 |
| CN | 105333880 A | 2/2016 |
| CN | 105359128 A | 2/2016 |
| CN | 105554253 A | 5/2016 |
| CN | 105681554 A | 6/2016 |
| CN | 105809383 A | 7/2016 |
| CN | 105915727 A | 8/2016 |
| CN | 103856896 B | 7/2017 |
| JP | 2003002440 A | 1/2003 |
| JP | 2003196361 A | 7/2003 |
| JP | 2009265847 A | 11/2009 |
| JP | 2011141840 A | 7/2011 |
| JP | 2015069367 A | 4/2015 |
| JP | 2015528602 A | 9/2015 |
| JP | 2015212186 A | 11/2015 |
| JP | 2017501471 A | 1/2017 |
| KR | 101223255 B1 | 1/2013 |
| KR | 20140074154 A | 6/2014 |
| KR | 20150055903 A | 5/2015 |
| KR | 20150133989 A | 12/2015 |
| KR | 20160104957 A | 9/2016 |
| WO | 2014019466 A1 | 2/2014 |
| WO | 2015073338 A | 5/2015 |
| WO | 2015092860 A1 | 6/2015 |
| WO | 2015169259 A1 | 11/2015 |
| WO | 2016188267 A1 | 12/2016 |
| WO | 2017193496 A1 | 11/2017 |

OTHER PUBLICATIONS

Zhang Zhiliang, "lock screen interface is not monotonous", China academic journal electronic publishing house, dated 2016, total 5 pages.

* cited by examiner 01-1-1 [Arrived within the destination range]

01-1-2 [Arrived within the destination range]

METHOD AND APPARATUS FOR PUSHING NOTIFICATION, MOBILE TERMINAL, AND GRAPHICAL USER INTERFACE

CROSS-REFERENCE TO RELATED APPLICATION

This application is a continuation of U.S. patent application Ser. No. 16/331,961, filed on Mar. 8, 2019, which is a National Stage filing of International Application No. PCT/CN2016/098627, filed on Sep. 9, 2016. Both of the aforementioned applications are hereby incorporated by reference in their entireties.

TECHNICAL FIELD

The present disclosure relates to the computer field, and in particular, to a method, an apparatus, a mobile terminal, and a graphical user interface for pushing a notification.

BACKGROUND

A mobile phone information notification is a basic function of a current smartphone, and is used to remind a user that there is a new instant message or a new event. For example, when a user successfully reserves a hotel room or a movie ticket, a mobile phone receives reservation success notification information that is sent by a corresponding hotel or movie service provider and that is provided to the user; or when a user submits a taxi request and the request is accepted, a mobile phone receives vehicle information that is sent by a corresponding vehicle service provider and that is provided to the user.

In the prior art, mobile phone information notifications are all based on a service application. When an event occurs in the service application, a notification pops up on the top of a mobile phone screen, or a notification is displayed in a strip form in the middle of a lock screen, or a notification is displayed on a notification bar. The notification is retained if a user has not tapped the notification. All these notifications are used by the service application to simply notify the user of what happened, and the notification ends after the user taps or pulls down the notification to enter the application or perform simple interaction, for example, make an SMS reply.

During actual use of the user, when the user needs to view content in these notifications, the user needs to manually search a corresponding mobile phone application or SMS message list for details. For example, a user reserves a flight ticket one week in advance, and receives information such as a flight number and a departure time during the reservation. When the user wants to search for the information on the day of departure, the user needs to search a large quantity of notification SMS messages or a corresponding mobile phone application for the information. Consequently, operations are complex, and it is relatively difficult to obtain the information. Therefore, in the prior art, a notification can be pushed based on only simple content of a service application, and the notification cannot be pushed based on a service status change, in other words, a push manner is undiversified.

SUMMARY

A method for pushing a notification on a terminal device with a screen provided in some embodiments is intended to resolve a prior-art problem that a notification push manner is lack of variety ways.

According to a first aspect of the present disclosure, a method for pushing a notification on a terminal device with a screen is provided. The method includes: obtaining a to-be-notified event; determining a first notification condition and a second notification condition based on the to-be-notified event, where the to-be-notified event is an event for which a notification needs to be sent to a user, and the first notification condition and the second notification condition each include at least any one of the following: a time condition, a place condition, a user behavior condition, and an environment condition; displaying a first notification page when the first notification condition is met, where the first notification page is used to display first association information of the to-be-notified event, and the first association information includes one or more of event status information, to-be-executed behavior information, and operation association information of the to-be-notified event when the first notification condition is met; and displaying a second notification page when the second notification condition is met after the first notification page is displayed, where the second notification page is used to display second association information of the to-be-notified event, and the second association information includes one or more of event status information, to-be-executed behavior information, and operation association information of the to-be-notified event when the second notification condition is met.

In the prior art, a notification can be pushed based on only simple content of a service application. In comparison, in the push notification method in some embodiments, a plurality of notification conditions are determined based on a to-be-notified event, a corresponding notification page is pushed when a notification condition is met as the event develops, and content of the notification page includes various types of association information when the notification condition is met. Therefore, notification content corresponding to different event development stages of a to-be-notified event can be pushed to the user at the stages in a timely manner. In this way, notification manners are more diversified and effective.

According to some embodiments, the step of obtaining a to-be-notified event includes: obtaining a push message and/or a user operation record; and analyzing whether content of the push message and/or the user operation record is related to a to-be-notified event, and if yes, determining the to-be-notified event.

According to some embodiments, the mobile terminal may separately obtain the push message or the user operation record, or may concurrently obtain the push message and the user operation record.

According to some embodiments, the mobile terminal may monitor, in real time in background, whether a new push message is received, or monitor a user operation record in real time within the scope of permission, and when a to-be-notified event is determined in a push message or a user operation record, trigger a subsequent step to be performed in a timely manner to implement real-time message pushing.

According to some embodiments, in the method, the push message and/or the user operation record are or is obtained, and event information of the to-be-notified event is collected. This does not totally rely on a third-party application, and the collected information is richer and more comprehensive, so that subsequent context analysis can be made more accurately for the to-be-notified event.

According to some embodiments, the step of determining a first notification condition and a second notification condition based on the to-be-notified event includes: determining an event type of the to-be-notified event; determining a first notification node and a second notification node of the to-be-notified event based on the event type; collecting event information of the to-be-notified event based on the event type; determining a node parameter of the first notification node in the event information, to determine the first notification condition corresponding to the first notification node; and determining a node parameter of the second notification node in the event information, to determine the second notification condition corresponding to the second notification node.

According to some embodiments, the step of displaying a first notification page when the first notification condition is met includes: monitoring a corresponding first condition parameter based on the first notification condition, where the first condition parameter includes at least any one of the following: a current time, a current place, current user behavior information, and current environment information; and displaying the first notification page when the first condition parameter meets the first notification condition.

According to some embodiments, the step of displaying a first notification page when the first notification condition is met includes: displaying a notification SMS message about the first notification page when the first notification condition is met; and displaying the first notification page through jumping in response to a case in which an operation input for the notification SMS message is detected.

According to some embodiments, the step of displaying a second notification page when the second notification condition is met after the first notification page is displayed includes: updating and displaying the second notification page based on the first notification page when the second notification condition is met after the first notification page is displayed.

According to some embodiments, the step of displaying a second notification page when the second notification condition is met after the first notification page is displayed further includes: deleting the first notification page after the second notification page is updated and displayed based on the first notification page.

According to some embodiments, the method further includes: obtaining an update event of the to-be-notified event; updating the first notification condition and/or the second notification condition based on the update event; and updating the corresponding currently displayed first notification page and/or the corresponding currently displayed second notification page based on the updated first notification condition and/or the updated second notification condition.

According to some embodiments, the step of displaying a first notification page on the display includes: displaying a notification interface on the display, where the first notification page exists in the notification interface in a form of a subpage; displaying, in the notification interface, a notification classification identifier corresponding to the first notification page; and in response to a case in which an operation input for the notification classification identifier is detected, displaying, in the notification interface, the first notification page corresponding to the notification classification identifier, and hiding another subpage of the notification interface.

Likewise, the step of displaying a second notification page on the display includes: displaying a notification interface on the display, where the second notification page exists in the notification interface in a form of a subpage; displaying, in the notification interface, a notification classification identifier corresponding to the second notification page; and in response to a case in which an operation input for the notification classification identifier is detected, displaying, in the notification interface, the second notification page corresponding to the notification classification identifier, and hiding another subpage of the notification interface.

According to some embodiments, the notification classification identifier is a notification list or a classification icon.

According to some embodiments, the notification interface is a lock screen.

According to some embodiments, the method further includes: determining a notification cleaning condition based on the to-be-notified event, where the notification cleaning condition includes at least any one of the following: a cleaning time condition, a cleaning place condition, and a cleaning user behavior condition; and deleting the currently displayed first notification page or the currently displayed second notification page of the to-be-notified event when the notification cleaning condition is met.

Compared with a notification manner in the prior art, in the method provided in some embodiments of the present disclosure, each notification condition of a to-be-notified event is determined; event information of the to-be-notified event is collected; it is determined, based on context analysis on the event information, whether to trigger a notification to be pushed to a user; and association information of event details related to the event information is updated to a notification interface in full screen in a form of an event display page when it is determined that a notification needs to be pushed. Specifically, an existing event display page is updated or a new notification page is created depends on whether the notification interface includes a corresponding notification page. In this way, when the event changes, the user can obtain a notification in a timely manner, and conveniently obtain notification details of the event from a corresponding notification page in the notification interface based on a user requirement, without further searching an SMS message or an application.

According to a second aspect of the present disclosure, an apparatus for pushing a notification on a mobile terminal is provided. The apparatus includes: an obtaining module, configured to obtain a to-be-notified event, where the to-be-notified event is an event for which a notification needs to be pushed to a user; a determining module, configured to determine a first notification condition and a second notification condition based on the to-be-notified event, where the to-be-notified event is an event for which a notification needs to be sent to the user, and the first notification condition and the second notification condition each include at least any one of the following: a time condition, a place condition, a user behavior condition, and an environment condition; a first display module, configured to display a first notification page when the first notification condition is met, where the first notification page is used to display first association information of the to-be-notified event, and the first association information includes one or more of event status information, to-be-executed behavior information, and operation association information of the to-be-notified event when the first notification condition is met; and a second display module, configured to display a second notification page when the second notification condition is met after the first notification page is displayed, where the second notification page is used to display second association information of the to-be-notified event, and the second association information includes one or more of event status information, to-be-executed behavior information, and operation association information of the to-be-notified event when the second notification condition is met.

According to some embodiments, the obtaining module includes: an obtaining submodule, configured to obtain a push message and/or a user operation record; and an analysis submodule, configured to: analyze whether content of the push message and/or the user operation record is related to a to-be-notified event, and if yes, determine the to-be-notified event.

According to some embodiments, the determining module includes: a type determining submodule, configured to determine an event type of the to-be-notified event; a node determining submodule, configured to determine a first notification node and a second notification node of the to-be-notified event based on the event type; an information determining submodule, configured to collect event information of the to-be-notified event based on the event type; a parameter determining submodule, configured to determine a node parameter of the first notification node in the event information, to determine the first notification condition corresponding to the first notification node; and a condition determining submodule, configured to determine a node parameter of the second notification node in the event information, to determine the second notification condition corresponding to the second notification node.

According to some embodiments, the first display module includes: a first monitoring submodule, configured to monitor a corresponding first condition parameter based on the first notification condition, where the first condition parameter includes at least any one of the following: a current time, a current place, current user behavior information, and current environment information; and a first display submodule, configured to display the first notification page when the first condition parameter meets the first notification condition.

According to some embodiments, the first display module includes: a second display submodule, configured to display a notification SMS message about the first notification page when the first notification condition is met; and a third display submodule, configured to display the first notification page through jumping in response to a case in which an operation input for the notification SMS message is detected.

According to some embodiments, the second display module includes an update submodule, configured to update and display the second notification page based on the first notification page when the second notification condition is met after the first notification page is displayed.

According to some embodiments, the second display module further includes a deletion submodule, configured to delete the first notification page after the second notification page is updated and displayed based on the first notification page.

According to some embodiments, the apparatus further includes: an event update module, configured to obtain an update event of the to-be-notified event; a condition update module, configured to update the first notification condition and/or the second notification condition based on the update event; and a page update module, configured to update the corresponding currently displayed first notification page and/or the corresponding currently displayed second notification page based on the updated first notification condition and/or the updated second notification condition.

According to some embodiments, the first display module includes: a first interface display submodule, configured to display a notification interface on the display, where the first notification page exists in the notification interface in a form of a subpage; a first identifier display submodule, configured to display, in the notification interface, a notification classification identifier corresponding to the first notification page; and a first page display submodule, configured to: in response to a case in which an operation input for the notification classification identifier is detected, display, in the notification interface, the first notification page corresponding to the notification classification identifier, and hide another subpage of the notification interface.

According to some embodiments, the second display module includes a second interface display submodule, a second identifier display submodule, and a second page display submodule. The second interface display submodule displays a notification interface on the display, where the second notification page exists in the notification interface in a form of a subpage. The second identifier display submodule displays, in the notification interface, a notification classification identifier corresponding to the second notification page. In response to a case in which an operation input for the notification classification identifier is detected, the second page display submodule displays, in the notification interface, the second notification page corresponding to the notification classification identifier, and hides another subpage of the notification interface.

According to some embodiments, the notification classification identifier is a notification list or a classification icon.

According to some embodiments, the notification interface is a lock screen.

According to some embodiments, the apparatus further includes: a first cleaning module, configured to determine a notification cleaning condition based on the to-be-notified event, where the notification cleaning condition includes at least any one of the following: a cleaning time condition, a cleaning place condition, and a cleaning user behavior condition; and a second cleaning module, configured to delete the currently displayed first notification page or the currently displayed second notification page of the to-be-notified event when the notification cleaning condition is met.

In some embodiments, the display includes a touch-sensitive surface and a screen.

According to a third aspect, a mobile terminal provided in some embodiments of the present disclosure includes: a display, where the display includes a touch-sensitive surface and a screen; one or more processors; a memory; a plurality of application programs; and one or more programs, where the one or more programs are stored in the memory and configured to be executed by the one or more processors, the one or more programs include an instruction, and the instruction is used to obtain a to-be-notified event, where the to-be-notified event is an event for which a notification needs to be pushed to a user.

In some specific implementations, the terminal can perform a procedure based on the method provided in the embodiments of the present disclosure in the first aspect.

According to a fourth aspect, some embodiments of the present disclosure provide a graphical user interface on a mobile terminal with a display apparatus. The graphical user interface includes a notification interface displayed on the display apparatus, where a first notification page is displayed in the notification interface in response to a case in which a first notification condition of a to-be-notified event is met, where the first notification page is used to display first association information of the to-be-notified event, the to-be-notified event is an event for which a notification needs to be sent to a user, and the first association information includes one or more of event status information, to-be-executed behavior information, and operation association information of the to-be-notified event when the first notification condition is met; and after the first notification page is displayed, a second notification page is displayed in the notification interface in response to a case in which a second notification condition of the to-be-notified event is met, where the second notification page is used to display second association information of the to-be-notified event, the second association information includes one or more of event status information, to-be-executed behavior information, and operation association information of the to-be-notified event when the second notification condition is met, and the first notification condition and the second notification condition each include at least any one of the following: a time condition, a place condition, a user behavior condition, and an environment condition.

According to some embodiments, in a process of displaying the first notification page in the notification interface in response to the case in which the first notification condition of the to-be-notified event is met, the user interface includes: a notification SMS message about the first notification page is displayed in response to the case in which the first notification condition of the to-be-notified event is met; and the first notification page is displayed through jumping in the notification interface in response to a case in which an operation input for the notification SMS message is detected.

According to some embodiments, the notification interface includes the first notification page and/or the second notification page, the notification interface further includes a notification classification identifier, and the first notification page or the second notification page corresponding to an operation input of the user for the notification classification identifier is displayed through jumping in response to the operation input.

According to some embodiments, the notification classification identifier is a notification list or a classification icon.

According to some embodiments, the notification interface is a lock screen.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some but not all the embodiments of the present disclosure. Persons of ordinary skill in the art may derive other drawings from these accompanying drawings without creative efforts.

DESCRIPTION OF EMBODIMENTS

The following further describes the technical solutions in the embodiments of the present disclosure with reference to the accompanying drawings in the embodiments of the present disclosure.

Herein, a method and an apparatus for pushing a notification in the present disclosure may be applied to any mobile terminal with a display apparatus and a plurality of application programs. The apparatus may be hardware, software, or a combination of hardware and software with a processing capability installed on the mobile terminal. The mobile terminal may be a mobile phone, a tablet computer (Tablet Personal Computer), a laptop computer (Laptop Computer), a digital camera, a digital video camera, a projection device, a personal digital assistant (personal digital assistant, PDA for short), an e-book reader (English: e-book reader), a wearable device (Wearable Device), a virtual reality intelligent device, or the like. The mobile terminal may establish communication with a network by using 2G 3G, 4G or a WLAN (wireless local area network). For conciseness, this is not further limited in the embodiments of the present disclosure. For ease of description, a mobile terminal is used as an example for description in the following embodiments.

Herein, the notification may also be referred to as a reminder, a message, a reminder message, reminder information, or the like. When receiving external new information or internally triggering a new event (for example, an alarm or a system reminder), the mobile terminal usually displays content of a related notification on a screen in a timely manner, or may push content of a notification to a user in a timely manner by using a voice reminder or a vibration reminder, or in another manner.

Figure 1:
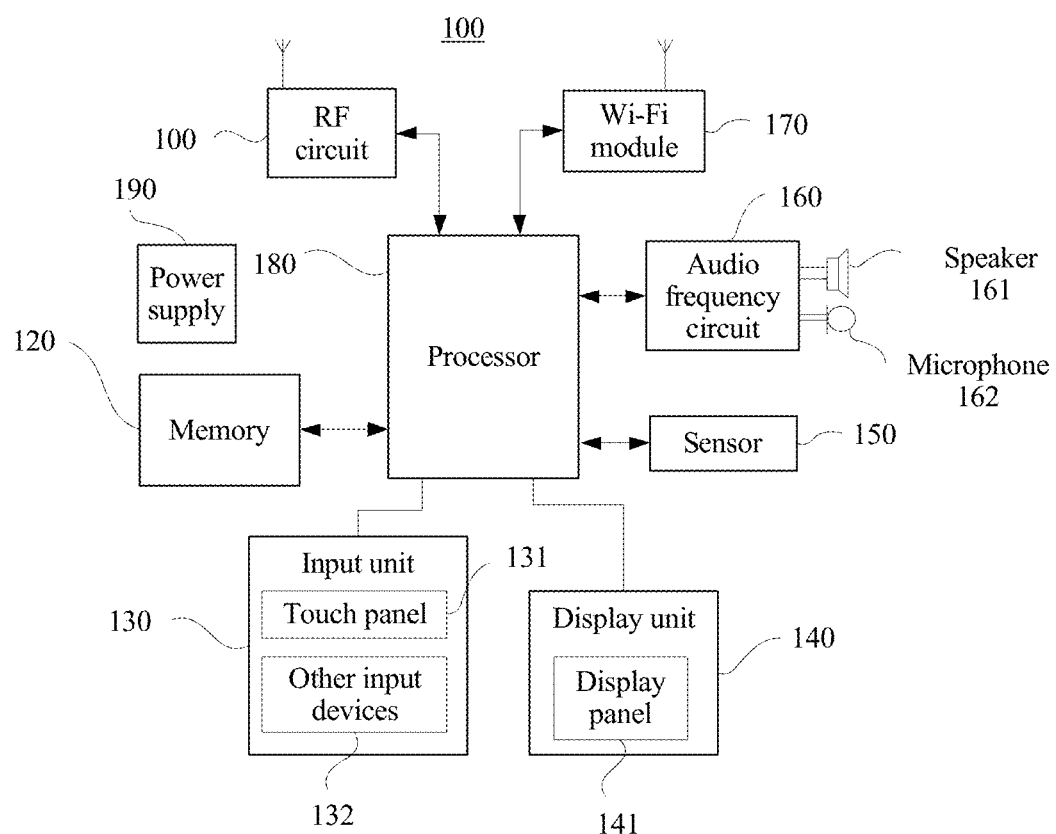
FIG. 1 is a schematic structural diagram of a terminal for pushing a notification according to some embodiments.

An embodiment of the present disclosure provides a mobile terminal, and the mobile terminal may be configured to perform the method described in the foregoing embodiment of the present disclosure. FIG. 1 shows a structure of a mobile terminal 100 according to some embodiments of the present disclosure.

The mobile terminal may be a terminal device such as a mobile phone, a tablet computer, a PDA (Personal Digital Assistant, personal digital assistant), a POS (Point of Sale, point of sale), or an in-vehicle computer. For example, the mobile terminal is a mobile phone. FIG. 1 is a block diagram of a partial structure of a mobile phone 100 related to the mobile terminal provided in the embodiments of the present disclosure. Referring to FIG. 1, the mobile phone 100 includes components such as an RF (Radio Frequency, radio frequency) circuit 110, a memory 120, an input unit 130, a display unit 140, a sensor 150, an audio frequency circuit 160, a Wi-Fi (wireless fidelity, Wireless Fidelity) module 170, a processor 180, and a power supply 190. Persons skilled in the art may understand that the mobile phone structure shown in FIG. 1 is merely an example of an implementation, and does not constitute a limitation on the mobile phone. The mobile phone may include more or fewer components than those shown in the figure, or a combination of some components, or differently disposed components.

Each constituent component of the mobile phone 100 is described in detail below with reference to FIG. 1.

The RF circuit 110 may be configured to receive and send information, or receive and send a signal in a call process; particularly, after receiving downlink information of a base station, send the downlink information to the processor 180 for processing; and in addition, send related uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may further communicate with a network and another device through wireless communication. Any communication standard or protocol may be used for the wireless communication, and the communication standard or protocol includes but is not limited to GSM (Global System for Mobile Communications, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Message Service, short message service), and the like.

The memory 120 may be configured to store a software program and a module. The processor 180 executes various functional applications and data processing of the mobile phone 100 by running the software program and the module that are stored in the memory 120. The memory 120 may mainly include a program storage area and a data storage area. The program storage area may store an operating system, an application program required by at least one function (such as a voice play function or an image play function), and the like. The data storage area may store data (such as audio data or an address book) that is created based on use of the mobile phone 100, and the like. In addition, the memory 120 may include a high-speed random access memory, and may further include a nonvolatile memory, for example, at least one magnetic disk storage device, a flash storage device, or another volatile solid-state storage device.

The input unit 130 may be configured to: receive entered digit or character information, and generate a key signal input related to a user setting and function control of the mobile phone 100. Specifically, the input unit 130 may include a touch panel 131 and other input devices 132. The touch panel 131, also referred to as a touchscreen, may collect a touch operation (for example, an operation performed by a user on or near the touch panel 131 by using any proper object or accessory such as a finger or a stylus) of the user on or near the touch panel 131, and drive a corresponding connection apparatus based on a preset program. Optionally, the touch panel 131 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 180, and can receive and execute a command sent by the processor 180. In addition, the touch panel 131 may be implemented by using a plurality of types such as a resistive type, a capacitive type, an infrared ray, and a surface acoustic wave. In addition to the touch panel 131, the input unit 130 may include the other input devices 132. Specifically, the other input devices 132 may include but are not limited to one or more of a physical keyboard, a function key (such as a volume control key or an on/off key), a trackball, a mouse, a joystick, and the like.

The display unit 140 may be configured to display information entered by the user or information provided to the user and various menus of the mobile phone 100. The display unit 140 may include a display panel 141. Optionally, the display panel 141 may be configured by using an LCD (Liquid Crystal Display, liquid crystal display), an OLED (Organic Light-Emitting Diode, organic light-emitting diode), or the like. Further, the touch panel 131 may cover the display panel 141. After detecting the touch operation on or near the touch panel 131, the touch panel 131 transmits the touch operation to the processor 180 to determine a type of a touch event, and then the processor 180 provides a corresponding visual output on the display panel 141 based on the type of the touch event. Although the touch panel 131 and the display panel 141 in FIG. 1 are used as two independent components to implement input and input functions of the mobile phone 100, in some embodiments, the touch panel 131 and the display panel 141 may be integrated to implement the input and output functions of the mobile phone 100.

The mobile phone 100 may further include at least one sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 100 approaches an ear. As a type of motion sensor, an accelerometer sensor may detect a value of acceleration in each direction (usually on three axes), may detect a value and a direction of gravity in a static state, and may be used in an application for recognizing a mobile phone posture (such as screen switching between a landscape mode and a portrait mode, a related game, or magnetometer posture calibration), a function related to vibration recognition (such as a pedometer or a knock), or the like. Another sensor such as a gyroscope, a barometer, a hygrometer, a thermometer, or an infrared sensor may be further configured in the mobile phone 100. Details are not described herein.

The audio frequency circuit 160, a speaker 161, and a microphone 162 may provide an audio interface between the user and the mobile phone 100. The audio frequency circuit 160 may convert received audio data into an electrical signal, and transmit the electrical signal to the speaker 161, and the speaker 161 converts the electrical signal into a sound signal for output. In addition, the microphone 162 converts a collected sound signal into an electrical signal. The audio frequency circuit 160 receives the electrical signal, converts the electrical signal into audio data, and then outputs the audio data to the processor 180 for processing. The processor 180 sends the audio data to, for example, another mobile phone by using the RF circuit 110, or outputs the audio data to the memory 120 for further processing.

Wi-Fi is a short-range wireless transmission technology. By using the Wi-Fi module 170, the mobile phone 100 may help the user receive and send an email, browse a web page, access streaming media, and so on. The Wi-Fi module 170 provides wireless broadband Internet access to the user. Although FIG. 1 shows the Wi-Fi module 170, it may be understood that the Wi-Fi module 170 is not a mandatory part of the mobile phone 100, and can be omitted based on a requirement without changing the essence of the present disclosure.

The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, to perform overall monitoring on the mobile phone. Optionally, the processor 180 may include one or more processing units. Preferably, an application processor and a modem processor may be integrated into the processor 180. The application processor mainly processes an operating system, a user interface, an application program, and the like, and the modem processor mainly processes wireless communication. It may be understood that alternatively, the modem processor may not be integrated into the processor 180.

The mobile phone 100 further includes the power supply 190 (such as a battery) that supplies power to each component. Preferably, the power supply may be logically connected to the processor 180 by using a power supply management system, thereby implementing functions such as charging management, discharging management, and power consumption management by using the power supply management system.

The mobile phone 100 may further include a camera, a Bluetooth module, and the like although they are not shown. Details are not described herein.

Figure 2:
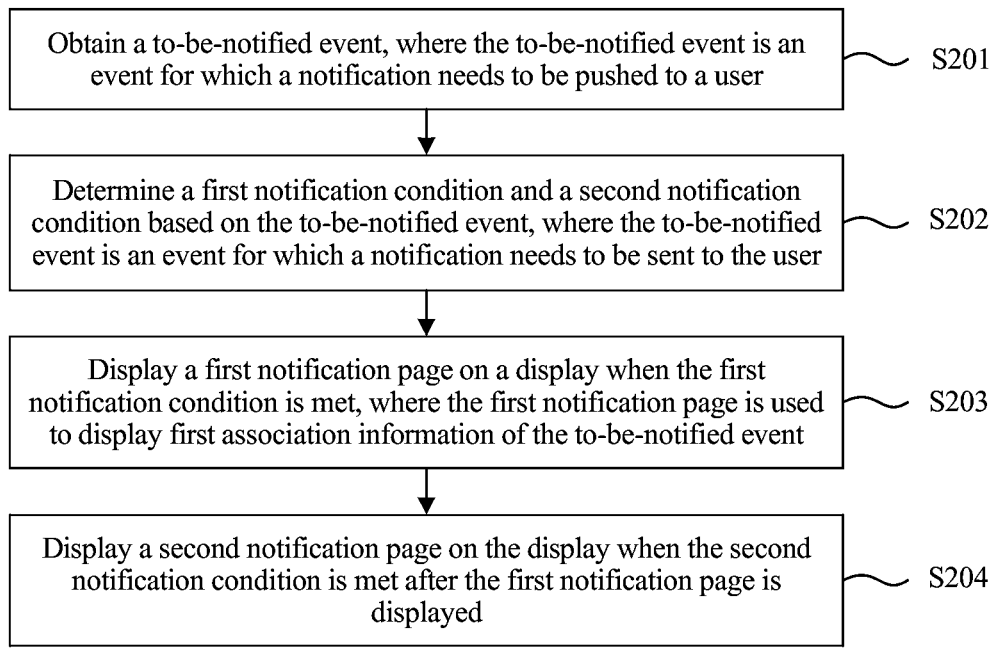
FIG. 2 is a schematic flowchart of pushing a notification on a mobile terminal device according to some embodiments.

FIG. 2 shows a method for pushing a notification by a mobile terminal according to some embodiments. The mobile terminal pushes a notification by performing at least the following steps: Step S201: Obtain a to-be-notified event for which a notification needs to be sent to a user. Step S202: Determine a first notification condition and a second notification condition based on the to-be-notified event. Step S203: Display a first notification page when the first notification condition is met. Step S204: Display a second notification page when the second notification condition is met after the first notification page is displayed.

The first notification page is used to display first association information of the to-be-notified event, the first association information includes one or more of event status information, to-be-executed behavior information, and operation association information of the to-be-notified event when the first notification condition is met, the second notification page is used to display second association information of the to-be-notified event, and the second association information includes one or more of event status information, to-be-executed behavior information, and operation association information of the to-be-notified event when the second notification condition is met.

In the prior art, a notification can be pushed based on only simple content of a service application. In comparison, in the push method in some embodiments, a plurality of notification conditions are determined based on a to-be-notified event, a corresponding notification page is pushed when a notification condition is met as the event develops, and content of the notification page includes various types of association information when the notification condition is met. Therefore, notification content corresponding to different event development stages of a to-be-notified event can be pushed to the user at the stages in a timely manner, thereby improving notification effectiveness.

In the present disclosure, the to-be-notified event may be an event that progresses continuously and for which a corresponding reminder needs to be provided to the user on a lock screen. In the method, as the event progresses continuously, the mobile terminal provides reminder content about the event to the user on the lock screen based on event information of the to-be-notified event. At different stages, when different notification conditions (for example, a time condition, a place condition, a user behavior condition, and an environment condition) are met, reminder content provided by the mobile terminal to the user on the lock screen or in another notification interface is somewhat different.

In step S201, the mobile terminal obtains a to-be-notified event.

In some embodiments, the step of obtaining a to-be-notified event may include step S201a and step S202b. In step S201a, the mobile terminal obtains a push message and/or a user operation record. In step S202b, the mobile terminal analyzes whether content of the push message and/or the user operation record is related to a to-be-notified event, and if yes, the mobile terminal determines the to-be-notified event.

In some embodiments, the mobile terminal may communicate with the outside by using the RF circuit 110 or the Wi-Fi module 170 to obtain information, and obtain the push message through analysis by using the processor 180. The mobile terminal may obtain an operation input signal of the user by using the input unit 130, the sensor 150, or the audio frequency circuit 160, analyze the operation input signal by using the processor 180, and store the operation input signal in the user operation record.

The mobile terminal may separately obtain the push message or the user operation record, or may concurrently obtain the push message and the user operation record. The mobile terminal may receive or actively collect the push message and/or the user operation record, and this may be performed in real time or performed periodically. A specific determining manner may be specifically determined based on conditions such as different scenario requirements or apparatus performance of the mobile terminal. In some embodiments, the mobile terminal may monitor, in real time in background, whether a new push message is received, or monitor a user operation record in real time within the scope of permission, and when a to-be-notified event is determined in a push message or a user operation record, trigger a subsequent step to be performed in a timely manner to implement real-time message pushing.

In some embodiments, the push message may be an SMS message, an email, a call, an application notification, or the like that is sent from the outside and that is received by the mobile terminal. In some embodiments, the push message may be pushed by a service provider or third-party application software. In some specific scenario embodiments, the service provider may be, for example, a ticket service provider (a train ticket, a bus ticket, or a steamer ticket), a group buying website, a shopping website, a taxi service provider, a schedule management service provider, or a travel management service provider, but is not limited thereto.

In some embodiments, the user operation record may be a user operation log, and is used to record a user operation behavior. The user operation behavior includes a purposeful operation behavior performed by the user on an input device of the mobile terminal, for example, a single or a series of operations performed by the user on a touchscreen, or a voice instruction entered by the user on a microphone. In some specific scenario embodiments, the user operation behavior event may be that the user performs an operation behavior in a third-party application, for example, hails a taxi, reserves a train ticket, a bus ticket, a flight ticket, a steamer ticket, a movie ticket, or a hotel room, or goes online shopping. For example, the user taps and opens the third-party application, and taps "Confirm the order", "Submit the order", or "Collect" for a selected target, or selects a shopping object on a shopping website, and correspondingly fills in express information, performs a payment operation, and so on. The third-party application is an application (APP, Application) that is installed on the mobile terminal and that provides a service by using a third-party service provider.

Certainly, persons skilled in the art should understand that the push message and the user operation behavior are examples that facilitate further understanding of persons skilled in the art, and are actually not limited to the foregoing examples. A push message and a user operation behavior, for example, a push message provided in a virtual reality display manner and a user operation behavior obtained by the mobile terminal by directly detecting a brain wave, are applicable provided that the push message and the user operation behavior can be identified by the mobile terminal by using the input device and the processor.

Then the mobile terminal analyzes the push message, the user operation record, or content of a combination of the two to determine whether there is a to-be-notified event.

In some embodiments, the mobile terminal searches the push message for a specified keyword, key statement, key link, and key number, and specified key semantics to determine whether the push message is related to a to-be-notified event.

In some specific scenario embodiments, when receiving a new message or a new email, the mobile terminal analyzes content of the new message or the new email, and searches the new message or the new email for a specified keyword, or makes semantic analysis. For example, the mobile terminal determines whether a number of an SMS message sender is a number of a specified service provider or whether an email address of an email sender is an email address of a specified service provider, and analyzes whether content of the SMS message, the message, or the email includes notification content (for example, semantic content such as "The train ticket is successfully reserved", "The order has been sent", or "There is a response from a taxi for the order") that meets a notification condition. Herein the specified service provider may be predetermined for cooperation, or may be determined by learning a usage habit or the like of the user. When learning through analysis that content of a new SMS message includes semantics related to flight ticket reservation, for example, "issued", "successfully reserved", or "passenger", the mobile terminal comprehensively infers that the report event information is a to-be-notified event about flight ticket reservation.

In some specific scenario embodiments, when receiving a new email, the mobile terminal analyzes whether an email address of a sender of the new email is an official service email address of a hotel, or makes semantic analysis on email content of the new email, to determine whether the report event is a service-type report event, for example, analyzes whether there is content related to hotel reservation, for example, "hotel", "successfully reversed", or "guest". The mobile terminal determines, based on the new email, that the report event is a hotel reservation event and meets a notification condition related to hotel reservation.

A specified keyword, key statement, key link, and key number, and specified key semantics for determining whether a push message is related to a to-be-notified event may be preset, or may be collected, created, or updated through machine learning based on a behavior habit and a usage habit of the user. In some specific scenario embodiments, if the user frequently performs a group buying reservation behavior, information such as a notification condition of a group buying reservation event is created based on the group buying reservation behavior frequently performed by the user, including using, as notification conditions for subsequently determining whether a report event is a to-be-notified event about group buying reservation, a number of a group buying service provider for pushing an SMS message, an email address of the group buying service provider for pushing an email, and content logic of a group buying reservation message.

In some embodiments, the mobile terminal analyzes a user operation behavior from the user operation record to determine whether the user operation behavior is related to a to-be-notified event.

In some specific embodiments, the mobile terminal learns, through analysis from the user operation record, a related operation performed by the user in a specified third-party application (a related operation performed in an application such as a taxi hailing application, a ticket application (a vehicle ticket, a flight ticket, or a movie ticket), a weather application, a music application, a group buying application, or a travel application), learns through analysis that the user requests a related service from the specified third-party application and confirms the related service, and determines that the related service is to occur subsequently and needs to be notified to the user at a corresponding occurrence node. In this case, the mobile terminal determines that the report event is a to-be-notified event. For example, if the user taps and opens the third-party application, and correspondingly fills in express information, performs a payment operation, and so on for a selected target, it is determined that the report event is a to-be-notified event about online shopping.

In some embodiments, the mobile terminal may obtain the user operation behavior event by reading the user operation record. The mobile terminal may analyze a series of operations of the user from the user operation record, to determine the user operation behavior event. When the user taps an application icon on a screen of a screen desktop, it indicates that the user requests to open application software corresponding to the application icon. After the application software is opened, the user performs corresponding operations such as tapping, flicking, and voice input in an interface of the application software. In this case, the application software may determine, based on the series of operations of the user, that the user performs events such as reservation, collection, and forwarding. The user operation behavior event may be, for example, an event including a single operation or a series of operations performed by the user on the touchscreen of the mobile terminal.

In step S202, the mobile terminal determines a first notification condition and a second notification condition based on the to-be-notified event.

In some embodiments, step S202 further includes step S202a, step S202b, step S202c, step S202d, and step S202e. In step S202a, the mobile terminal determines an event type of the to-be-notified event. In step S202b, the mobile terminal determines a first notification node and a second notification node of the to-be-notified event based on the event type. In step S202c, event information of the to-be-notified event is collected based on the event type. In step S202d and step S202e, a node parameter of the first notification node is determined in the event information, to determine the first notification condition corresponding to the first notification node, and a node parameter of the second notification node is determined in the event information, to determine the second notification condition corresponding to the second notification node.

In some embodiments, the mobile terminal analyzes the push message, the user operation record, or content of a combination of the two to determine the event type of the to-be-notified event, and determines the first notification node and the second notification node of the to-be-notified event based on the event type.

In some embodiments, the event type is a service type, and the service type may be preset. In some specific scenario embodiments, the service type may be obtained through classification based on a specific service such as hotel reservation, flight ticket reservation, vehicle ticket reservation, an express service, or a group buying service. To-be-notified events of each service type have approximately same event logic and several event nodes, and have several corresponding notification conditions (including a time condition, a place condition, a user behavior condition, an environment condition, and the like). Specific parameters of several notification conditions of each to-be-notified event need to be determined based on specific event information of the to-be-notified event. For example, notification nodes of a to-be-notified event about vehicle ticket reservation include at least a departure notification node and an arrival notification node, but specific parameters such as a specific departure time and place and a specific arrival time and place need to be further determined based on event information of vehicle ticket reservation.

Then the mobile terminal collects the event information of the to-be-notified event based on the event type. In some embodiments, the mobile terminal may collect related event information from a historical record. In some embodiments, the historical record includes any one or a combination of the following: an SMS message, an email, an address book, a voice record, a notepad record, a to-do list on a calendar, and a push message of a third-party application. For example, the mobile terminal scans data stored on the mobile terminal, and collects the event information of the report event from the existing SMS message, email, call record, voice record, notepad content, to-do list on the calendar, push message of the third-party application, and the like; or directly obtains the corresponding event information from the third-party application or a third-party service website based on data obtaining permission; or searches, based on a user operation behavior log, for a selection operation performed by the user in the third-party application, and the like, and collects the event information from a page related to the selection operation.

In some specific scenario embodiments, the event information may include an occurrence time, an occurrence place, associated-person information, service content information, and the like of the event. For example, time information of a flight ticket reservation event includes a departure time, an arrival time, a departure place, and an arrival place of an airplane, a name, an identity card number, and a passport number of a passenger, and the like. Service content information includes information about all stages. For example, flight ticket related events include check-in, departure, arrival at an airport, luggage storage, and the like. In addition, service content information may be a hotel related event, including preparing to check in, providing an unlocking key, and the like. A train ticket related event may include "waiting", "about to set off", "about to arrive", and the like. A movie ticket related event may include sequence number redemption, seat guidance, and the like. An express related event may include "collected", "being delivered", "to be picked up", "signed", and the like. A taxi hailing related event may include "prepare to dispatch a taxi", "driver sets off", "taxi arrives", "travel starts", "to pay", and the like.

For example, for a to-be-notified event about hotel reservation, the mobile terminal logs in, based on a service type of the hotel reservation, from background to a third-party application related to a hotel reservation event, collects service related information of the hotel reservation event, or collects service related information from a new corresponding email based on the hotel reservation event, where the service related information includes a hotel check-in time, a hotel name, a guest name, a type of a reserved room, a fee, and the like, and searches the third-party application for a corresponding hotel order based on known information about the hotel reservation event such as a reservation event and hotel check-in, to further obtain related information such as a hotel address, hotel star-level information, a hotel check-in notice, and a nearby public transportation guide to a hotel, so as to obtain event information of the hotel reservation event.

In step S202d or step 202e, the mobile terminal obtains the node parameters of the notification nodes (the first notification node and the second notification node) from the event information based on the notification nodes of the to-be-notified event, and determines notification conditions (the first notification condition and the second notification condition) of the notification nodes based on a combination of the node parameters.

In some embodiments, a node parameter of each notification node may be a time parameter, a place parameter, an environment parameter, a user behavior parameter, a hardware parameter, or a combination thereof. For example, internal timing is used as a preset notification condition based on the event information, and a notification is triggered by an event based on the timing. The environment parameter may include an environment temperature, environment pressure, environment brightness, gravity, a speed, a posture, and the like. The user behavior parameter includes user usage frequency information, user registration information, user motion information, and the like. The hardware parameter may include a hardware status, a software status, and the like of the mobile terminal.

In some specific scenario embodiments, for a to-be-notified event about hotel reservation, it is determined, based on a check-in date and a reminder advance such as a one-day advance, that a first notification condition is to provide a reminder one day before the actual check-in date (reminder content corresponding to the first notification condition is related information indicating that the user is to have a stay in a hotel), and a second notification condition is to provide a reminder at a specific time on the actual check-in date (reminder content corresponding to the second notification condition includes related information indicating that the user is to check in).

In step S203, after determining the notification conditions, the mobile terminal first monitors a corresponding first condition parameter based on the first notification condition.

Step S203 includes step S203a and step S203b. In step S203a, the mobile terminal monitors the corresponding first condition parameter based on the first notification condition, where the first condition parameter includes at least any one of the following: a current time, a current place, current user behavior information, and current environment information. In step S203b, when the first condition parameter meets the first notification condition, the first notification page is displayed.

The first condition parameter is a real-time parameter value corresponding to the node parameter of the first notification condition, and includes the current time, the current place, the current user behavior information, and the current environment information. For example, the current time is 8:00 a.m., the current place is home, the current user behavior information is a running state, and the current environment information is raining.

The mobile terminal may collect the corresponding first condition parameter in the background. In some embodiments, the mobile terminal obtains the current time by using a clock of the mobile terminal, determines the current place by using a GPS, Wi-Fi, an operator network, and the like, and obtains a current temperature, pressure, current brightness, and the like by using various sensing apparatuses. The current user behavior information may include an operation performed by the user on third-party software, an operation performed on notification information on the lock screen, a user motion behavior, and the like. The user behavior information may be obtained by monitoring a user operation behavior, for example, monitoring current interface information and an operation performed by the user on the touchscreen, or may be obtained by using various sensors of the mobile terminal. For example, a motion behavior such as a speed and a posture of the user is obtained by using a gravity sensor, an inertial sensor (including a gyroscope, an acceleration sensor, and the like), and the like. For example, a current speed, a posture, gravity, and the like may be obtained by using a sensing apparatus (for example, a gyroscope).

In addition, the mobile apparatus may further monitor current hardware status information, including a hardware temperature, hardware CPU (central processing unit, Central Processing Unit) usage, and the like. The mobile apparatus may obtain an apparatus hardware status by using corresponding monitoring software.

The first notification page including first association information is displayed when the first notification condition is met. The first association information includes any one or a combination of event status information, to-be-executed behavior information, and operation association information. Preferably, the event status information, the to-be-executed behavior information, and the operation association information are all displayed on the first notification page.

In some embodiments, the event status information includes information about a current event node of the to-be-notified event, event start and end time information, event start and end place information, character information, environment information, service order information, and real-time reminder information related to the to-be-notified event, and the like. The to-be-executed behavior information is information about a behavior that needs to be performed by the user. The operation association information includes association information of an operation that may be performed by the user on the mobile terminal.

In some specific scenario embodiments, for a to-be-notified event about hotel reservation, a first notification condition is to provide a reminder one day before an actual check-in date (reminder content corresponding to the first notification condition is related information indicating that the user is to have a stay in a hotel), and it is determined that a second notification condition is to provide a reminder at a specific time on the actual check-in date (reminder content corresponding to the second notification condition includes related information indicating that the user is to check in). In this case, a current time is monitored, and a first notification page including first association information is displayed one day before the current time reaches the actual check-in date. The first association information includes a reminder provided to the user that a hotel check-in event is to occur on the second day. Information such as a hotel name, a hotel address, a room type, a check-in time, a guest name, and a hotel room fee is also displayed.

In some specific scenario embodiments, for a to-be-notified event about flight ticket reservation, a first notification condition is that there is three hours before an airplane takes off and a current user location is at a distance of more than 3 kilometers from an airport. When the mobile terminal learns through monitoring that a current time is three hours earlier than departure of the airplane and determines that a current place is at a distance of more than 3 kilometers from the airport, the mobile terminal determines that the first notification condition is met, and therefore triggers a first notification page to be displayed. First association information is displayed on the first notification page, and the first association information includes a reminder that the user needs to set off for the airport. Information such as a flight number, an airline, a departure place and weather of the departure place, a landing place and weather of the landing place, a departure time, a landing time, and a passenger name is also displayed. In addition, reminder information (for example, a reminder of taking a taxi, or taking a subway due to a traffic jam) for a better travel manner may be provided based on a distance from the current location to the airport and a time that is left before the departure. In addition, the first association information may further include real-time reminder information such as a map including a real-time user location, and a time at which the user is expected to arrive at the airport based on a current speed at which the user rushes to the airport.

In some specific scenario embodiments, the first notification page includes a departure time, a departure place, an arrival time, and an arrival place on a train ticket, weather of the departure place, weather of the arrival place, a passenger name, a passenger identity card number, carriage information, seat information, a current stage (including "waiting", "setting off", "about to arrive", and "arrived"), and the like, so that the user does not need to search an SMS message, a corresponding train reservation website, or a corresponding application program for related information.

A display manner of the second notification page is the same as a display manner of the first notification page, and content displayed on the second notification page and the first notification page may be different based on different notification conditions.

A difference from a prior-art form of an SMS message displayed on a lock screen is that, the first association information displayed on the first notification page can help the user intuitively obtain detailed content of the to-be-notified event at an appropriate event node, so that the user can execute event content of the to-be-notified event based on the detailed content, without further searching for related information by performing a complex operation.

In some embodiments, in step S203 or step S204, the mobile terminal may directly display a corresponding notification page in a notification interface in full screen when a notification condition is met.

A display manner of the second notification page may be the same as a display manner of the first notification page, and content displayed on the second notification page and the first notification page may be different based on the second notification condition and the first notification condition that are met. In some embodiments, the second notification page may be updated and displayed based on the first notification page. To ensure notification simplicity, the first notification page may be deleted after the second notification page is updated and displayed based on the first notification page.

In some embodiments, in step S203 or step S204, the mobile terminal may first display a corresponding notification SMS message when the first notification condition or the second notification condition is met, and then display the corresponding first notification page or the corresponding second notification page through jumping based on an operation input of the user for the notification SMS message. In this display manner, the to-be-notified event can be notified to the user in a timely manner, and interference to a preview and an operation performed by the user in a current interface that is caused by directly displaying a notification page can be avoided.

Specifically, in step S203, the mobile terminal displays a notification SMS message about the first notification page when the first notification condition is met, and then displays the first notification page through jumping in response to a case in which an operation input for the notification SMS message is detected.

Specifically, in step S204, the mobile terminal displays a notification SMS message about the second notification page when the second notification condition is met, and then displays the second notification page through jumping in response to a case in which an operation input for the notification SMS message is detected.

There may be one or more notification SMS messages displayed in the notification interface. A quantity of notification SMS messages is determined based on a specific to-be-displayed notification page, and the quantity is not limited.

Based on some embodiments, in some embodiments, when the notification interface includes a plurality of notification pages (which may be the first notification page, the second notification page, or both the first notification page and the second notification page), the plurality of notification pages may exist in the notification interface in a form of a subpage, and a corresponding notification classification identifier is displayed in the notification interface. When the user taps any notification classification identifier, a notification page corresponding to the notification classification identifier is displayed, and another notification page is hidden.

In the method, further, a notification classification identifier is displayed in the notification interface, and the first notification page or the second notification page corresponding to the notification classification identifier is displayed in response to a case in which an operation input for the notification classification identifier is detected.

Specifically, step S203 includes step S203a, step S203b, and step S203c. In step S203a, a notification interface is displayed on the display, where the first notification page exists in the notification interface in a form of a subpage. In step S203b, a notification classification identifier corresponding to the first notification page is displayed in the notification interface. In step S203c, in response to a case in which an operation input for the notification classification identifier is detected, the first notification page corresponding to the notification classification identifier is displayed in the notification interface, and another subpage of the notification interface is hidden.

Likewise, step S204 includes step S204a, step S204b, and step S204c. In step S204a, a notification interface is displayed on the display, where the second notification page exists in the notification interface in a form of a subpage. In step S204b, a notification classification identifier corresponding to the second notification page is displayed in the notification interface. In step S204c, in response to a case in which an operation input for the notification classification identifier is detected, the second notification page corresponding to the notification classification identifier is displayed in the notification interface, and another subpage of the notification interface is hidden.

The notification classification identifier is displayed in the notification interface, and the event display page corresponding to the notification classification identifier can be displayed in full screen through jumping based on the operation input of the user. The notification classification identifier may be a notification list or a classification icon. The notification list may be a strip display bar in a form of an SMS message, and the classification icon may be a classification icon displayed based on an event type. The notification classification identifier is used to briefly remind a user that there is currently a notification and is used for switching between different event display pages, and the event display page corresponding to the notification classification identifier can be displayed in full screen through jumping based on the operation input of the user. If the current notification interface includes a plurality of to-be-displayed event display pages, the user may perform switching between different event display pages by tapping different notification classification identifiers, to avoid message omission.

In some embodiments, the notification interface includes any one or a combination of the following: a lock screen and/or a notification classification display interface on an unlock screen. Persons skilled in the art should understand that another notification interface applicable to the present disclosure, for example, a three-dimensional virtual reality projection image, can be incorporated herein by reference. The lock screen is used as an example. When the mobile terminal (for example, a mobile phone or a tablet computer) is in a screen locked state, an updated lock screen is displayed, to provide a notification reminder to the user.

In some embodiments, when the notification interface is a lock screen, when a message needs to be pushed, the mobile terminal in a screen-off state triggers the lock screen to be lighted up, and displays updated display content on the lock screen, including displaying the event display page in full screen or displaying the notification classification identifier and the event display page corresponding to the notification classification identifier. If the mobile terminal is currently in a screen-on state when the screen is locked, the current lock screen may also be updated based on a triggered push message, and updated display content may be displayed.

In some embodiments, if the mobile terminal is in an unlocked state and a current display interface is not in the notification interface, the mobile terminal generates a corresponding notification SMS message based on the event display page, displays a notification bar in the current display interface, and displays the notification SMS message on the notification bar. The notification SMS message can be used to display the corresponding event display page through jumping based on the operation input of the user.

For different notification interfaces, different display manners or a combination of a plurality of display manners may be used, so as to provide a plurality of message push manners and search manners to the user.

For example, when the notification interface is a lock screen, it is determined whether the mobile terminal is currently in a screen locked state. If yes, a quantity of event display pages on the current lock screen is determined. If there is only one event display page, the corresponding event display page is directly displayed on the lock screen in full screen. If there are a plurality of event display pages, notification classification identifiers corresponding to the plurality of event display pages are displayed in a form of a message list, the user may perform an input operation (such as tapping or flicking) on the notification classification identifier in the screen locked state, and an event display page corresponding to the notification classification identifier is directly displayed in full screen through jumping in the screen locked state based on the input operation. The user may further return to the lock screen including the notification classification identifier from the event display page, and tap another notification classification identifier to jump to another corresponding event display page.

For another example, the notification interface is a notification classification display interface. It is determined whether the mobile terminal is currently in the notification classification display interface. If yes, a quantity of event display pages in the notification classification display interface is determined. If there is only one event display page, the corresponding event display page is directly displayed in the notification classification display interface in full screen. If there are a plurality of event display pages, notification classification identifiers corresponding to the plurality of event display pages are displayed in a form of a message list, the user may perform an input operation (such as tapping or flicking) on the notification classification identifier in the notification classification display interface, and an event display page corresponding to the notification classification identifier is displayed in full screen through jumping in a screen locked state based on the input operation. The user may further return to the notification classification identifier interface from the event display page, and tap another notification classification identifier to jump to another corresponding event display page.

Certainly, a combination of several notification interfaces may be used to display a notification. For example, when the user is in an unlocked state and is in another interface, when information needs to be pushed, a notification bar may pop up in the current interface, and a notification SMS message with brief message content may be displayed on the notification bar. The user may tap the reminder message to display, in full screen through jumping, an event display interface corresponding to the notification SMS message, or directly jump to a notification classification display interface including the event display page.

Herein, the lock screen is an interface displayed when a screen of the mobile terminal is lighted up but the mobile terminal is still in a screen locked state. The notification classification display interface is an interface that is exclusively used by the mobile terminal to display a notification, and includes but is not limited to a notification interface that pops up when the user performs a flick-down operation from the top of the screen in a desktop interface, and the like. The notification bar is a notification interface opened by the user in a current interface, and disappears after notification. For example, when there is a to-be-notified message, a strip notification bar pops up from the top of the screen in the current interface, and the notification bar does not cover much of the current interface, and disappears after a period of time (for example, three seconds).

In the foregoing embodiment, in the method, when the mobile terminal is currently in another interface, a notification is generated, and a related reminder message pops up in a form of a notification bar. After the user performs a selection operation such as tapping on the reminder message, a corresponding notification interface is displayed through jumping, so as to facilitate a user operation and notify notification content in a timely manner.

In some embodiments, the notification page may include a title region, at least one information reminder region, and an action region. The information reminder region is used to display notification details of an event. In the information reminder region, an interface of a related application may be invoked and displayed. For example, permission for a map application is obtained, and a map application interface is displayed in the information reminder region, to prompt a user with related location information; or permission for a live application is obtained, and current live content is displayed in the information reminder region. The information reminder region may include a primary information reminder region and an additional information reminder region. For example, the primary information reminder region may be used to notify primary information of a current to-do item, including a primary behavior that needs to be performed by the user, for example, "currently need to set off" or "currently need to check in at an airport". The additional information reminder region may be used to notify related information of the to-do item, for example, a ticket number, passenger information, or a seat number. In this case, the user may directly obtain related information of a current service on a notification page, without further searching a corresponding website, application, or SMS message.

In a preferred example, when there is only one notification page, the notification page is updated to the notification interface in full screen, and the notification page occupies the entire notification interface. In other words, the notification page is directly displayed to the user in a form of a large image. The notification page can display notification details to the user. If there are a plurality of notification pages, classification icons and a correspondence between a classification icon and a notification page are established in a form of a switchable subpage. When the user taps one of the classification icons, a corresponding notification page is still displayed in the notification interface in full screen. In other words, the notification page is displayed in a form of a large image.

In some embodiments, in the method, the mobile terminal may further update a corresponding notification condition and a corresponding notification page based on an update event of the to-be-notified event.

Specifically, based on the method shown in FIG. 2, the method further includes step S205, step S206, and step S207.

In step S205, the mobile terminal obtains an update event of the to-be-notified event. In step S206, the mobile terminal updates the first notification condition and/or the second notification condition based on the update event. In step S207, the mobile terminal updates the corresponding currently displayed first notification page and/or the corresponding currently displayed second notification page based on the updated first notification condition and/or the updated second notification condition.

In some embodiments, the update event may be determined in the push message and/or the user operation record. The push message and/or the user operation record are or is obtained, and content of the push message and/or the user operation record is analyzed to determine whether the content is related to an update event of a to-be-notified event.

Content of a process of obtaining and analyzing the push message and/or the user operation record to obtain the update event is the same as or basically the same as that of a process of obtaining the to-be-notified event in the foregoing embodiments. For brevity, details are not described again.

When the update event is obtained, it is determined, based on the update event, whether each notification condition corresponding to the to-be-notified event and each notification page that is being displayed need to be updated.

In some specific scenario embodiments, when receiving an SMS message about a flight delay, the mobile terminal finds a corresponding to-be-notified event about flight ticket reservation based on the SMS message, and updates each notification condition of the to-be-notified event based on the SMS message, for example, updates a flight departure time and a landing time in the notification condition. If a notification page is currently being displayed, the mobile terminal needs to update the flight departure time, the landing time, and the like on the notification page based on the SMS message, or update event status information on the notification page to "flight delay", and mark an estimated delay event, and so on.

In some specific scenario embodiments, when detecting that the user performs a vehicle ticket changing operation in a third-party application, the mobile terminal determines an update event based on the operation behavior, finds a corresponding to-be-notified event about vehicle ticket reservation based on the update event, and updates each notification condition of the corresponding to-be-notified event, for example, updates a departure time, an arrival time, and vehicle ticket information in the notification condition. If a notification page is currently being displayed, the mobile terminal needs to update the departure time, the arrival time, the vehicle ticket information, and the like on the notification page based on the SMS message, or update event status information on the notification page to "changed", and mark changing related information, and so on.

In some embodiments, based on the method in FIG. 2, the method further includes step S208 and step S209. In step S208, the mobile terminal determines a notification cleaning condition based on the to-be-notified event, where the notification cleaning condition includes at least any one of the following: a cleaning time condition, a cleaning place condition, and a cleaning user behavior condition. In step S209, the mobile terminal deletes the currently displayed first notification page or the currently displayed second notification page of the to-be-notified event when the notification cleaning condition is met.

The cleaning time condition may be a time condition for completing the to-be-notified event, the cleaning place condition may be a place condition for completing the to-be-notified event, and the cleaning user behavior condition may be a cleaning operation (for example, an operation of tapping "Clean") to be performed by the user on the mobile terminal.

After determining the notification cleaning condition, the mobile terminal monitors a related condition parameter, including a current time, a current place, current user behavior information, and the like, based on the notification cleaning condition. When the notification cleaning condition is met, the mobile terminal deletes the currently displayed first notification page or the currently displayed second notification page of the to-be-notified event. In some embodiments, the mobile terminal may also delete a corresponding notification SMS message or notification classification icon when cleaning the notification page.

In some specific scenario embodiments, if the current time is later than a landing time of an airplane and the user has successfully arrived at a destination by air to complete the flight, the mobile terminal determines whether the real-time environment information meets the notification cleaning condition, and the mobile terminal deletes the corresponding notification page in the notification interface, to keep the notification interface clear and concise.

In the prior art, a mobile terminal flashes a notification on the top of a mobile phone screen or displays a notification in a strip bar only when an event occurs in a service application. In comparison, in the method provided in the present disclosure, each notification condition of a to-be-notified event is determined; event information of the to-be-notified event is collected; it is determined, based on context analysis on the event information, whether to trigger a notification to be pushed to the user; and association information of event details of the event information is updated to a notification interface in full screen in a form of an event display page when it is determined that a notification needs to be pushed. Specifically, an existing event display page is updated or a new notification page is created depends on whether the notification interface includes a corresponding notification page. In this way, when the event changes, the user can obtain a notification in a timely manner, and conveniently obtain notification details of the event from a corresponding notification page in the notification interface based on a user requirement, without further searching an SMS message or an application.

Figure 3:
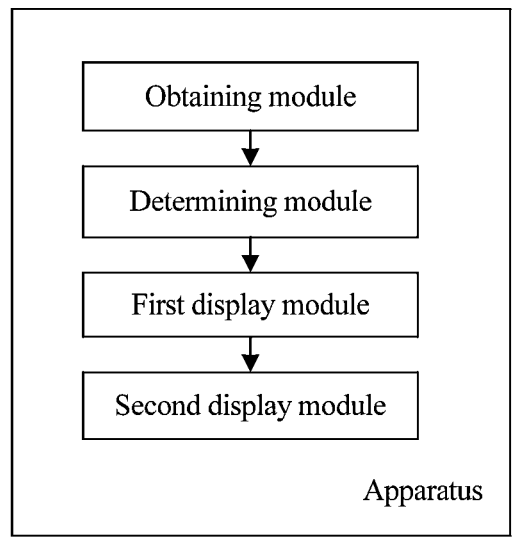
FIG. 3 is a schematic structural diagram of an apparatus for pushing a notification according to some embodiments.

FIG. 3 is a schematic structural diagram of an apparatus for pushing a notification on a terminal device with a screen according to some embodiments. The apparatus includes an obtaining module, a determining module, a first display module, and a second display module.

The obtaining module obtains a to-be-notified event, where the to-be-notified event is an event for which a notification needs to be pushed to a user. The determining module determines a first notification condition and a second notification condition based on the to-be-notified event, where the to-be-notified event is an event for which a notification needs to be sent to the user, and the first notification condition and the second notification condition each include at least any one of the following: a time condition, a place condition, a user behavior condition, and an environment condition. The first display module displays a first notification page when the first notification condition is met, where the first notification page is used to display first association information of the to-be-notified event, and the first association information includes one or more of event status information, to-be-executed behavior information, and operation association information of the to-be-notified event when the first notification condition is met. The second display module displays a second notification page when the second notification condition is met after the first notification page is displayed, where the second notification page is used to display second association information of the to-be-notified event, and the second association information includes one or more of event status information, to-be-executed behavior information, and operation association information of the to-be-notified event when the second notification condition is met.

For methods performed by the obtaining module, the determining module, the first display module, and the second display module, respectively refer to content in step S201, step S202, step S203, and step S204 shown in FIG. 2. Details are not described again.

In the prior art, a notification can be pushed based on only simple content of a service application. In comparison, in the push apparatus in some embodiments, a plurality of notification conditions are determined based on a to-be-notified event, a corresponding notification page is pushed when a notification condition is met as the event develops, and content of the notification page includes various types of association information when the notification condition is met. Therefore, notification content corresponding to different event development stages of a to-be-notified event can be pushed to the user at the stages in a timely manner, thereby improving notification effectiveness.

In some embodiments, the obtaining module obtains a to-be-notified event by using an obtaining submodule and an analysis module. The obtaining submodule obtains a push message and/or a user operation record, and the analysis submodule analyzes whether content of the push message and/or the user operation record is related to a to-be-notified event, and if yes, determines the to-be-notified event.

In some embodiments, for methods performed by the obtaining submodule and the analysis module, respectively refer to content in step S201a and step S202b. Details are not described again.

The determining module determines the first notification condition and the second notification condition by using a type determining submodule, a node determining submodule, an information determining submodule, a parameter determining submodule, and a condition determining submodule. The type determining submodule determines an event type of the to-be-notified event. The node determining submodule determines a first notification node and a second notification node of the to-be-notified event based on the event type. The information determining submodule collects event information of the to-be-notified event based on the event type. The parameter determining submodule determines a node parameter of the first notification node in the event information, to determine the first notification condition corresponding to the first notification node. The condition determining submodule determines a node parameter of the second notification node in the event information, to determine the second notification condition corresponding to the second notification node.

In some embodiments, for methods performed by the type determining submodule, the node determining submodule, the information determining submodule, the parameter determining submodule, and the condition determining submodule, respectively refer to content in step S202a, step S202b, step S202c, step S202d, and step S202e. Details are not described again.

The first display module includes: a first monitoring submodule, configured to monitor a corresponding first condition parameter based on the first notification condition, where the first condition parameter includes at least any one of the following: a current time, a current place, current user behavior information, and current environment information; and a first display submodule, configured to display the first notification page when the first condition parameter meets the first notification condition.

The second display module includes: a second monitoring submodule, configured to monitor a corresponding second condition parameter based on the second notification condition, where the second condition parameter includes at least any one of the following: a current time, a current place, current user behavior information, and current environment information; and a second display submodule, configured to display the second notification page when the second condition parameter meets the second notification condition.

For methods performed by the first monitoring submodule and the first display submodule, respectively refer to step S203a and step S203b. For methods performed by the second monitoring submodule and the second display submodule, respectively refer to step S204a and step S204b.

A difference from a prior-art form of an SMS message displayed on a lock screen is that, the first association information displayed on the first notification page can help the user intuitively obtain detailed content of the to-be-notified event at an appropriate event node, so that the user can execute event content of the to-be-notified event based on the detailed content, without further searching for related information by performing a complex operation.

The first display module may directly display the corresponding first notification page in the notification interface in full screen when the first notification condition is met. The second display module may directly display the corresponding second notification page in the notification interface in full screen when the second notification condition is met.

A display manner of the second notification page may be the same as a display manner of the first notification page, and content displayed on the second notification page and the first notification page may be different based on the second notification condition and the first notification condition that are met. In some embodiments, the second notification page may be updated and displayed based on the first notification page. To ensure notification simplicity, the first notification page may be deleted after the second notification page is updated and displayed based on the first notification page.

The first display module includes a second display submodule and a third display submodule. The second display submodule displays a notification SMS message about the first notification page when the first notification condition is met, and the third display submodule displays the first notification page through jumping in response to a case in which an operation input for the notification SMS message is detected.

Likewise, the second display module displays a notification SMS message about the second notification page when the second notification condition is met, and displays the second notification page through jumping in response to a case in which an operation input for the notification SMS message is detected.

In some embodiments, the first display module or the second display module may first display the corresponding notification SMS message when the notification condition is met, and then display the notification page through jumping based on the operation input of the user for the notification SMS message. For a display manner of the first display module or the second display module, refer to content in step S203 and step S204 shown in FIG. 2. In this display manner, the to-be-notified event can be notified to the user in a timely manner, and interference to a preview and an operation performed by the user in a current interface that is caused by directly displaying a notification page can be avoided.

In some embodiments, the second display module includes an update submodule. The update submodule updates and displays the second notification page based on the first notification page when the second notification condition is met after the first notification page is displayed. The second display module may further include a deletion submodule. The deletion submodule deletes the first notification page after the second notification page is updated and displayed based on the first notification page. The update submodule can reduce resources occupied for generating the notification page, and the deletion submodule can ensure notification simplicity.

When the notification interface includes the first notification page and/or the second notification page, the apparatus displays a notification classification identifier in the notification interface, and displays, in response to a case in which an operation input for the notification classification identifier is detected, the first notification page or the second notification page corresponding to the notification classification identifier.

Specifically, the first display module includes a first interface display submodule, a first identifier display submodule, and a first page display submodule. The first interface display submodule displays the notification interface on the display, where the first notification page exists in the notification interface in a form of a subpage. The first identifier display submodule displays, in the notification interface, a notification classification identifier corresponding to the first notification page. In response to a case in which an operation input for the notification classification identifier is detected, the first page display submodule displays, in the notification interface, the first notification page corresponding to the notification classification identifier, and hides another subpage of the notification interface.

For processes performed by the first interface display submodule, the first identifier display submodule, and the first page display submodule, respectively refer to content in step S203*a*, step S203*b*, and step S203*c*.

Likewise, the second display module includes a second interface display submodule, a second identifier display submodule, and a second page display submodule. The second interface display submodule displays a notification interface on the display, where the second notification page exists in the notification interface in a form of a subpage. The second identifier display submodule displays, in the notification interface, a notification classification identifier corresponding to the second notification page. In response to a case in which an operation input for the notification classification identifier is detected, the second page display submodule displays, in the notification interface, the second notification page corresponding to the notification classification identifier, and hides another subpage of the notification interface.

For processes performed by the second interface display submodule, the second identifier display submodule, and the second page display submodule, respectively refer to content in step S204*a*, step S204*b*, and step S204*c*.

In some embodiments, the apparatus further includes an event update module, a condition update module, and a page update module. The event update module obtains an update event of the to-be-notified event. The condition update module updates the first notification condition and/or the second notification condition based on the update event. The page update module updates the corresponding currently displayed first notification page and/or the corresponding currently displayed second notification page based on the updated first notification condition and/or the updated second notification condition.

For processes performed by the event update module, the condition update module, and the page update module, respectively refer to content in step S205, step S206, and step S207 shown in FIG. 2.

The apparatus further includes a first cleaning module and a second cleaning module. The first cleaning module determines a notification cleaning condition based on the to-be-notified event, where the notification cleaning condition includes at least any one of the following: a cleaning time condition, a cleaning place condition, and a cleaning user behavior condition. The second cleaning module deletes the currently displayed first notification page or the currently displayed second notification page of the to-be-notified event when the notification cleaning condition is met.

For methods performed by the first cleaning module and the second cleaning module, refer to content in step S210 and step S209.

A mobile terminal provided in some embodiments includes: a display (in some embodiments, the display includes a touch-sensitive surface and a screen); one or more processors; a memory; a plurality of application programs; and one or more programs. The one or more programs are stored in the memory and configured to be executed by the one or more processors, the one or more programs include an instruction, and the instruction is used to execute content in the method shown in FIG. 2 and some embodiments corresponding to FIG. 2.

Some embodiments provide a computer-readable storage medium storing one or more programs. The one or more programs include an instruction, and when the instruction is executed by a mobile terminal that includes a display and a plurality of application programs, the mobile terminal executes content in the method shown in FIG. 2 and some embodiments corresponding to FIG. 2. The display includes a touch-sensitive surface and a screen.

Some embodiments provide a graphical user interface on a mobile terminal with a display apparatus. The graphical user interface includes: A notification interface is displayed in the graphical user interface. When a first notification condition of a to-be-notified event is met, a first notification interface is displayed in the notification interface, and first association information of the to-be-notified event is displayed. After the first notification page is displayed, when a second notification condition is met, a second notification interface of the to-be-notified event is displayed, and second association information of the to-be-notified event is displayed.

The first notification page is used to display the first association information of the to-be-notified event, the to-be-notified event is an event for which a notification needs to be sent to a user, and the first association information includes one or more of event status information, to-be-executed behavior information, and operation association information of the to-be-notified event when the first notification condition is met. The second notification page is used to display the second association information of the to-be-notified event, and the second association information includes one or more of event status information, to-be-executed behavior information, and operation association information of the to-be-notified event when the second notification condition is met. The first notification condition and the second notification condition each include at least any one of the following: a time condition, a place condition, a user behavior condition, and an environment condition.

In a process of displaying the first notification page in the notification interface in response to a case in which the first notification condition of the to-be-notified event is met, the user interface includes: a notification SMS message about the first notification page is displayed in response to the case in which the first notification condition of the to-be-notified event is met; and the first notification page is displayed through jumping in the notification interface in response to a case in which an operation input for the notification SMS message is detected. In this display manner, the to-be-notified event can be notified to the user in a timely manner, and interference to a preview and an operation performed by the user in a current interface that is caused by directly displaying a notification page can be avoided. When a current display interface is an interface displayed in an unlocked state in a process of using the mobile terminal by the user, a notification is notified to the user in a form of a notification bar when being triggered, so that the user can obtain the notification in a timely manner while currently using the mobile terminal is not affected.

In some embodiments, as shown in FIG. 5(*a*), an interface currently displayed on the mobile terminal is a program home screen. After a new notification is received, as shown in FIG. 5(*b*), a reminder pops up on a notification bar, and the user may perform a flick-down operation or tapping to open a trapezoid, to view an event display page of reminder details. As shown in FIG. 5(*c*), the event display page of the corresponding notification details is displayed in a notification classification display interface. The user may open the notification classification display interface by pulling down the notification bar. In this case, a sub-interface in which a service type to which the new notification that just comes belongs is located is displayed by default, and the user may view details of the notification. In addition, another operation manner may be used. For example, the user may double tap, or touch and hold content of the notification to enter a corresponding application.

In another embodiment, as shown in FIG. 5(*d*), the mobile terminal is currently in a screen locked state. When a notification comes or the user presses an on/off key to light up a screen of the mobile terminal, to light up and display a lock screen. If there is only one notification, as shown in FIG. 5(*f*), the notification is displayed on the lock screen in a form of notification details, and the user may perform a flick-up operation to close an event display page, and return to the lock screen in a screen-on state.

In another optional embodiment, as shown in FIG. 5(*d*), the mobile terminal is currently in a screen locked state. When the mobile terminal lights up and displays the lock screen, as shown in FIG. 5(*e*), a notification SMS message with a notification details summary is displayed. An event display page of notification details is displayed in FIG. 5(*f*) only when the user taps a notification in the summary interface. When collapsing the notification, the user returns to the lock screen including the notification SMS message with the notification details summary in FIG. 5(*g*). When no notification is displayed on the lock screen, this may be shown in FIG. 5(*h*).

In another embodiment, a notification is displayed on the lock screen in a form of a notification list (namely, list information). As shown in FIG. 5(*i*), the mobile terminal is in a screen-off state. When a notification comes or the user presses the on/off key to light up the screen of the mobile terminal, as shown in FIG. 5(*j*), a lock screen including a plurality of notifications is displayed. The user taps one of the notifications, and in this case, an event display page of the notification is displayed in FIG. 5(*k*). The event display page may be opened by performing tapping, a flick-down operation, or the like. Then the user may close the event display page by performing an operation, to return to the lock screen. The event display page may be closed by tapping a preset "Back" icon, performing a flick-up operation, or the like. In this case, a displayed interface returns to the notification list on the lock screen in FIG. 5(*l*).

In addition, corresponding notification details are displayed in the notification classification display interface. The user may view the notification details by pulling down the notification bar. When pushing a notification is triggered, a new event display page or an updated existing event display page and a notification SMS message corresponding to the new event display page or the updated existing event display page are generated, the notification bar pops up in the current display interface, and the notification SMS message is displayed on the notification bar. The notification bar is a notification interface that is opened by the user in the current interface.

The notification interface includes the first notification page and/or the second notification page, the notification interface further includes a notification classification identifier, and the first notification page or the second notification page corresponding to an operation input of the user for the notification classification identifier is displayed through jumping in response to the operation input. The notification classification identifier is a notification list or a classification icon.

In a specific embodiment of the present disclosure, the notification interface in the present disclosure may be a lock screen, or an interface that is used for notification and to which the user can jump by performing a specified operation on an unlock screen or the lock screen. During actual use, a combination of a plurality of notification interfaces may be used, to ensure that the mobile terminal can successfully send a notification to the user in various states.

The lock screen is an interface that is displayed when the screen of the mobile terminal is lighted up again but the mobile terminal is still in a screen locked state after the mobile terminal is locked. When the mobile terminal in a standby mode has not received any operation instruction in a period of time, or the screen is turned off after the user presses a key of the mobile terminal for turning off the screen, when the user presses an on key of the mobile terminal, taps the screen, or shakes the mobile phone, and performs another related operation, the screen is lighted up to display the lock screen. In this case, a home screen or another interface is entered from the displayed lock screen without an unlock operation.

The unlock screen is an interface that is displayed when the user performs a normal operation on the mobile terminal after unlocking the screen by using a specified unlocking action (for example, performing a flicking operation in a specified region, and entering a correct unlocking password). The interface includes but is not limited to a home screen, an extended home screen panel to a left of the home screen, any display interface of a system application, any interface of a third-party application, and the like. On the unlock screen, the notification interface may be a notification classification display interface (a PAD screen). The notification classification display interface may be displayed based on a specified operation of the user. For example, in a current interface (which may be a desktop interface or an interface after an application is entered, or may be a lock screen displayed for unlocking after the screen is lighted up), the user performs a flick-down operation from the top of the screen of the terminal, and in this case, the notification classification display interface occurs. Certainly, persons skilled in the art should understand that an operation manner of displaying the notification classification display interface is merely an example, and another operation manner, for example, a manner of continually shaking the mobile terminal twice, can be incorporated herein by reference provided that the manner is applicable to the present disclosure.

Figure 4A:
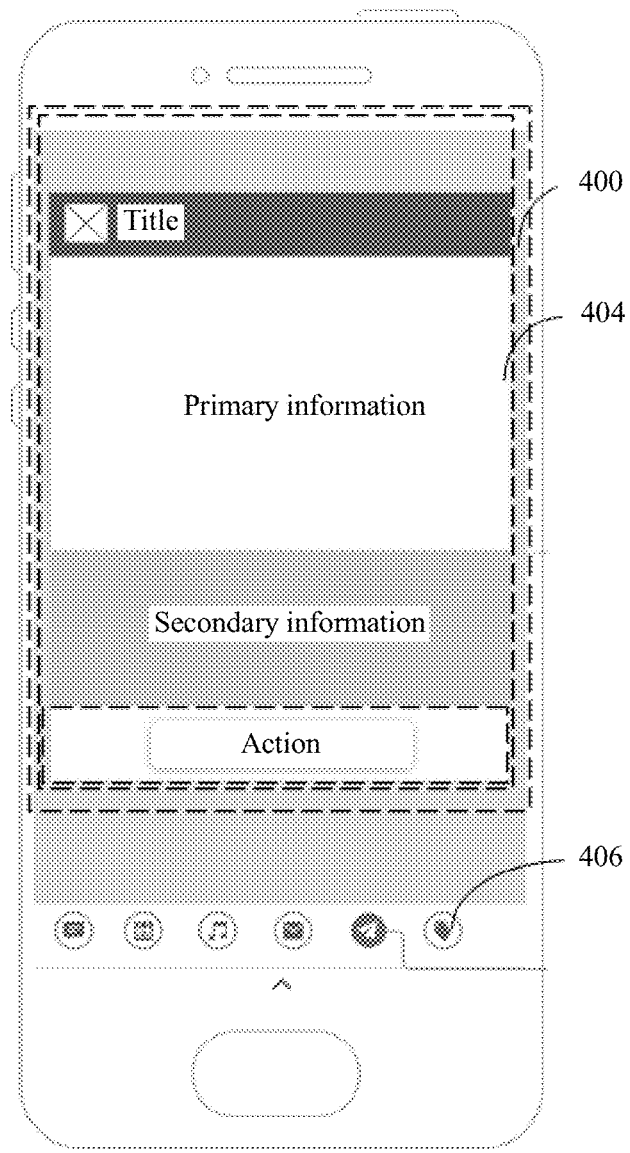
FIG. 4(a) to FIG. 4(h) are schematic diagrams of an interface for pushing a notification according to several embodiments of some specific scenarios.

As shown in FIG. 4(a), a notification interface 400 displayed on a screen of a mobile phone is used as an example. When a message needs to be pushed, a new event display page is generated or an existing event display page is updated based on the event information.

In an optional embodiment, the event display page 404 may be displayed in the notification interface 400 in different manners. For example, when there is only one event display page 404, the event display page is separately displayed in full screen, in other words, the notification interface does not include a notification classification identifier 406 shown in FIG. 4(a). When there are a plurality of event display pages 404, the several event display pages are displayed in a subpage switching manner, in other words, the notification interface includes the notification classification identifier 406 shown in FIG. 4(a), and a corresponding event display page 404 is displayed in a form of a large screen based on a notification classification identifier 406 selected by the user. Still referring to FIG. 4(a), in a preferred embodiment, the event display page 404 may include a title region, a primary information region, a secondary information region, and an action region.

Figure 4B:
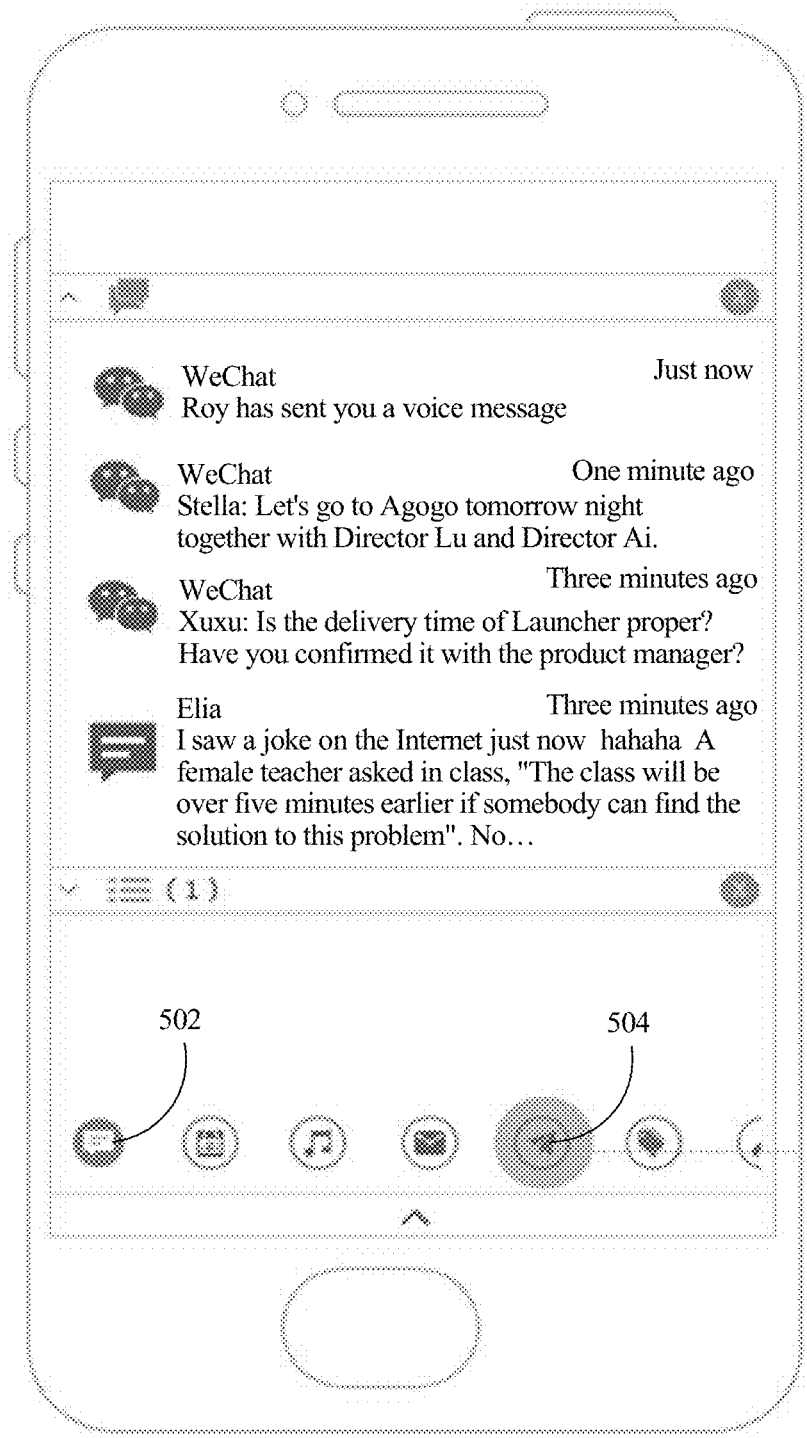
Figure 4C:
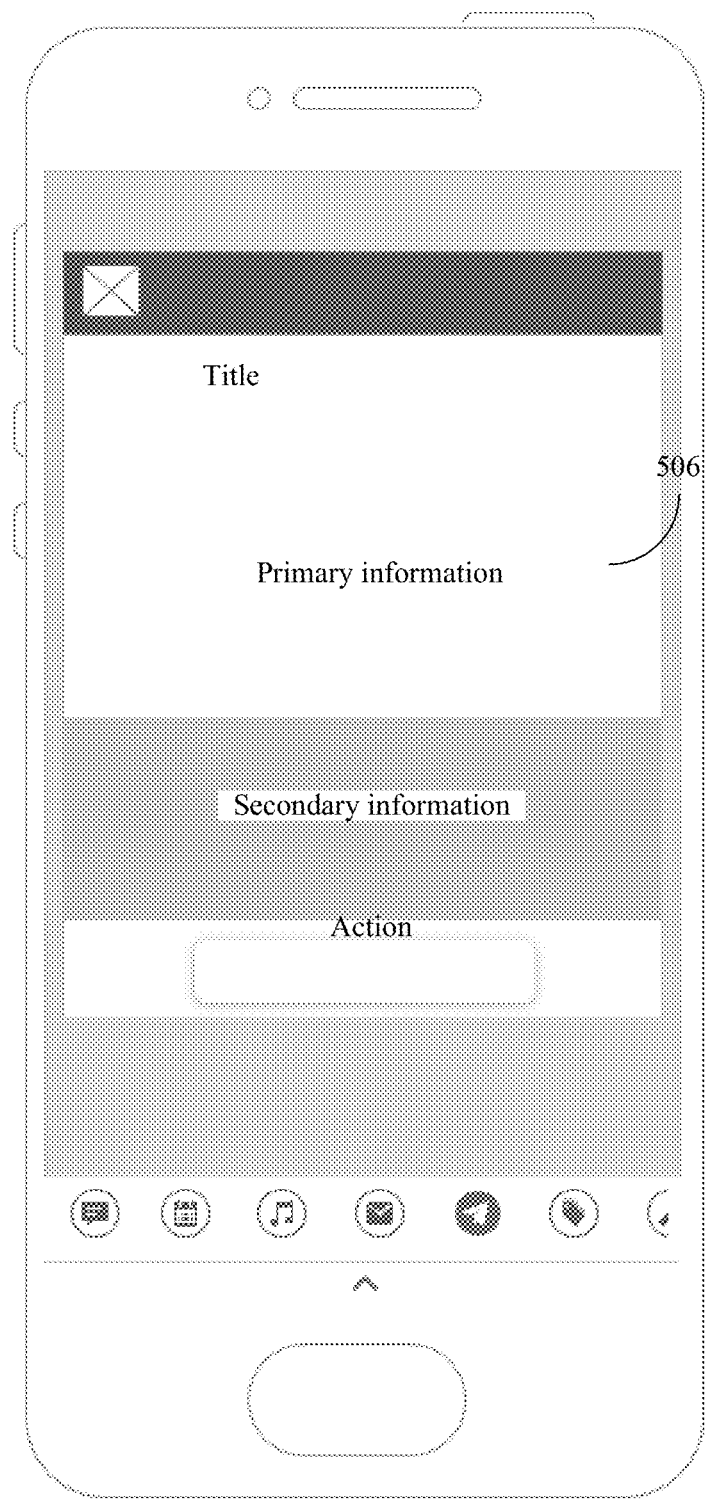

The notification classification identifier 406 may be shown in FIG. 4(a), and is differentiated based on a service type, including but not limited to SMS, email, music, schedule, express, group buying, ticket, and the like. A display form of the notification classification identifier 406 is preferably an icon. A plurality of sub-interfaces of the plurality of event display pages 404 are displayed based on the service type. The user may perform switching between different sub-interfaces by selecting the notification classification identifier 406. As shown in FIG. 4(b), for example, the user is currently in a sub-interface of the "SMS" service type, and an "SMS" service type identifier 502 is in a highlighted state. When the user taps an "express" service type identifier 504, the interface switches to a sub-interface of the "express" service type shown in FIG. 4(c).

Figure 4D:
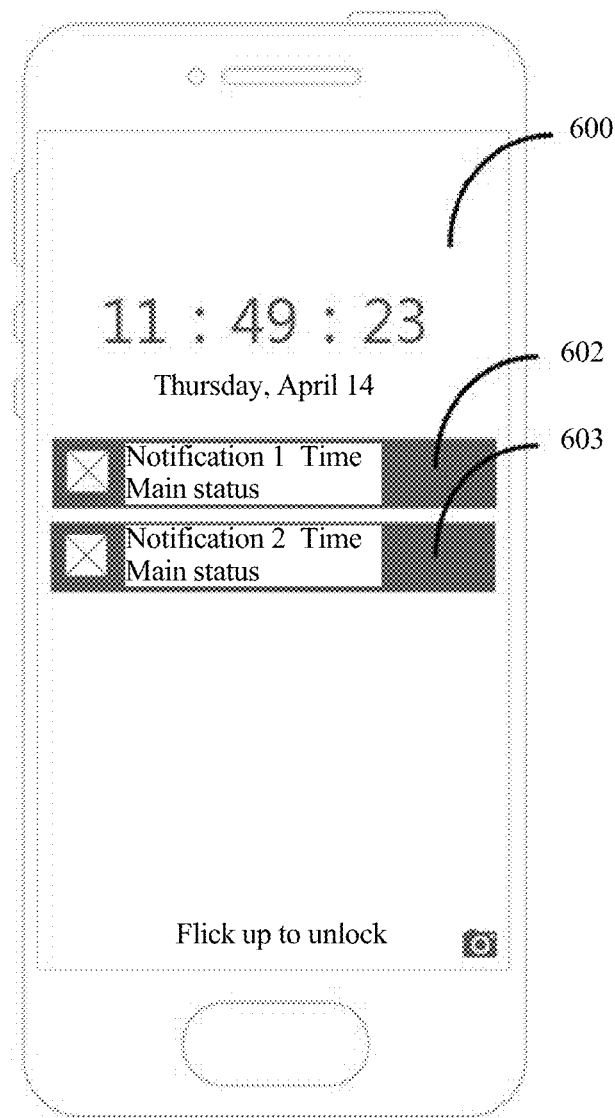
Figure 4E:
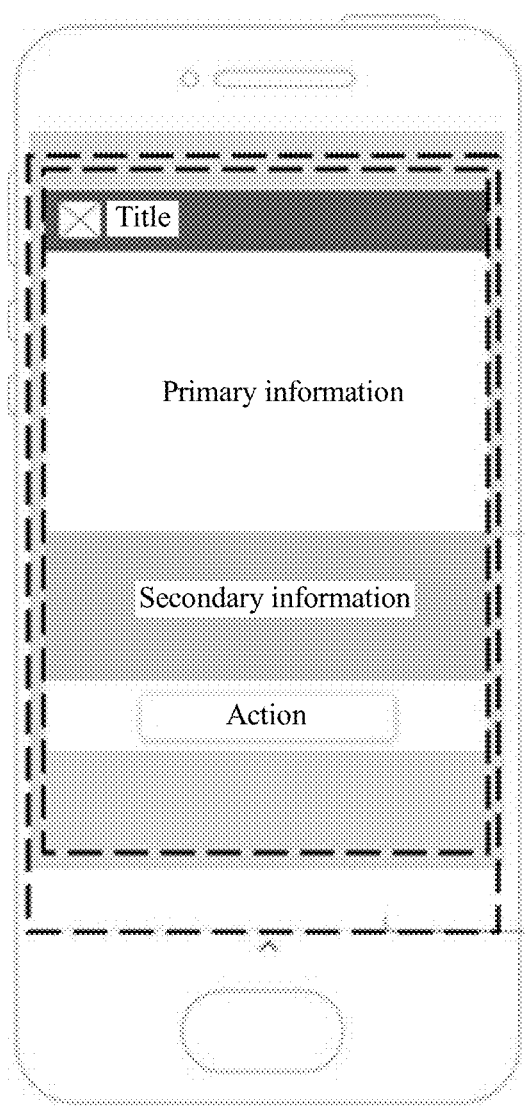

Alternatively, the notification classification identifier 406 may be displayed in the notification interface in a form of a notification list. As shown in FIG. 4(d), the notification interface is a lock screen 600, and notifications 602 and 603 are displayed in a form of a notification list. In the notification interface, when the user taps a corresponding notification list, a corresponding event display page may pop up, or a notification classification display interface may be displayed through jumping. As shown in FIG. 4(e), when the user taps the notification 602, an event display page corresponding to the notification 602 may be displayed through jumping from the current lock screen 600.

Figure 4F:
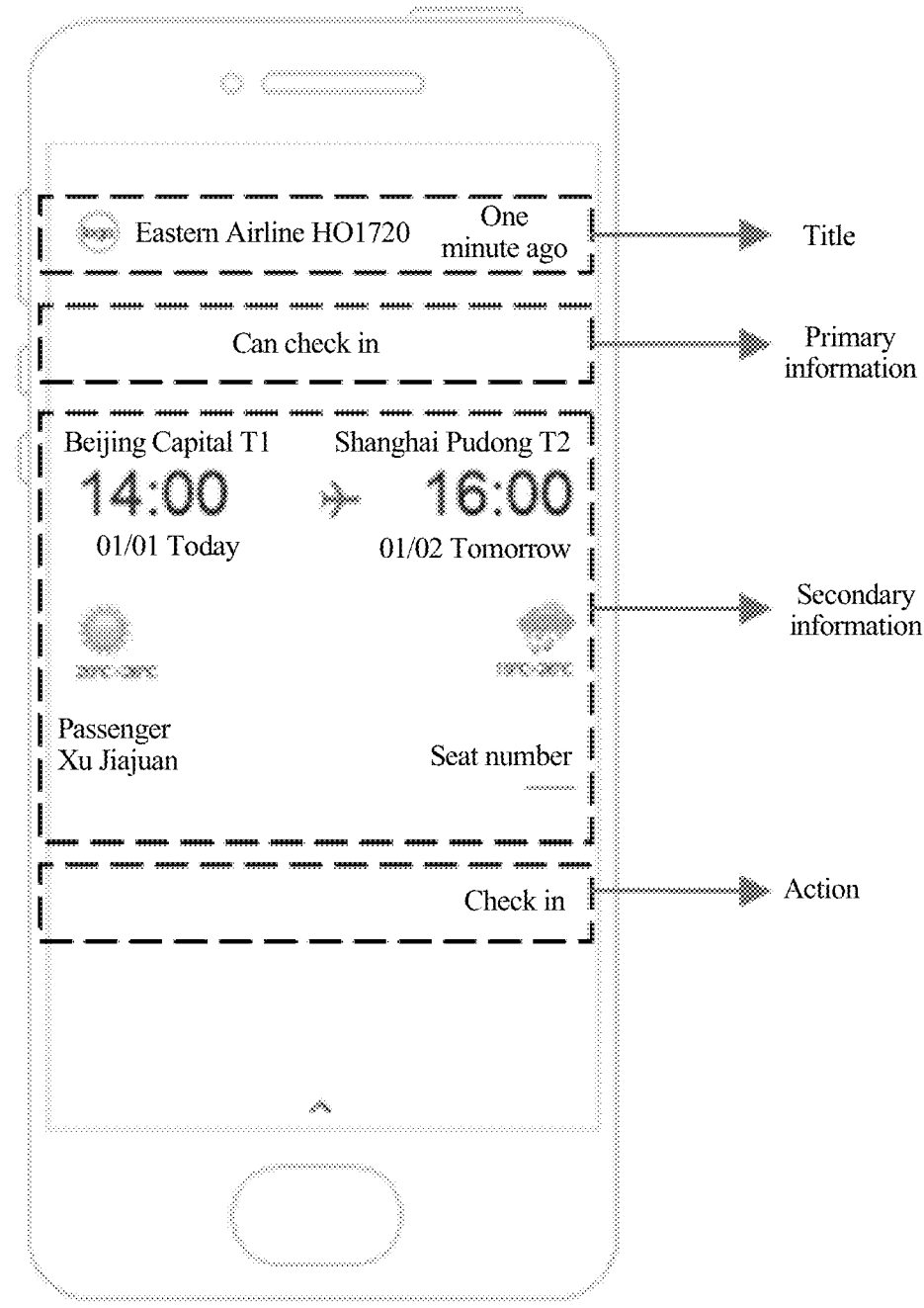

In a specific scenario embodiment, as shown in FIG. 4(f), in a notification interface, a service type is flight ticket. Information such as a trademark of an airline, a flight number, and a push time may be displayed in a title region. Current service status information "Can check in" is displayed in a primary information region. Other service related information such as a departure time and place, weather of the departure place, a landing time and place, weather of the landing place, a passenger name, and a seat number is displayed in a secondary information region. An operation that can be performed by the user in a current service status is displayed in an action region. For example, the user may access a corresponding service website to check in after tapping "Check in".

Figure 4G:
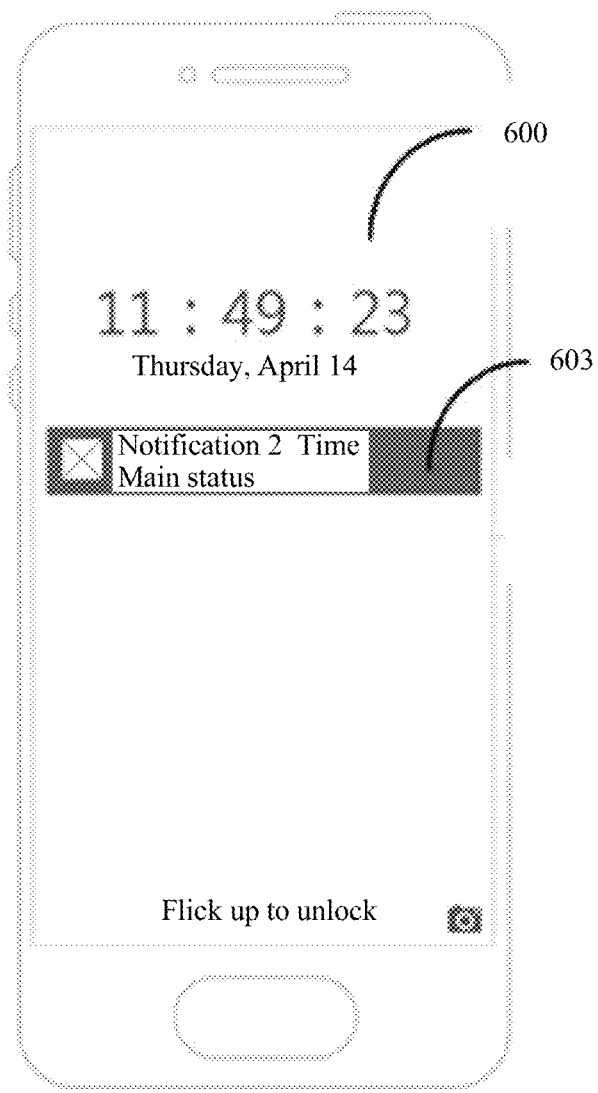
Figure 4H:
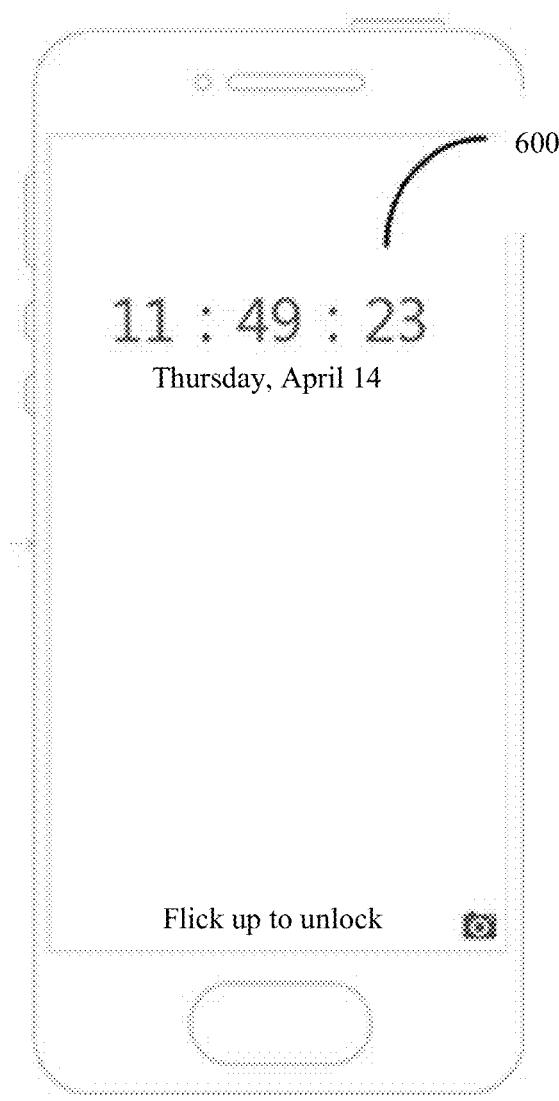
Figure 5A:
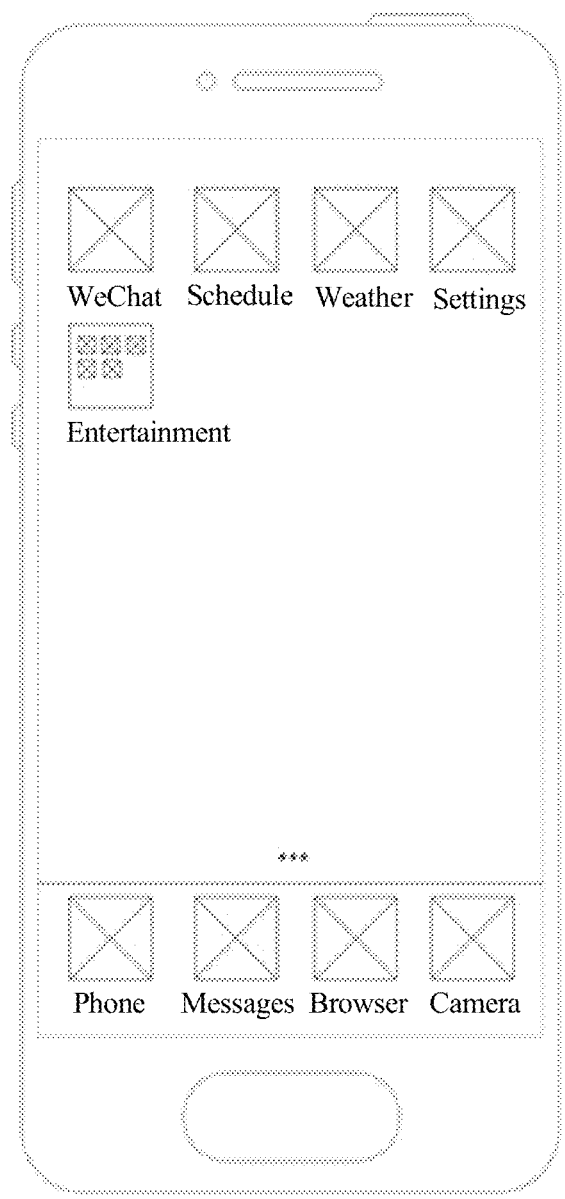
FIG. 5(a) to FIG. 5(c) are schematic diagrams of an interface for pushing a notification in a current display interface in an unlocked state according to some embodiments.
Figure 5B:
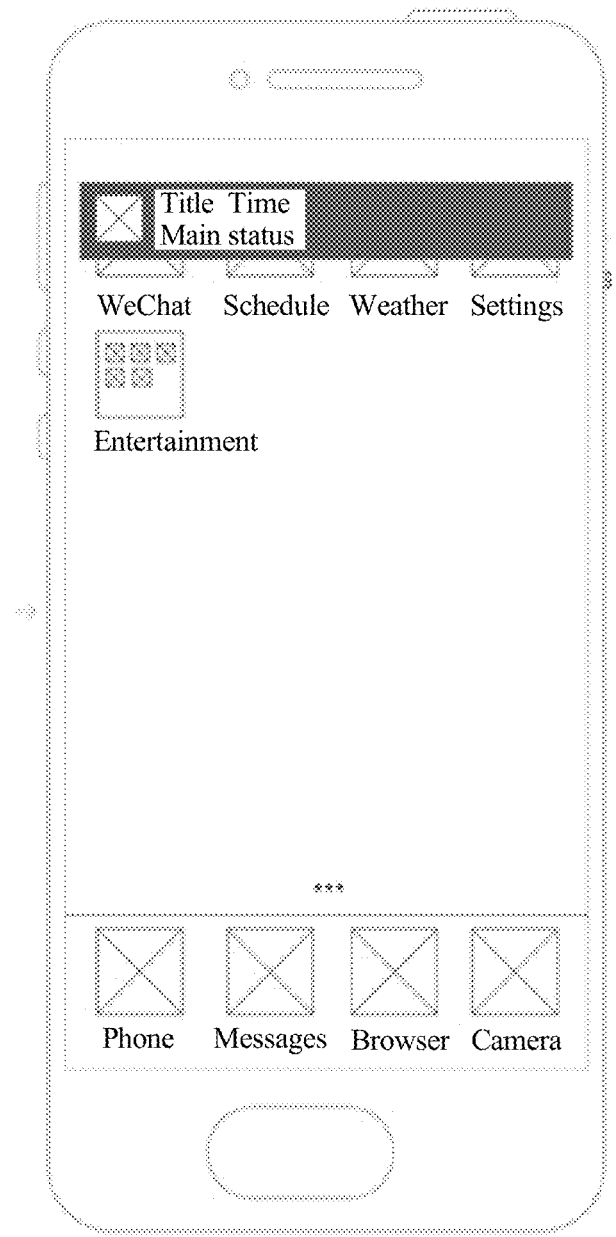
Figure 5C:
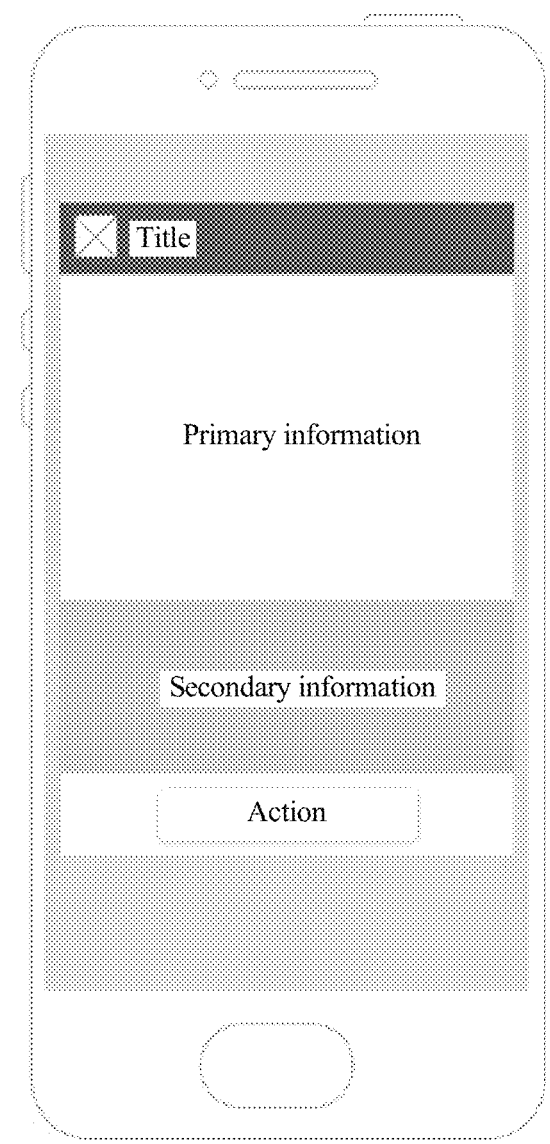
Figure 5D:
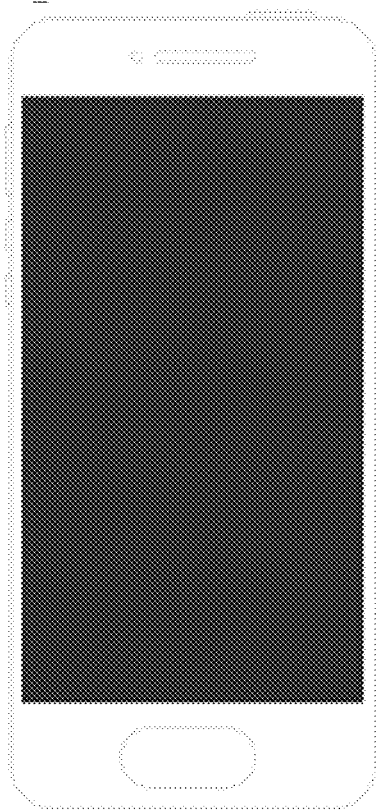
FIG. 5(d) to FIG. 5(h) are schematic diagrams of an interface for pushing a notification on a lock screen according to some embodiments.
Figure 5E:
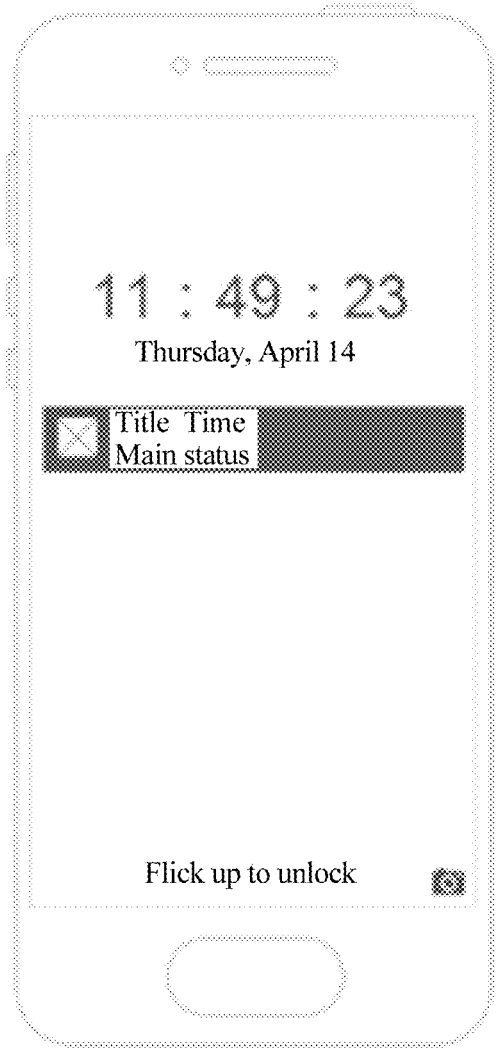
Figure 5F:
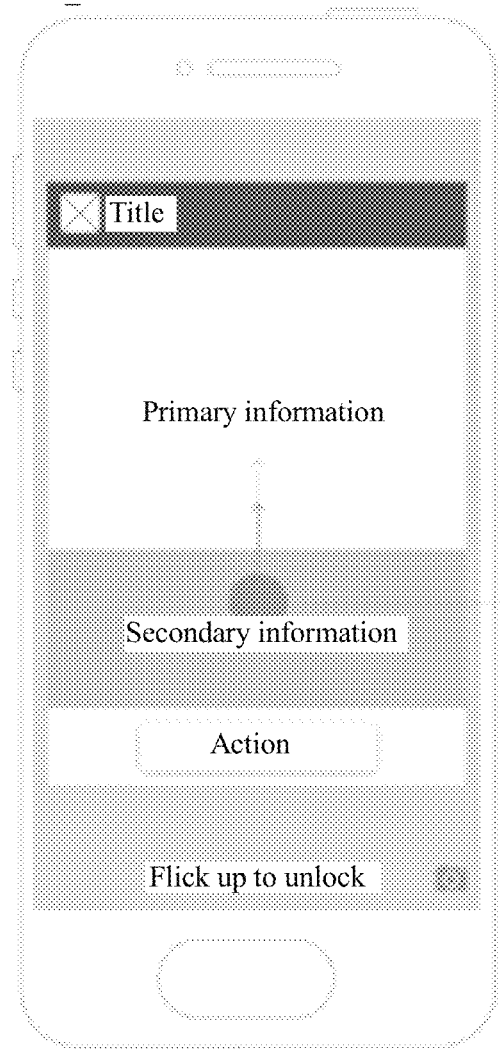
Figure 5G:
Figure 5H:
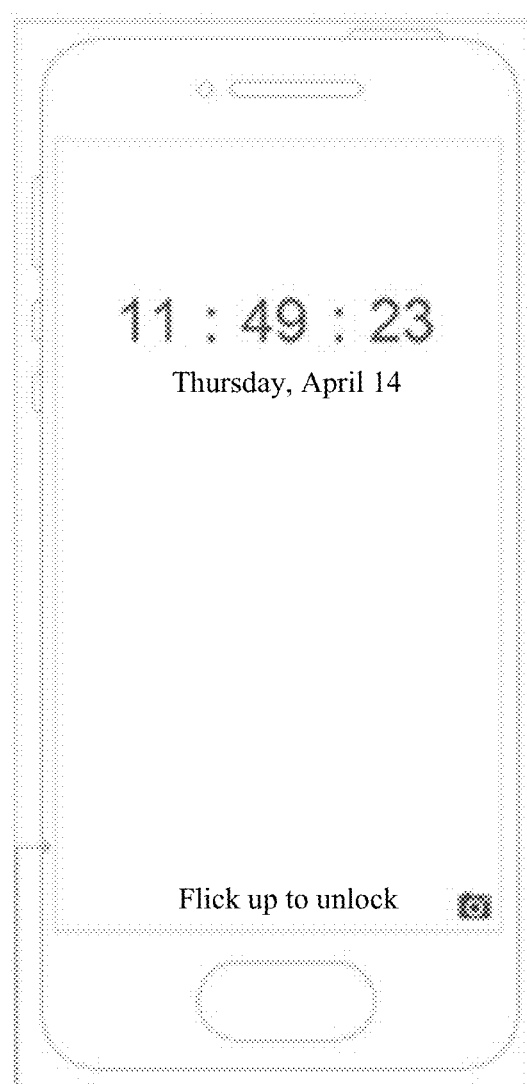
Figure 5I:
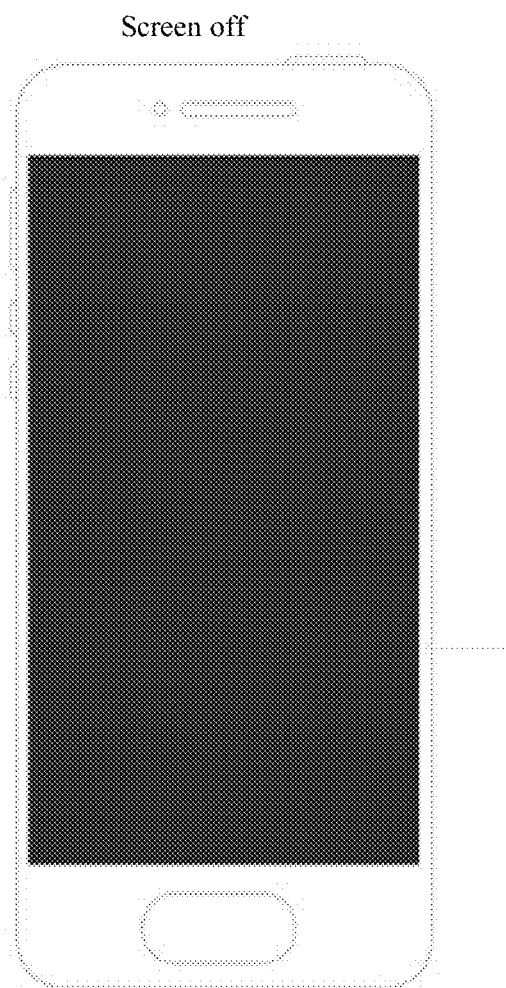
FIG. 5(i) to FIG. 5(l) are schematic diagrams of an interface for pushing a notification on a lock screen according to some embodiments.
Figure 5J:
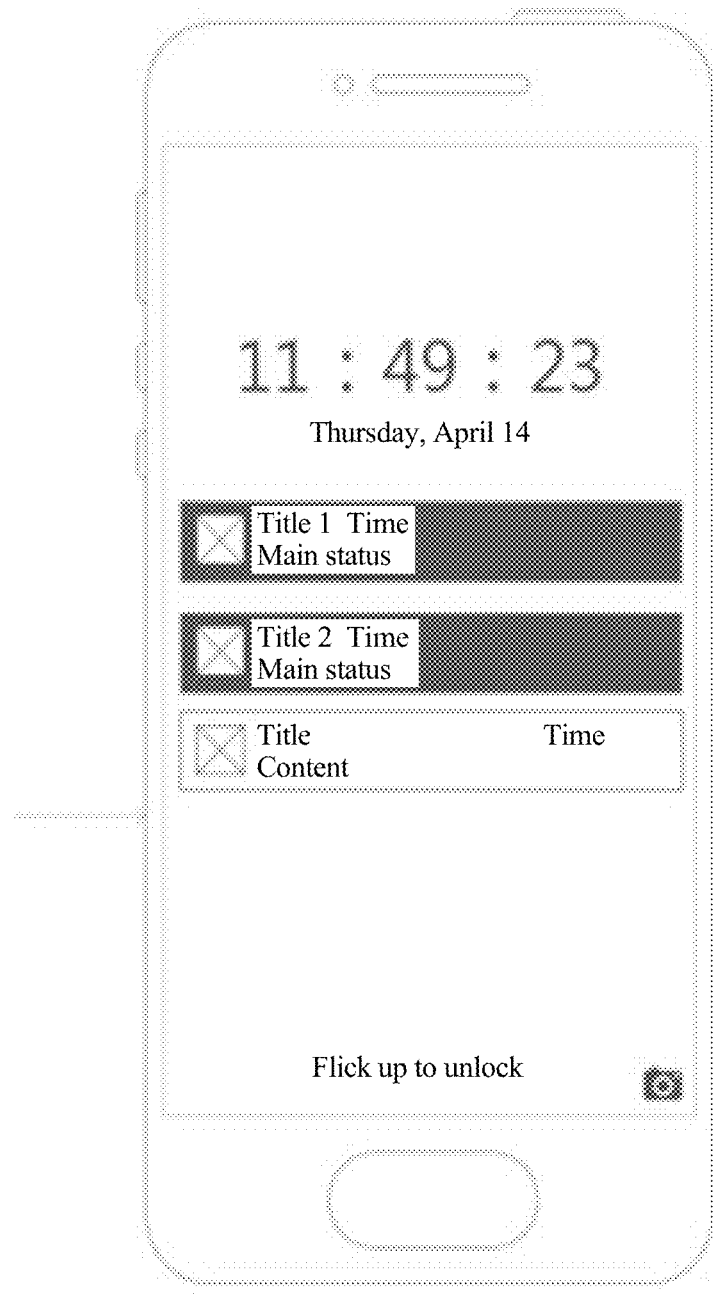
Figure 5K:
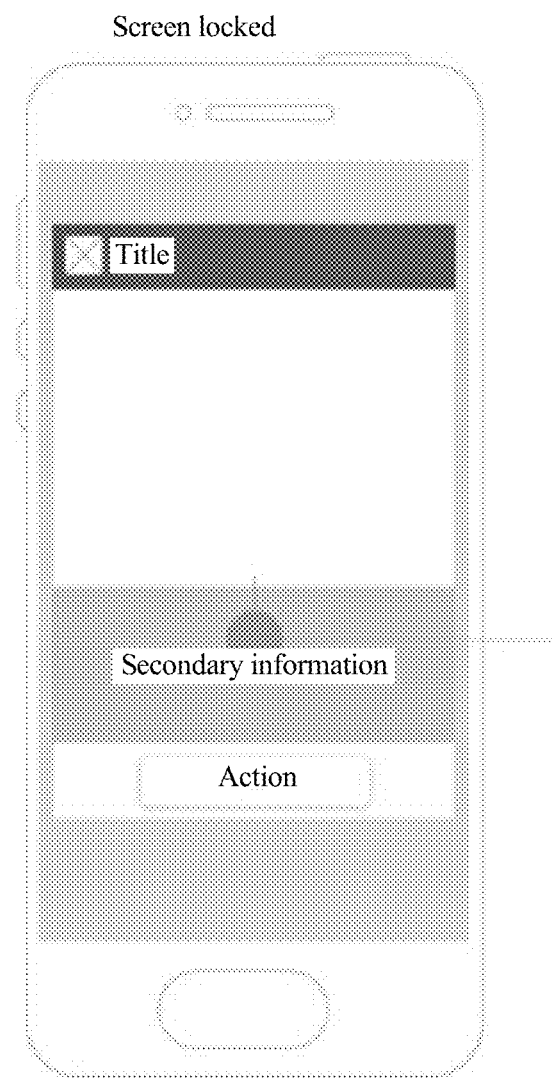
Figure 5L:
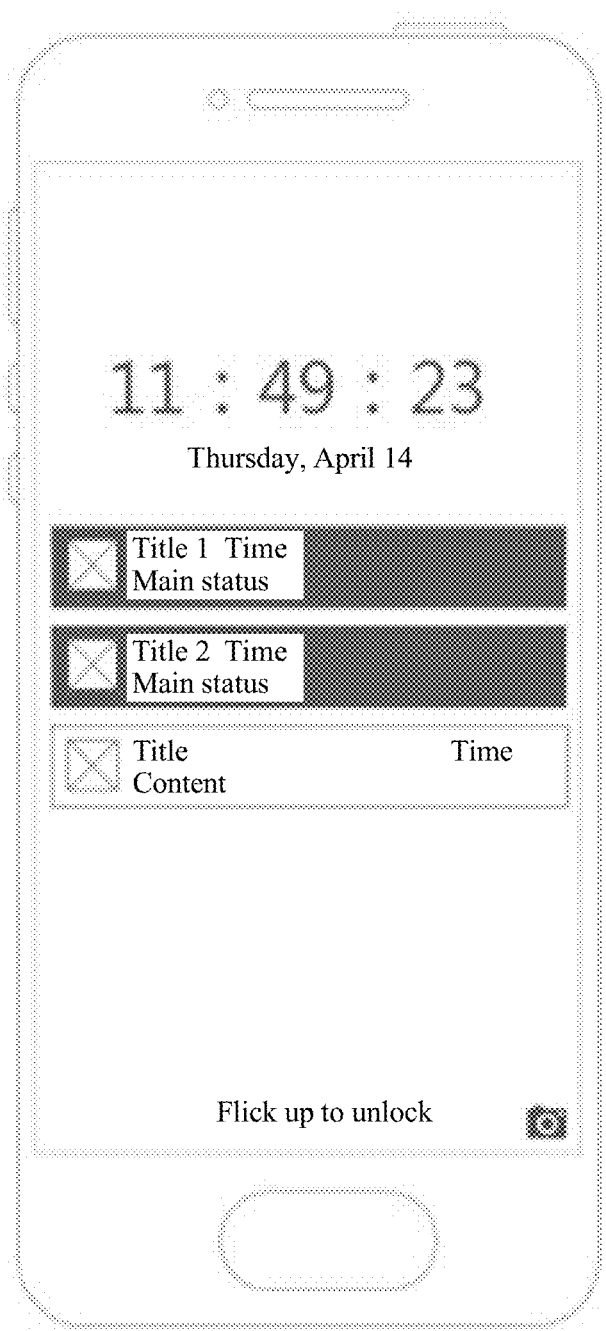

Still referring to FIG. 4(d), if the mobile terminal is currently on the lock screen 600, two displayed notifications 602 and 603 are displayed in the interface, and a decision module determines, by using data collected by an information module, that the notification 602 needs to be cleaned, the existing notification 602 on the lock screen 600 and an event display page corresponding to the notification 602 are deleted, as shown in FIG. 4(g). Subsequently, if the decision module further determines that the notification 603 needs to be cleaned, the existing notification 603 on the lock screen 600 and an event display page corresponding to the notification 603 are deleted, there is currently no notification, and no notification needs to be displayed on the lock screen, as shown in FIG. 4(h).

Figure 6:
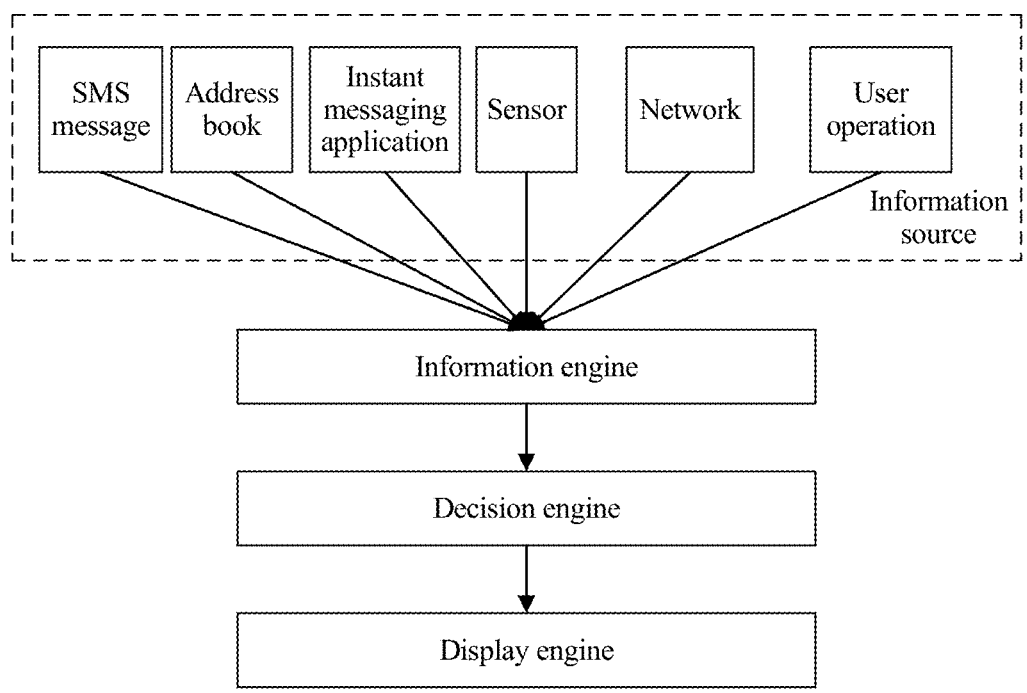
FIG. 6 is a schematic structural diagram of a data engine for pushing a notification according to an embodiment of some specific scenarios.

As shown in FIG. 6, an apparatus provided in some specific scenario embodiments may be a data engine (Data Engine) installed on a mobile terminal with a display apparatus, and the data engine may include an information engine module, a decision engine module, and a display engine module.

Preferably, the data engine is installed on a device such as a mobile phone, a tablet computer, or an intelligent wearable device. The mobile phone is used as an example. The data engine collects statuses of various services on the mobile phone (a service application corresponding to the service may not be running), and determines, based on current context information of a user, whether a message notification needs to be pushed to the user. Content of the message notification and a supported interaction operation vary with a context. The message notification is directly displayed to the user on a lock screen in a form of a relatively large image. The user may directly view current service information on the lock screen by lighting up a screen, or the user may directly perform some optional interactions on the lock screen.

When an environment change or a user operation is detected, or it is detected that a notification is pushed from a network or the information engine module triggers itself to collect event information, the information engine module collects data from service applications, including but not limited to SMS, an address book, an instant messaging application (including but not limited to WeChat), a sensor, a taxi hailing APP (Application, application), a ticket APP (a vehicle ticket, a flight ticket, or a movie ticket), a weather APP, a music APP, a group buying APP, a travel APP, and the like, to provide data support for subsequent behaviors of the decision engine module.

The decision engine module determines whether a current environment condition meets a preset condition. If the current environment condition meets the preset condition (a time, a place, weather, an environment, and the like), the decision engine module determines to push or update information or cancel information display to the display engine module, determines information that is to be pushed or updated or whose display is to be canceled, determines an operation that the user is allowed to perform in a current interface (for example, the user is allowed to open taxi hailing software or open a map in this interface), and determines an occasion on which information is to disappear.

The decision engine module determines, in the following cases, whether the current environment condition meets the preset notification condition: The information engine module reports the collected data to the decision engine module, and the decision engine module determines, based on a service type, that an estimated time corresponding to the service type arrives (for example, if the user has reserved a flight ticket, the decision engine module reminds, one day in advance, the user to check in, and reminds, two hours in advance, the user to go to an airport, where one day or two hours is an estimated time determined based on a flight ticket reservation service).

Figure 7A:
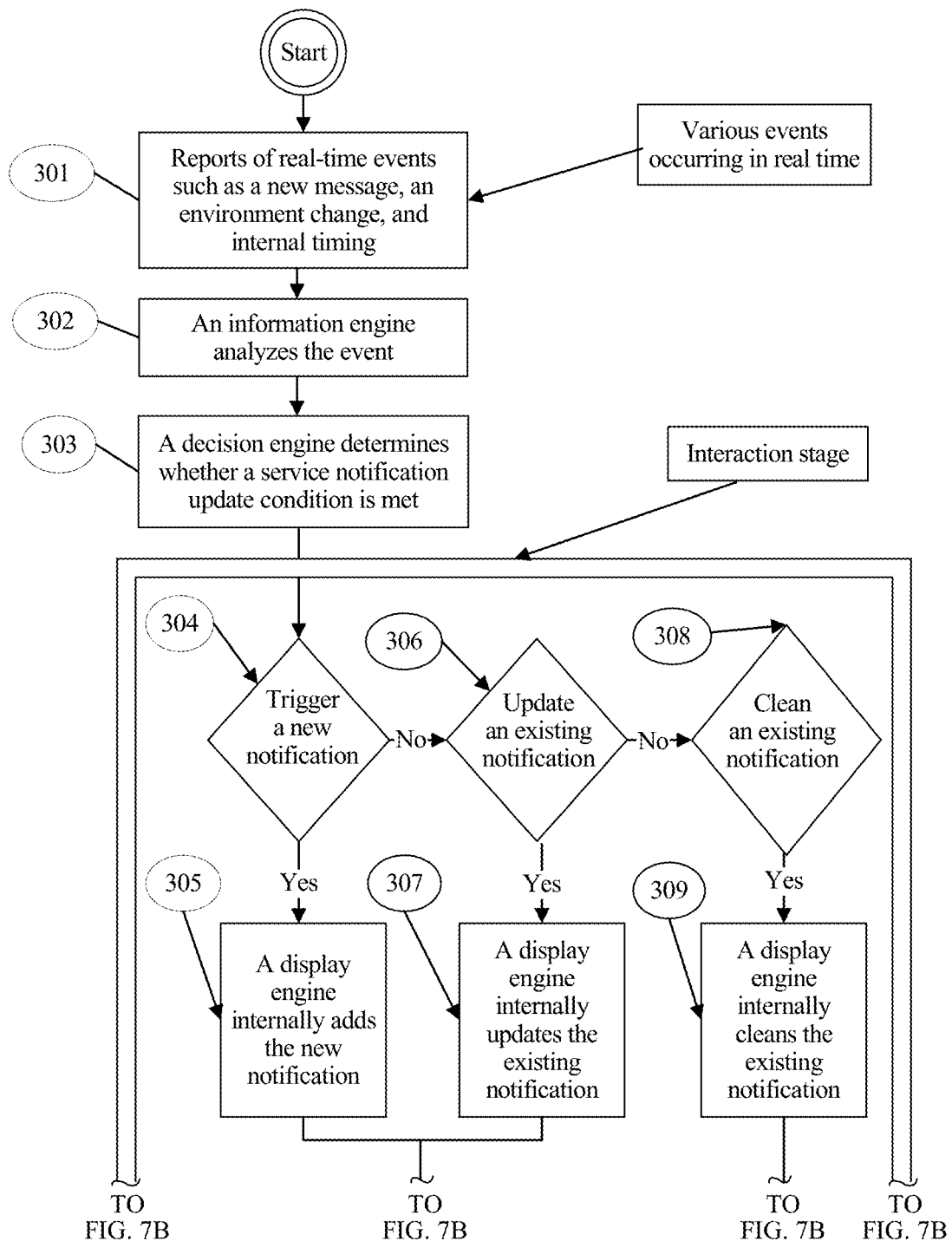
FIG. 7A and FIG. 7B are a schematic flowchart of pushing a notification according to an embodiment of some specific scenarios.
Figure 7B:
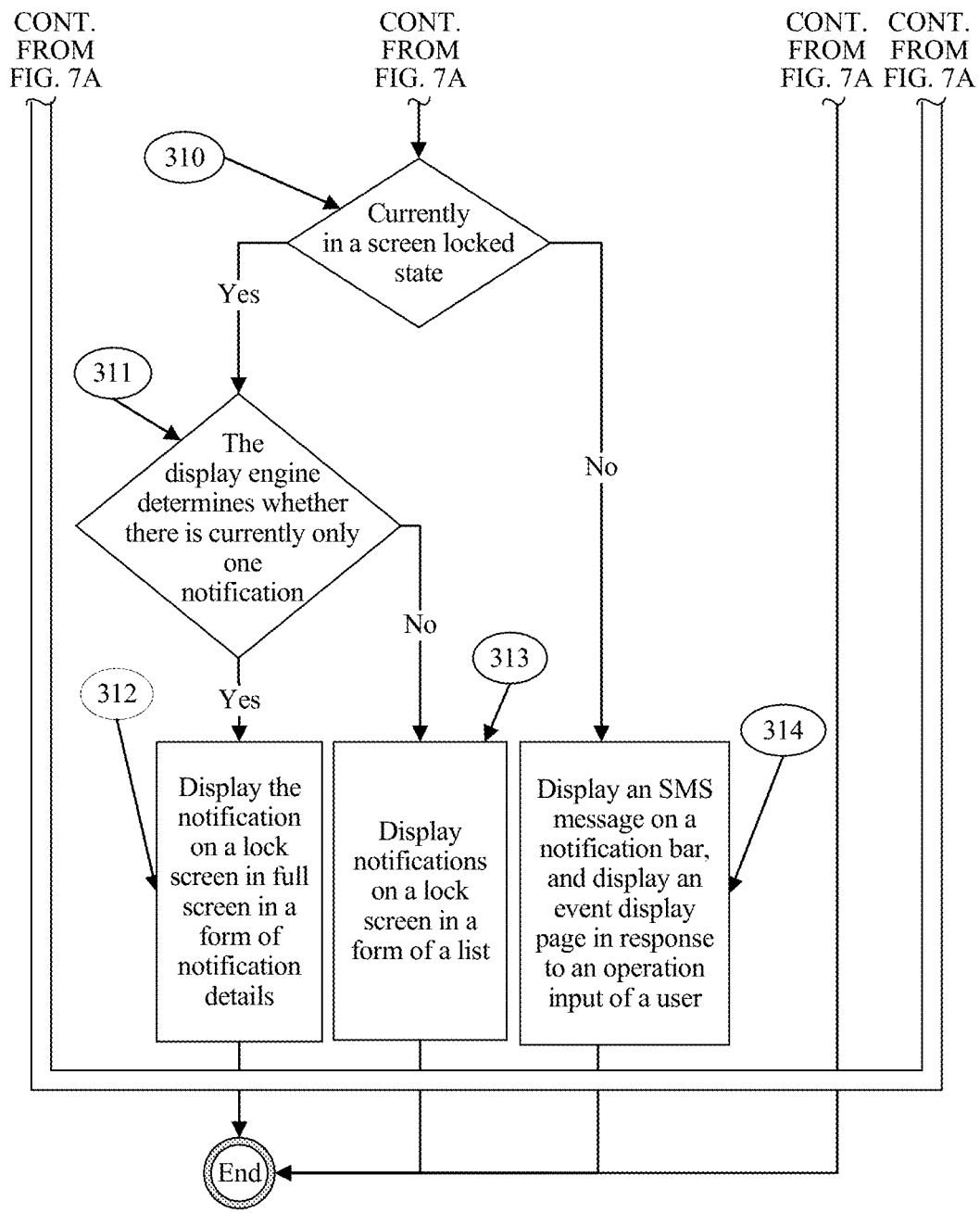

FIG. 7A and FIG. 7B show a detailed notification push process in which a data engine installed on a mobile phone is used as an example according to an embodiment of the present disclosure.

Specifically, in step 301, when various events occur in the mobile phone in real time, reports of real-time events such as a new message, an environment change, and internal timing are received. The report events include a new message, a new email, mobile phone environment change information (including but not limited to light, a temperature, an acceleration, gravity, a GPS, and the like that are provided by a sensor module), an internal timing reminder (a timing reminder that is set by a module such as a decision engine module), and a user operation behavior event (for example, a user hails a taxi, or a user buys a flight ticket). The report events trigger an information engine module to collect event information.

When detecting that the mobile phone receives a new message, a new email, or the like, the information engine module analyzes content of the new message, the new email, or the like, to determine whether a type of the report event is service-type content. If the type is service-type content, the information engine module triggers information collection. When the information engine module detects that the user performs a related operation in some service applications such as a taxi hailing APP, a ticket APP (a vehicle ticket, a flight ticket, or a movie ticket), a weather APP, a music APP, a group buying APP, and a travel APP, the information engine module triggers information collection. In addition, when an existing service exists on the mobile phone, a to-be-obtained environment parameter is determined based on a service type. When the environment parameter changes, the information engine module also triggers information collection. In addition, the information engine module may periodically trigger information collection.

In step 302, the information engine module analyzes the event. After being triggered by various report events, the information engine module analyzes and determines an event type, and makes analysis based on the event type. Analyzed content includes but is not limited to a current user operation, current environment information, user motion information, a current service status, a hardware status, user attribute information, and the like. The information engine module determines at least one notification trigger parameter, and then transmits an analysis result to the decision engine module for subsequent action decision.

The current environment information includes but is not limited to a current time, a current place, environment brightness learned through analysis based on information provided by a light sensor, information indicating that GPS information of the user is converted into a location, information indicating that a home keyword is converted into a specific address, and a current transportation means (determined based on a speed and a posture of the user by using a preset rule). The user motion information includes but is not limited to a user motion direction that is learned by a direction sensor through analysis, the speed of the user that is learned through analysis based on an acceleration, and a user motion status (walking, running, riding, sleeping, stationary, taking a bus, or driving). Service information includes but is not limited to ticket information (messages, emails, and the like related to tickets such as a vehicle ticket, a flight ticket, and a movie ticket), a destination (including a destination entered by the user in a map analysis program, a place in an SMS message related to flight ticket reservation and hotel reservation, a place of a home or a company during a commute, or the like), a time of arrival at the destination (estimated based on a distance between a current user location and the destination and a traffic condition), and a service status (flight ticket: check-in, departure, arrival at an airport, luggage storage, and the like; hotel: check-in, unlocking, and the like; train ticket: waiting, about to depart, departure, arrival, and the like; movie ticket: redemption, seat guidance, and the like; an express status: collected, being delivered, to be picked up, signed, and the like; and taxi hailing: being dispatched, driver sets off, taxi arrives, travel starts, to pay, and the like). In addition, the user attribute information includes but is not limited to a user characteristic (a gender, an age, a height, a weight, a nationality, and the like), and the like.

In step 303, the decision engine module determines whether a service notification update condition (namely, a preset notification condition) is met. The decision engine module monitors real-time environment information in the notification trigger parameter based on the analysis result provided by the information engine module, and determines whether the real-time environment information meets any preset notification condition for pushing a new notification, updating an original notification, cleaning an original notification, or the like (the preset notification condition includes but is not limited to conditions such as a specific time range, place range, environment status, service status, and user motion status). When the condition is met, the decision engine module notifies the display engine module of a decision result, including information such as a notification type (new notification/notification updating/notification cleaning), a service type, a service status, and an operation allowed in a notification.

A specific process in which the display engine module pushes a new notification, updates a notification, or cleans a notification is as follows:

In step 304, when a preset time range (for example, the user is reminded to perform online check-in one day before departure), place range (for example, the user is prompted with hotel information in a hotel range, or the user is reminded to board near an airport), service status (starting to hail a taxi), hardware status (for example, an earphone is inserted or Bluetooth is enabled for music reminding), and the like are met, a new service reminder is pushed and step 305 is performed to add a new notification and generate a corresponding event display page.

In step 306, when event information corresponding to an existing service exists on the mobile phone, a to-be-obtained environment parameter is determined based on a service type. When an environment parameter change meets a notification update trigger condition of the service, for example, meets a preset time range (for example, the user is reminded, approximately two hours in advance, to set off), place range (for example, the user is prompted with a luggage carousel when arriving at a destination airport), or service status (for example, the user has been on a taxi), new content is pushed to replace an original reminder, and step 307 is performed to update original notification display content, in other words, update a corresponding event display page.

In step 308, when event information corresponding to an existing service exists on the mobile phone, a to-be-obtained environment parameter is determined based on a service type. When an environment parameter change meets a notification cleaning trigger condition of the service, for example, meets a specific time range (for example, a taxi hailing notification automatically disappears 10 minutes after a fee for taxi hailing has been paid and the user has not confirmed the payment), place range (for example, a flight ticket notification automatically disappears when the user leaves a destination airport), or service status (for example, a notification disappears after the user gets out of a taxi, completes payment, and confirms the payment), step 309 is performed to clean original notification display content.

The display engine module dynamically displays information to the user according to a specific interaction specification based on information pushed by the decision system.

In a preferred embodiment, the interaction specification is as follows: After step 305 and step 307, step 310 is performed to determine whether the mobile phone is currently in a screen locked state. If yes, step 311 is further performed to determine whether there is only one event display page. If yes, step 312 is performed to display notification details of the time on a lock screen in full screen and display the notification in a notification classification display interface. If there are a plurality of event display pages in step 311, step 313 is performed to generate, on the lock screen based on the plurality of display pages, the plurality of event display pages and classification icons that are used for display switching and that correspond to the event display pages, display the notifications in a form of a notification list, and also display the notifications in a notification classification display interface. If it is determined in step 310 that the mobile phone is currently in an unlocked state and is not in a screen locked state, step 314 is performed to display the notifications in a notification classification display interface and also display a reminder message on a notification bar.

FIG. 8(a) to FIG. 8(h) are schematic diagrams of an interface for pushing a notification at each stage according to an embodiment of a first specific scenario in the present disclosure. With reference to FIG. 6 and FIG. 7A and FIG. 7B, the following describes a notification push process by using an event of taking an airplane after a flight ticket is successfully reserved as an example according to the embodiment of the specific scenario provided in the present disclosure.

In step 301, an information engine module detects that a mobile phone receives a new message or a new email, and analyzes information in the new message or the new email, to determine that the information is service-type content and a service type is ticket, and specifically, flight ticket. Alternatively, in step 301, an information engine module detects that a user has performed an operation such as reservation or collection in a ticket application (for example, a flight ticket reservation application). In this case, the information engine module is triggered to collect event information. Specifically, the information engine module collects the event information based on a flight ticket reservation SMS message, ticket information collected by the user, a flight ticket email reminder, or the like.

In step 302, the information engine module analyzes the event information, seeks specific flight information from a cooperative service provider (for example, an airline or a flight ticket reservation application) based on information such as a flight number and a date in the event information, and determines the ticket information. Information about a flight ticket reserved for the user specifically includes the flight number, a departure place, a destination, a departure time, a landing time, a passenger name, an identity card number, a departure airport, a destination airport, the airline, and the like. The information engine module transmits a result of analyzing the event information to a decision engine module for subsequent action decision.

In step 303, the decision engine module determines, through analysis, whether the analysis result meets a preset service notification condition. The decision engine module sets an internal timing reminder based on the collected flight departure time and an advance (for example, 24 hours before the departure time). When the timing arrives, the decision engine module further determines, based on real-time information collected by the information engine module, that the user can check in online for a reserved flight, and determines that a preset service place notification condition is met. In this case, the decision engine module pushes notification details of a check-in reminder to a display engine module.

Then the display engine module displays, to the user according to an interaction specification, the notification details pushed by the decision engine module.

Figure 8A:
FIG. 8(a) to FIG. 8(h) are schematic diagrams of an interface for pushing a notification at each stage according to embodiments of some specific scenarios.

With reference to FIG. 8(a), the display engine module may display the notification details on a lock screen in a screen locked state. The mobile phone is currently in a screen locked state, and therefore an event display page is displayed on the lock screen in full screen in a form of notification details. The event display page includes information such as the flight number, a flight state "can check in", the departure time, the departure place, the landing time, a landing place, weather of the departure place, weather of the landing place, the passenger name, and a seat number. In addition, the event display page includes an action region "Check in". After tapping "Check in" in the action region, the user can perform a check-in operation on a corresponding website or application.

Figure 8B:
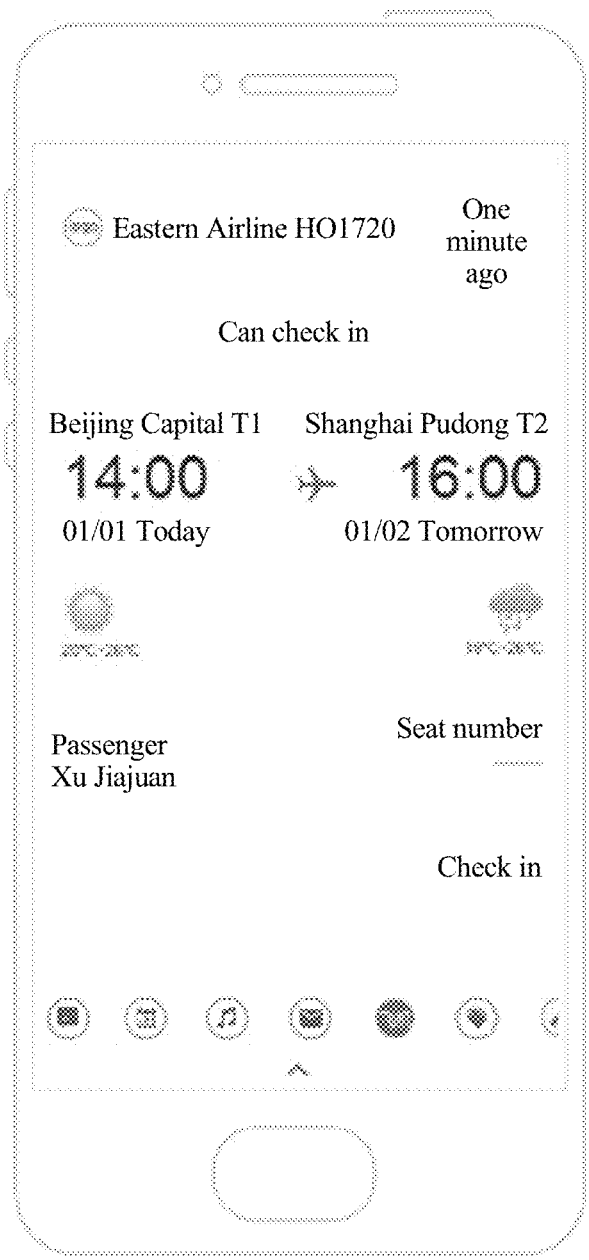

In addition, for example, when a notification classification interface includes a plurality of event display pages of notification details, with reference to FIG. 8(b), a reminder is provided through classification display, and several classification icons are displayed below the event display page. Each classification icon corresponds to one event display page, and when the user taps a classification icon of "Airplane", an event display page about a flight ticket shown in FIG. 8(b) is displayed through jumping from the lock screen.

When an event display page about a flight ticket service exists on the lock screen of the mobile phone, the information engine module collects a corresponding notification push trigger parameter, including environment parameters "time" and "place", based on the service type. The decision engine module performs determining based on real-time environment information in the collected notification push trigger parameter, where the real-time environment information includes a current time, a user place (determined based on a GPS, an operator network, and Wi-Fi), and a time (estimated based on a map and a road condition) required from the current place to the airport.

The following shows a schematic diagram of an interface at each reminder stage in an event development process by using a specific scenario example.

Figure 8C:
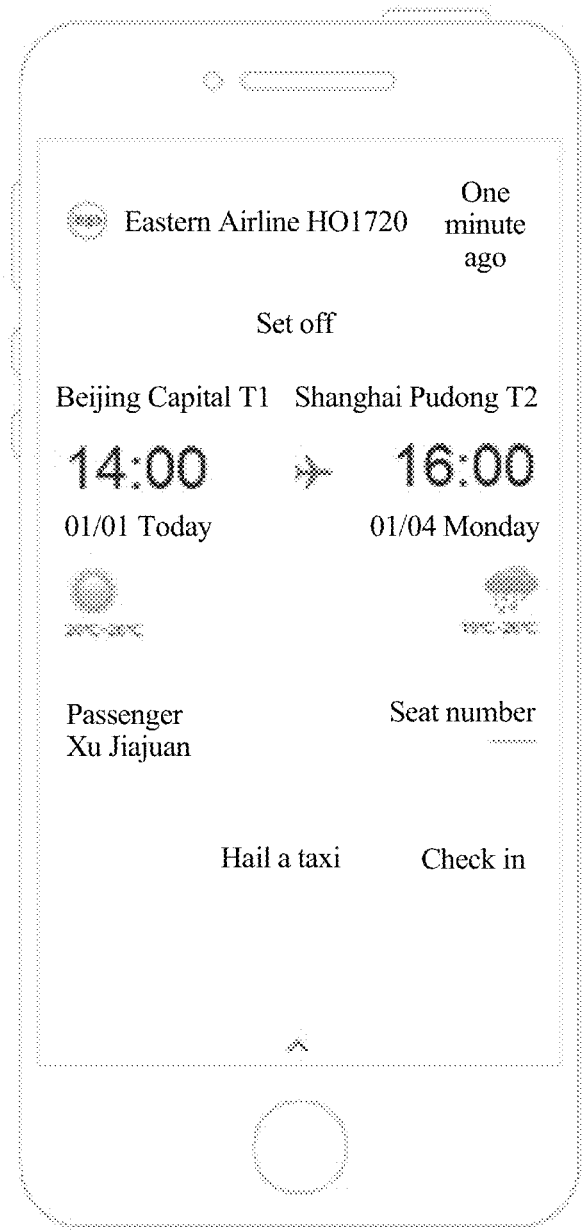
Figure 8D:
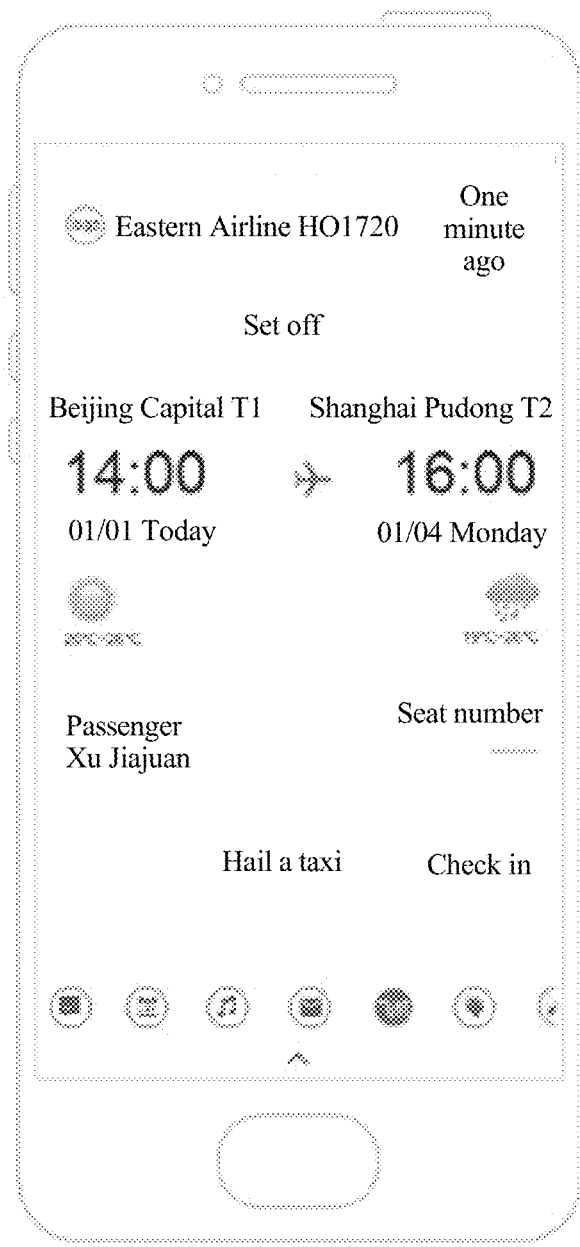
Figure 8E:
Figure 8F:
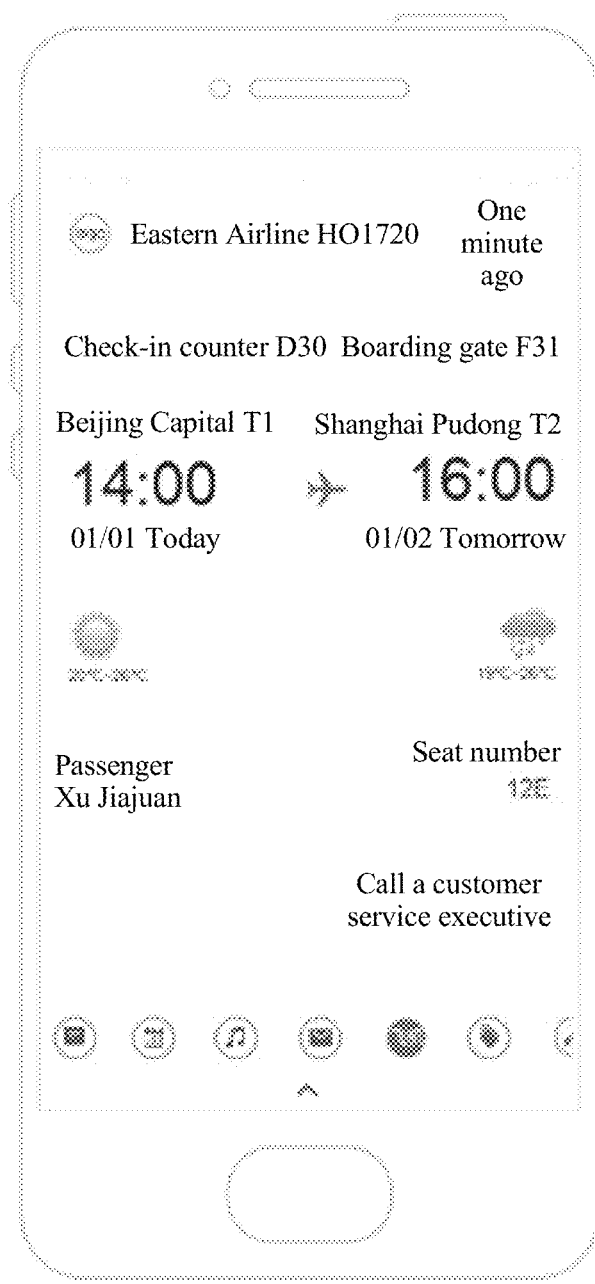
Figure 8G:
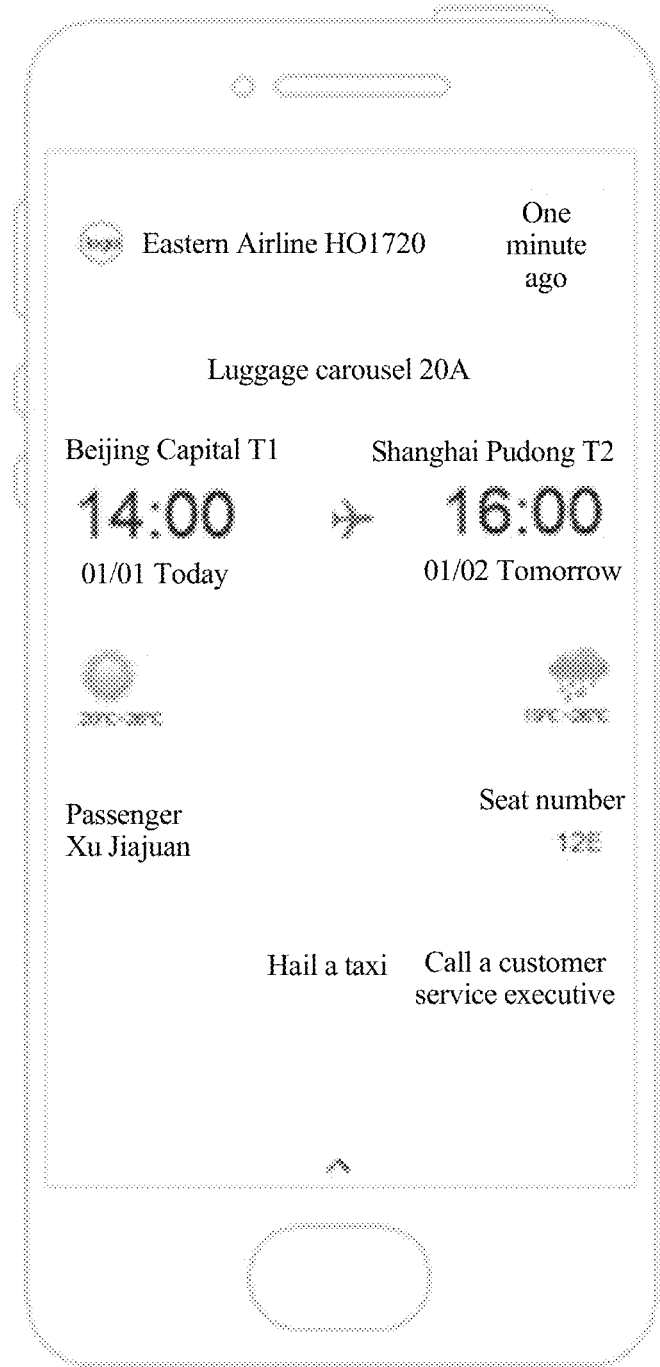
Figure 8H:
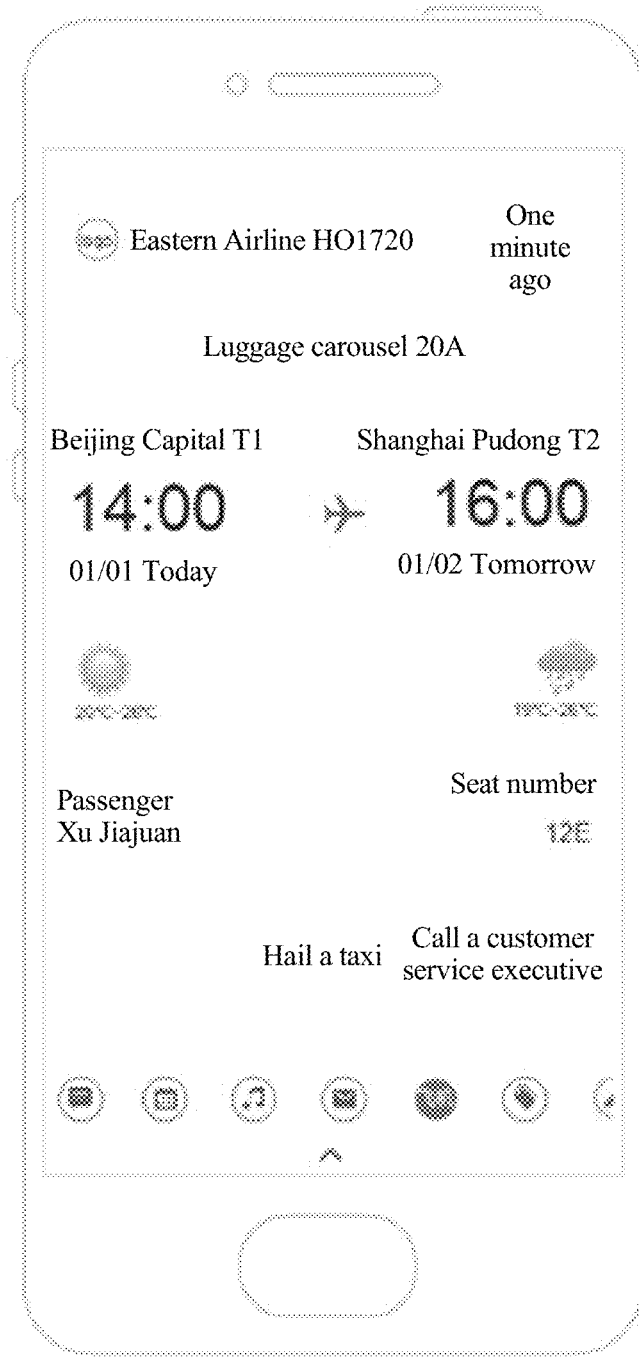
Figure 9A:
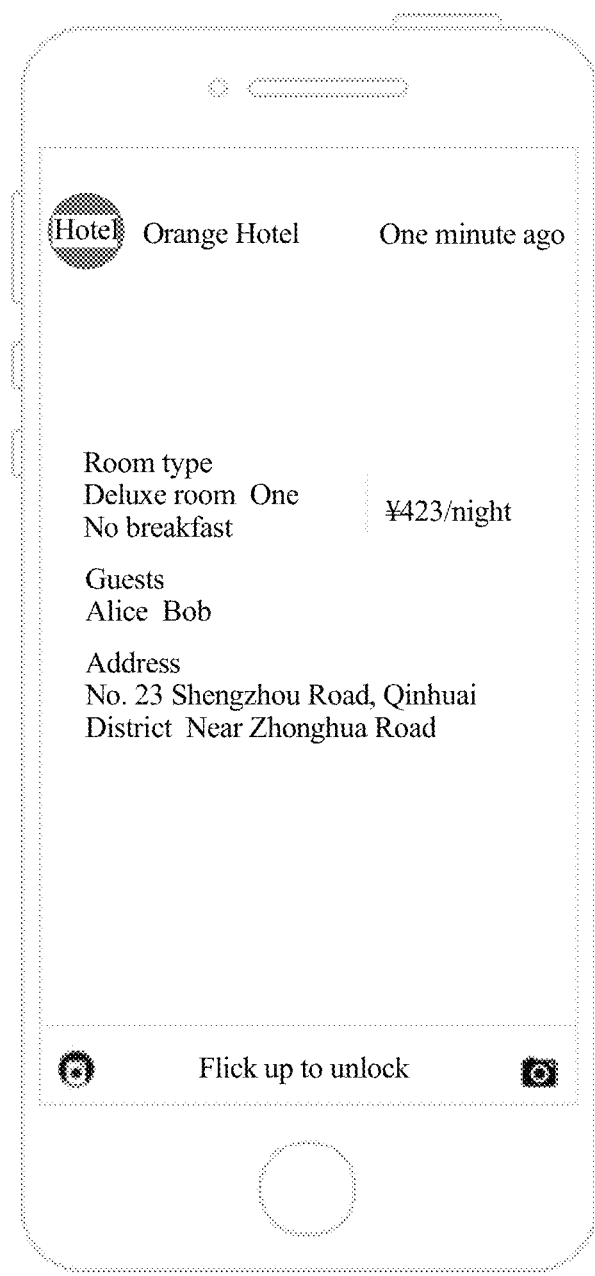
FIG. 9(a) to FIG. 9(d) are schematic diagrams of an interface for pushing a notification at each stage according to embodiments of some specific scenarios.
Figure 9B:
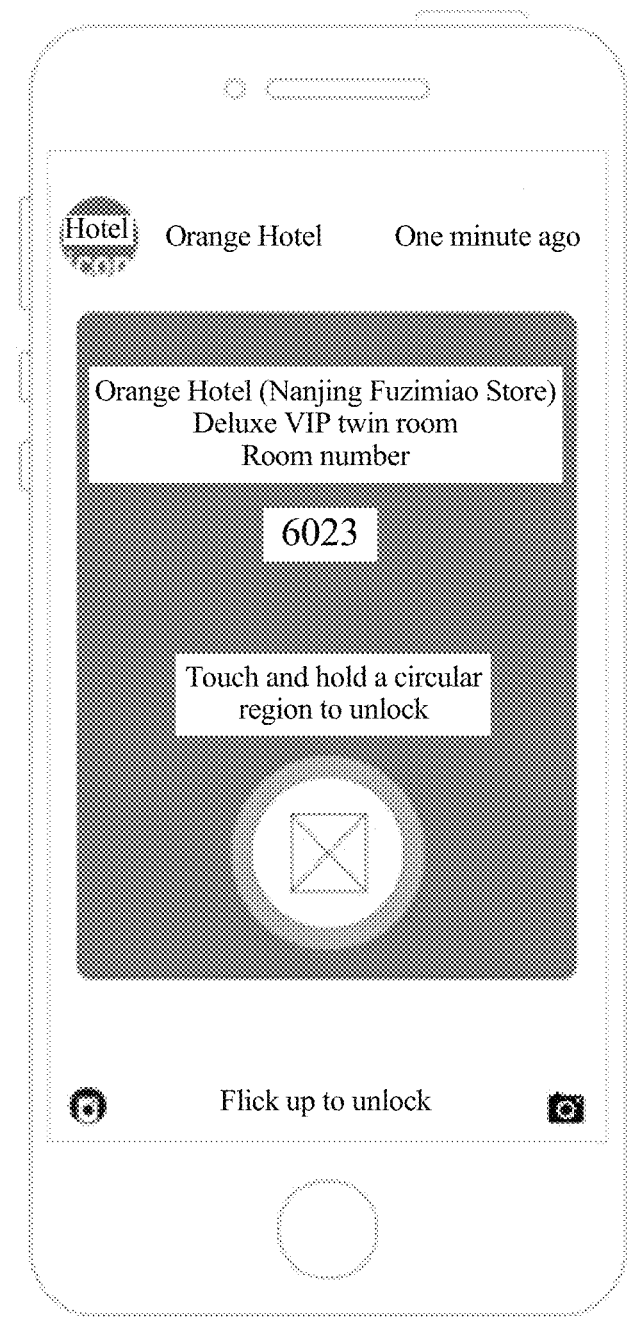
Figure 9C:
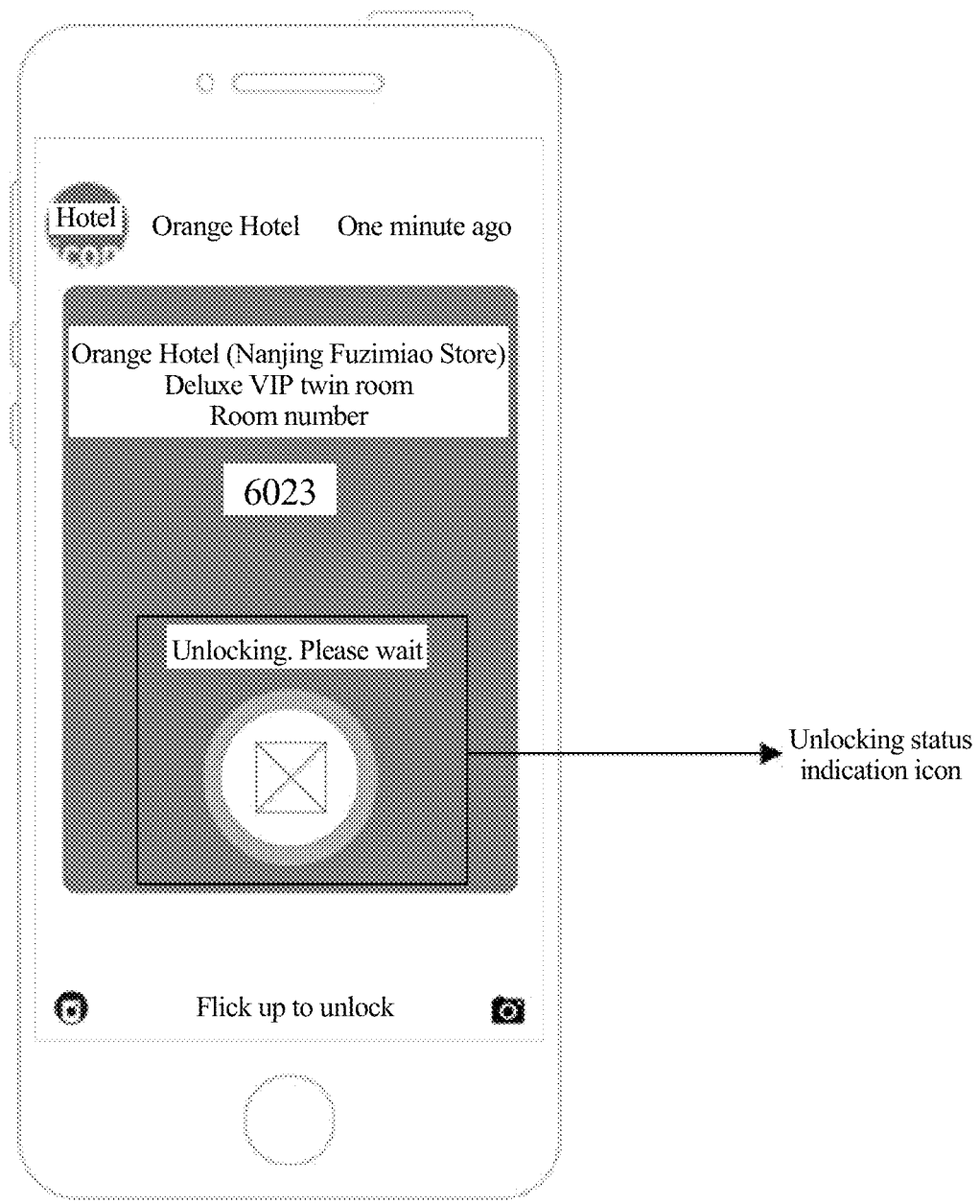
Figure 9D:
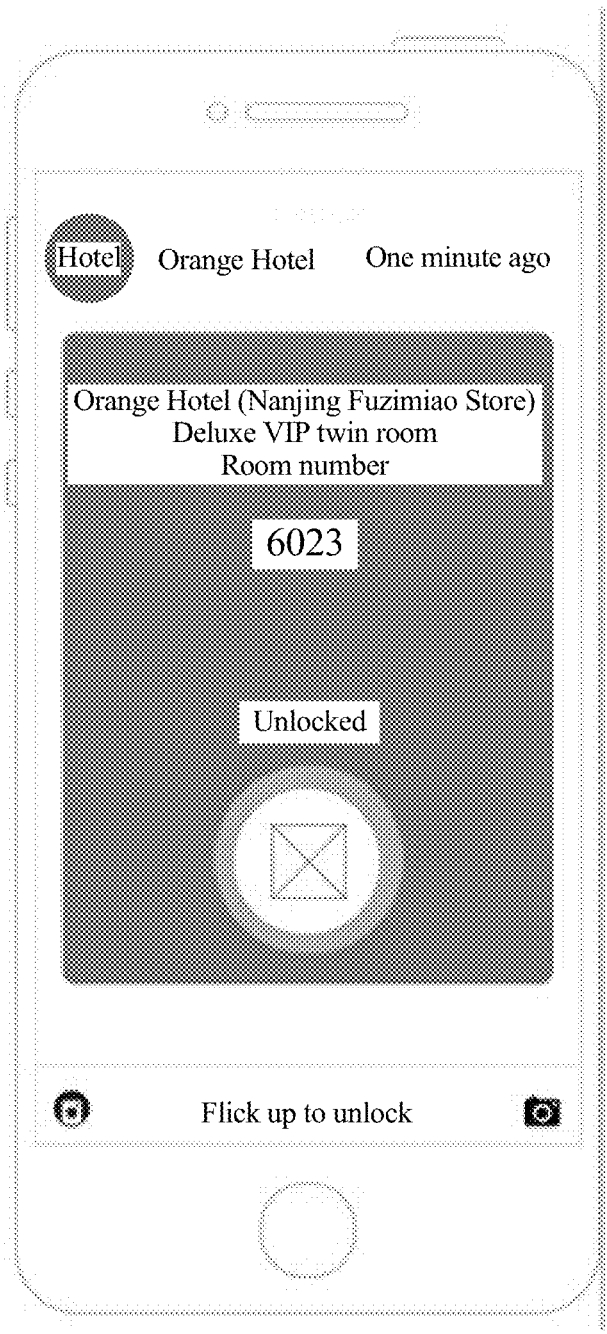
Figure 10A:
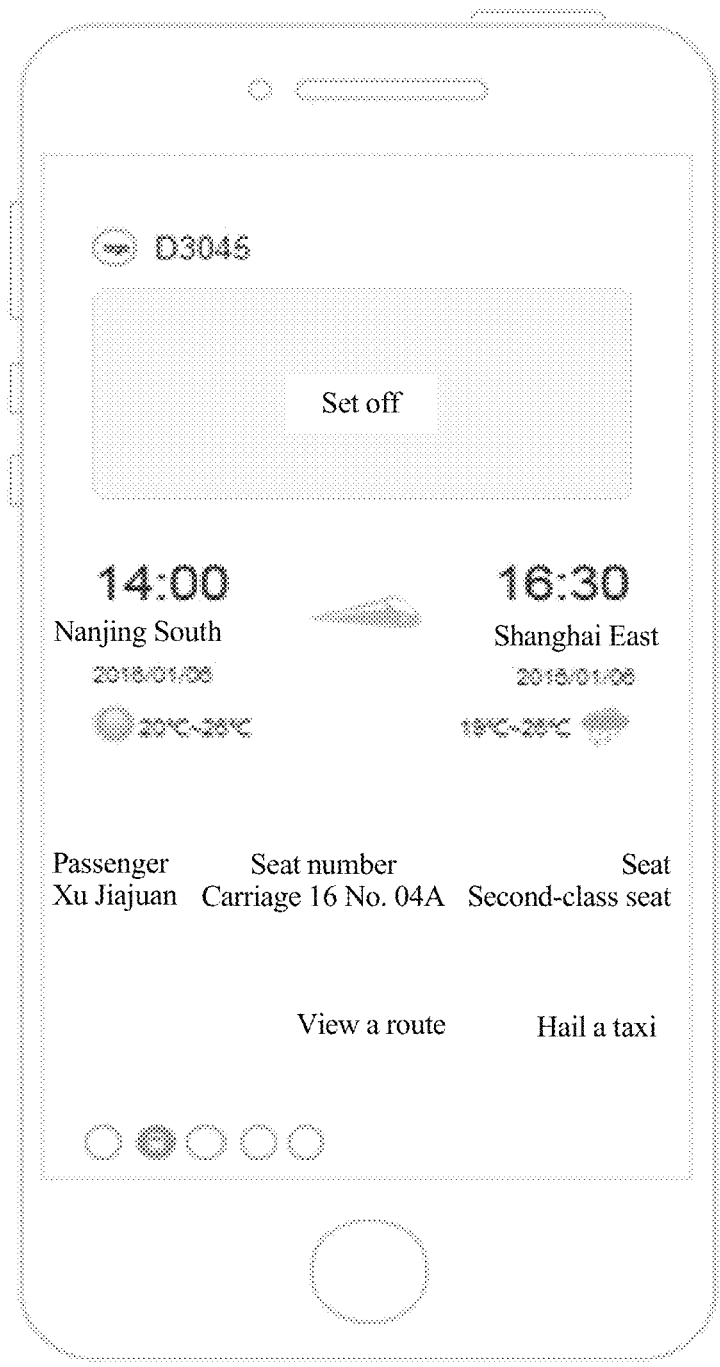
FIG. 10(a) to FIG. 10(e) are schematic diagrams of an interface for pushing a notification at each stage according to embodiments of some specific scenarios.
Figure 10B:
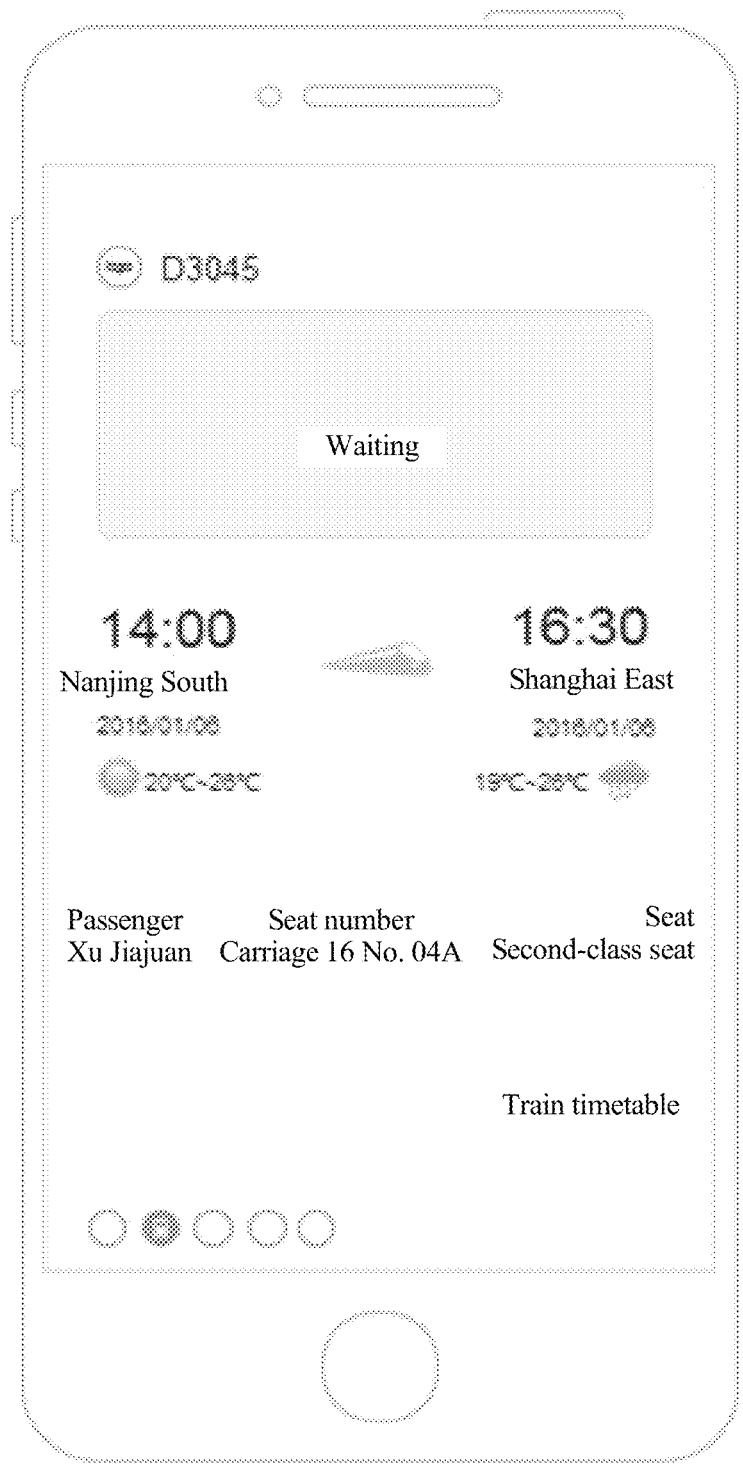
Figure 10C:
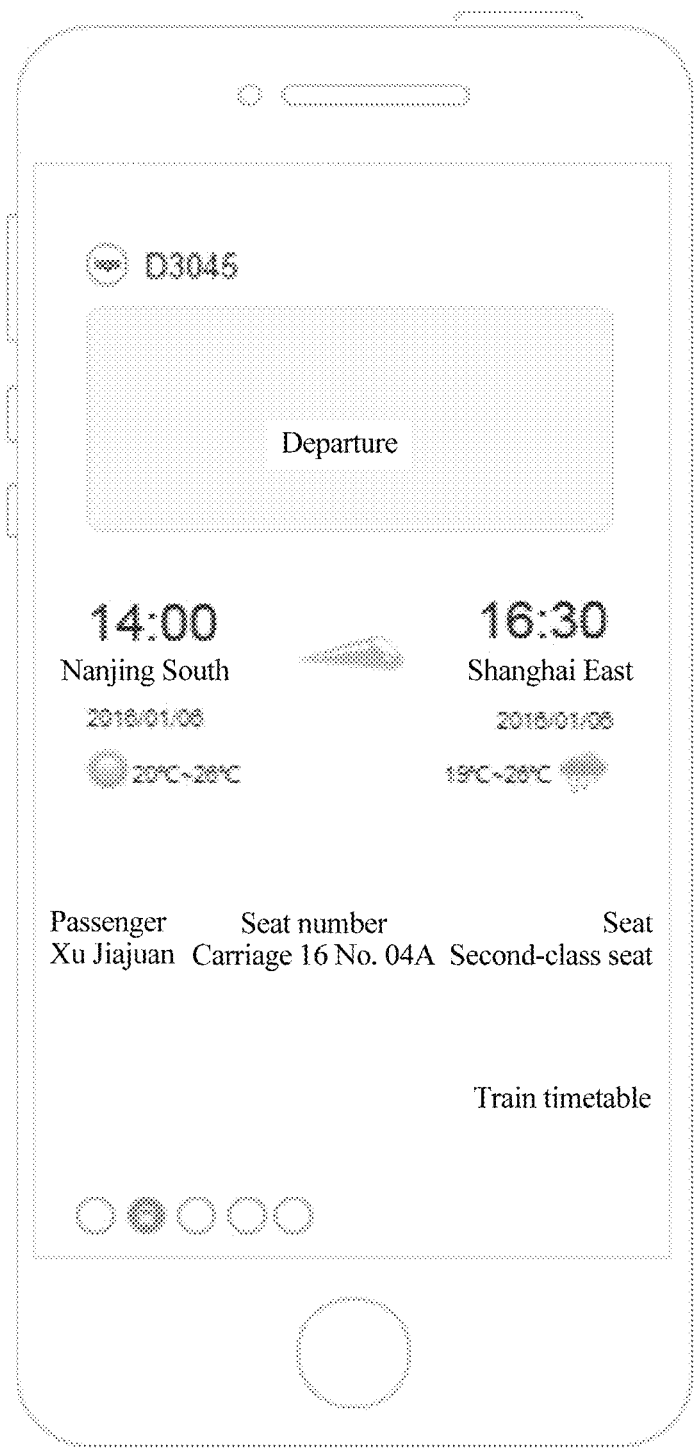
Figure 10D:
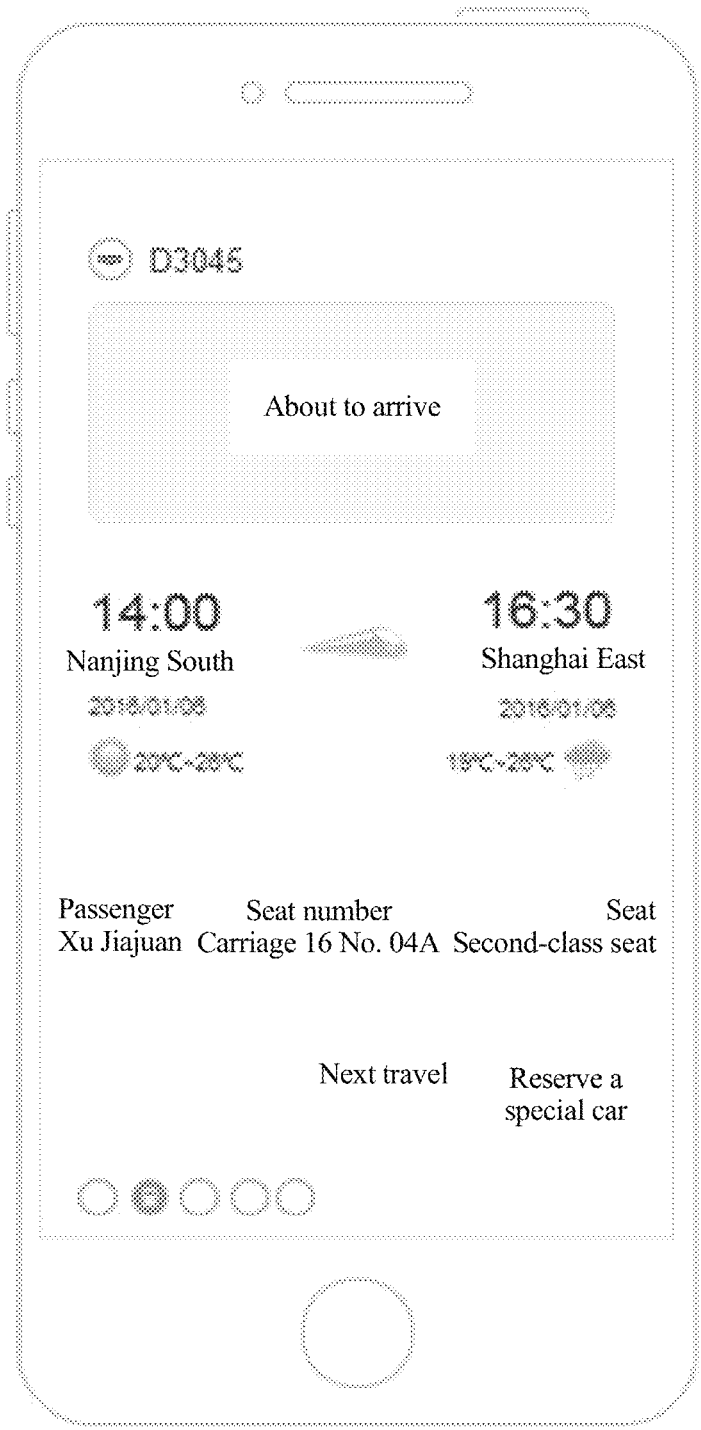
Figure 10E:
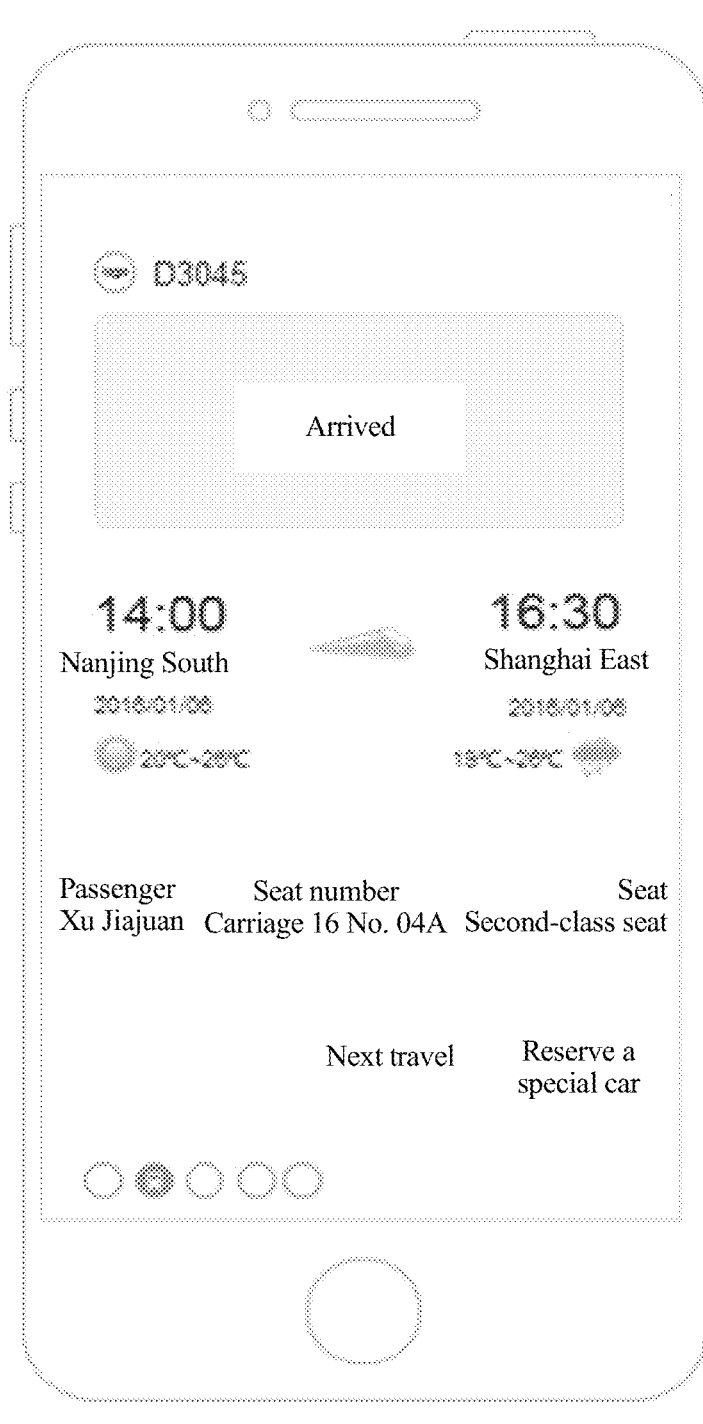

(1) Arrival reminder: As shown in FIG. 8(c), when a period of time that a current time is earlier than the departure time is less than or equal to an estimated travel time plus a security check time (for example, 40 minutes) plus a time and space advance (for example, in China, the advance is calculated as 30 minutes in Beijing, Shanghai, Guangdong, or Shenzhen, and 10 minutes in other cities), the decision engine module determines that a preset service notification condition is met, pushes a departure reminder to the display engine module, and recommends operation options such as a taxi hailing option (a taxi hailing operation is not displayed after the user falls within a 5 km range of the airport) and a check-in option in the action region. Because the event display page about the flight ticket event exists, the display engine module may directly modify the event display page, and update an updated event display page to the lock screen. If the mobile phone is currently in a screen locked state, step 312 is performed to display the notification on the lock screen in full screen in a form of notification details, as shown in FIG. 8(*c*), or display the notification in the notification classification display interface in a form of notification details, as shown in FIG. 8(*d*).

(2) Arrival reminder: As shown in FIG. 8(*e*), when the information engine module collects user location information by using the GPS, the operator network, Wi-Fi, and the like, and determines, based on the collected location information and flight ticket information, that a user location falls within a 5 km range of the departure airport and a current time is two hours earlier than the airplane departure time, the decision engine module determines that a preset service notification condition is met, pushes a boarding reminder to the display engine module, and provides an operation option for calling an air customer service executive in the action region. The mobile phone is currently in a screen locked state, and step 312 is performed to display the notification on the lock screen in full screen in a form of notification details, as shown in FIG. 8(*e*), or display the notification on the lock screen in a form of notification details, as shown in FIG. 8(*f*).

(3) Luggage storage reminder: As shown in FIG. 8(*g*), the information engine module receives a user location change event. The information engine module may obtain location information of the flight destination airport based on the collected flight ticket information. Based on user location information collected based on the user location, the decision engine module determines, based on the user location information and the information collected by the information engine module, that the user currently falls within a range of the destination airport (a 5 km range of the airport). The decision engine module determines that a preset service notification condition is met, and in this case, pushes luggage carousel information to the display engine module. The mobile phone is currently in a screen locked state, and step 312 is performed to display the notification on the lock screen in full screen in a form of notification details, as shown in FIG. 8(*g*), or display the notification on the lock screen or in the notification classification display interface in a form of notification details, as shown in FIG. 8(*h*).

(4) Notification cleaning: When the decision engine module determines, based on the location information of the destination airport that is collected by the information engine module and current user location information, that the user currently falls beyond the 5 km range of the destination airport, in step 303, the decision engine module determines that a preset service notification condition is met, and specifically, a notification cleaning condition is met in step 308, the decision engine module pushes a flight ticket reminder cleaning notification to the display engine module, and the display engine module cleans the flight ticket notification. In this case, the user is aware that the flight ticket reminder automatically disappears.

Persons skilled in the art should understand that specific descriptions of the time, the place, the distance, the push content, and the like in the foregoing embodiment are merely examples helping understanding, and are not limited.

FIG. 9(*a*) to FIG. 9(*d*) are schematic diagrams of an interface for pushing a notification at each stage according to an embodiment of a second specific scenario in the present disclosure. With reference to FIG. 6 and FIG. 7A and FIG. 7B, the following describes a notification push process by using an event of checking in at a hotel after a hotel room is successfully reserved as an example.

In step 301, an information engine module detects that a mobile phone receives a new message or a new email, and analyzes information in the new message or the new email, to determine that the information is service-type content and a service type is travel, and specifically, hotel. Alternatively, in step 301, an information engine module detects that a user has performed a reservation operation in a travel APP. In this case, the information engine module is triggered to collect information. The information engine module obtains, based on a collected hotel reservation SMS message notification and email notification, information about an event of hotel reservation by the user, and the like.

In step 302, the information engine module analyzes the event information: The information engine module determines hotel information, including a hotel name and location, a check-in time, a guest name, and the like, and transmits a result of analyzing the event information to a decision engine module for subsequent action decision.

In step 303, the decision engine module determines whether a preset service notification condition is met. The information engine module collects user location information by using the GPS, the operator network, Wi-Fi, and the like. The decision engine module determines, based on the information collected by the information engine module, that the user falls within a range (for example, a 1 km range) of a hotel, and determines that the preset service notification condition is met. In this case, the decision engine module pushes hotel reservation information to a display engine module. As shown in FIG. 9(*a*), the mobile terminal is currently in a screen locked state, and step 312 is performed to push notification details of the hotel information to the display engine module.

When an event display page about a hotel service exists on the mobile phone, the information engine module collects corresponding environment parameters "time" and "place" based on the service type of the event. The decision engine module performs determining based on the mobile phone location information collected by the information engine module by using the GPS, the operator network, and Wi-Fi, and the collected hotel information of the user. The following shows notification content in an interface at each reminder stage in an event development process.

(1) Unlocking stage: As shown in FIG. 9(*b*), when determining that the user currently checks in at the hotel (enters the hotel) on the day of check-in or enters the hotel from the outside within a check-in validity period (the user is getting closer to the hotel and enters the hotel), in step 303, the decision engine module determines that a preset service notification condition is met, and pushes hotel unlocking information to the display engine module.

In this case, the display engine module pushes a reminder to the user. If the mobile phone is currently in a screen locked state, step 312 is performed to display the reminder on a lock screen in a form of notification details. When the user touches and holds an unlocking status indication icon shown in FIG. 9(*c*), the interface feeds back "unlocking", as shown in the following diagram. When the unlocking is completed, the unlocking status display icon indicates a completed state, as shown in FIG. 9(*d*).

(2) Notification cleaning: When the decision engine module determines, based on information collected by the information engine module, that a current service status is "unlocked", in step 303, the decision engine module determines that a preset service notification condition is met, and specifically, determines that a notification cleaning condition is met in step 308. In this case, the decision engine module pushes a hotel reminder cleaning notification to the display engine module, and the display engine module cleans the hotel notification.

In addition, another scenario reminder may also be provided based on an actual scenario, and details are not described.

FIG. 10(*a*) to FIG. 10(*e*) are schematic diagrams of an interface for pushing a notification at each stage according to an embodiment of a third specific scenario in the present disclosure. With reference to FIG. 6 and FIG. 7A and FIG. 7B, the following describes a notification push process by using an event of taking a train after a train ticket is successfully reserved as an example.

In step 301, an information engine module detects that a mobile phone receives a new message and a new email, and analyzes information in the new message and the new email, to determine that the information is service-type content and a service type is ticket, and specifically, train ticket; and/or (b) the information engine module detects that a user has performed a reservation operation in a ticket APP (the information engine module collects a train ticket reservation SMS message reminder and email reminder, the user adds the reminder to a ticket center, where the ticket center is information about a program or a function in the program for managing various vouchers on a terminal, for example, a pocket function in a Wallet APP or a Dianping APP). In this case, the information engine module is triggered to collect time information.

In step 302, the information engine module analyzes the event information: A decision engine module determines, based on the collected information, ticket information, specifically including a train number, a departure city, an arrival city, a departure station, an arrival station, a train type, a seat number, a carriage number, a departure date, a train timetable, a passenger name, and the like, and transmits an analysis result to the decision engine module for subsequent action decision.

In step 303, the decision engine module determines whether a preset service notification condition is met. In step 303, the decision engine module sets a departure event reminder based on the service type, and after the information engine module receives the event reminder, the decision engine module determines that the user has currently bought a train ticket, and determines, based on a current time and a current user location (collected by the information engine module), that a condition that the user needs to set off to take a taxi (time advance=estimated travel time+security check time+ticket check time (40 minutes)+special advance (a: 30 minutes in Beijing, Shanghai, Guangdong, and Shenzhen; b: 10 minutes in other cities)) is met. In this case, the decision engine module pushes a departure reminder, including optional operations and information such as ticket information, weather, taxi hailing, and a route, to a display engine module.

The display engine module may push a notification in a notification classification display interface in a form of notification details, as shown in FIG. 10(*a*).

If a ticket service exists on the mobile phone, the information engine module collects corresponding environment parameters "time" and "place" based on the service type. The decision engine module performs decision based on collected information (user location information collected by the information engine module by using the GPS, the operator network, and Wi-Fi, and station location information collected by the information engine module). The following shows notification content in an interface at each reminder stage in an event development process.

(1) Waiting reminder: For example, if the user currently falls within a 2 km range of the train station, the user is reminded to wait for the train, and a train ticket reminder (including the ticket information) is updated to the display engine module, as shown in FIG. 10(*b*).

(2) Departure reminder: The decision engine module determines, based on the ticket information (including a departure time and the like) collected by the information engine module and a current time, that the train has departed. In this case, the decision engine module may push a train departure reminder to the display engine module, and the display engine module may display information, as shown in FIG. 10(*c*).

(3) About-to-arrive reminder: The decision engine module pushes, 15 minutes before the train arrives at the destination, an about-to-arrive reminder to the display engine module based on a current time, a current user location collected by the information engine module, and train timetable information. The display engine module may push the notification, as shown in FIG. 10(*d*).

(4) Arrival reminder: The decision engine module determines, based on the ticket information (the train timetable) and the user location information that are collected by the information engine module, that the train has currently arrived (the user falls within a 2 km range of the train). In this case, the display engine module updates the notification to an arrival reminder, and provides optional operations such as viewing a route and hailing a taxi. The display engine module pushes the notification, as shown in FIG. 10(*e*).

(5) Notification cleaning: When the decision engine module determines, based on time information or place information collected by the information engine module, that a preset service notification condition is met, for example, in step 308, a notification cleaning condition is met after the arrival reminder is existent for 20 minutes or the user has been away from the train station for 2 kilometers, the decision engine module pushes a ticket reminder cleaning notification to the display engine module, and the display engine module cleans the flight ticket notification. In this case, the user is aware that the ticket reminder automatically disappears.

In addition, another scenario reminder may also be provided based on an actual scenario, and details are not described.

Figure 11A:
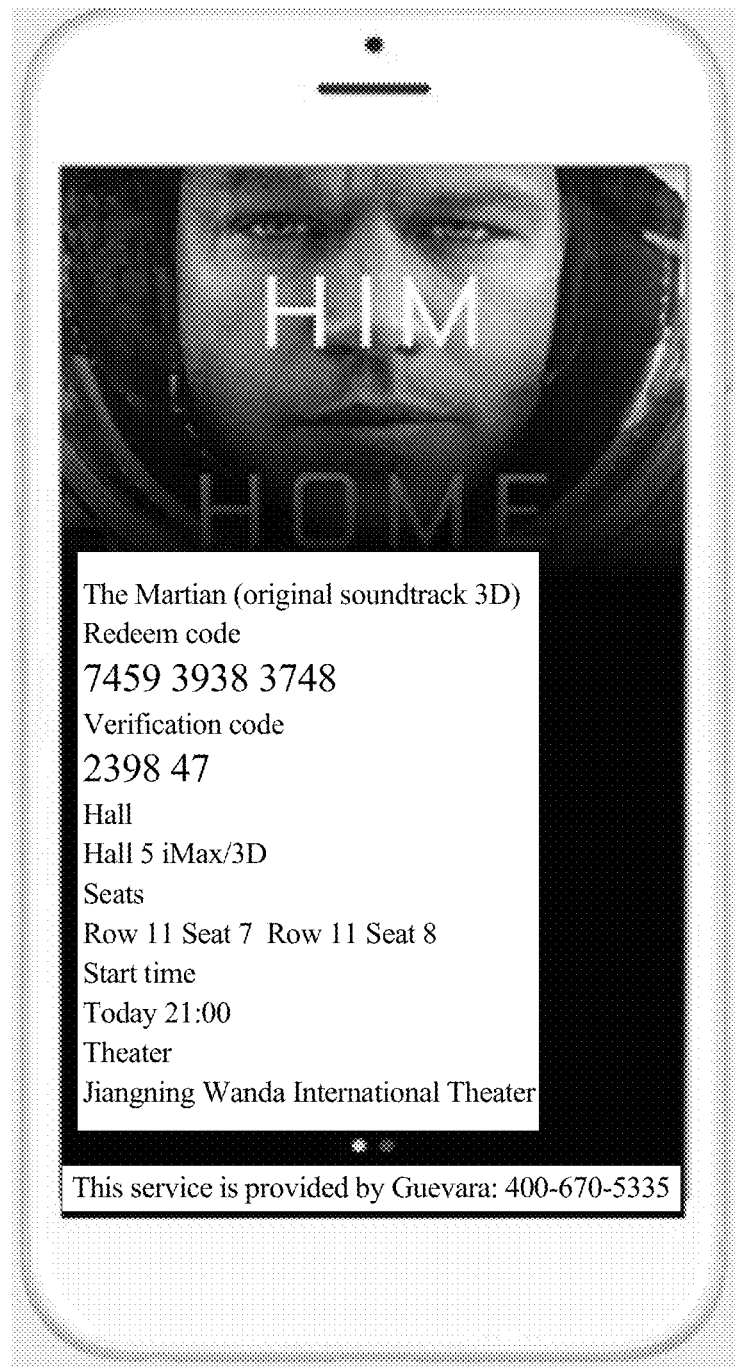
FIG. 11(a) and FIG. 11(b) are schematic diagrams of an interface for pushing a notification at each stage according to embodiments of some specific scenarios.
Figure 11B:
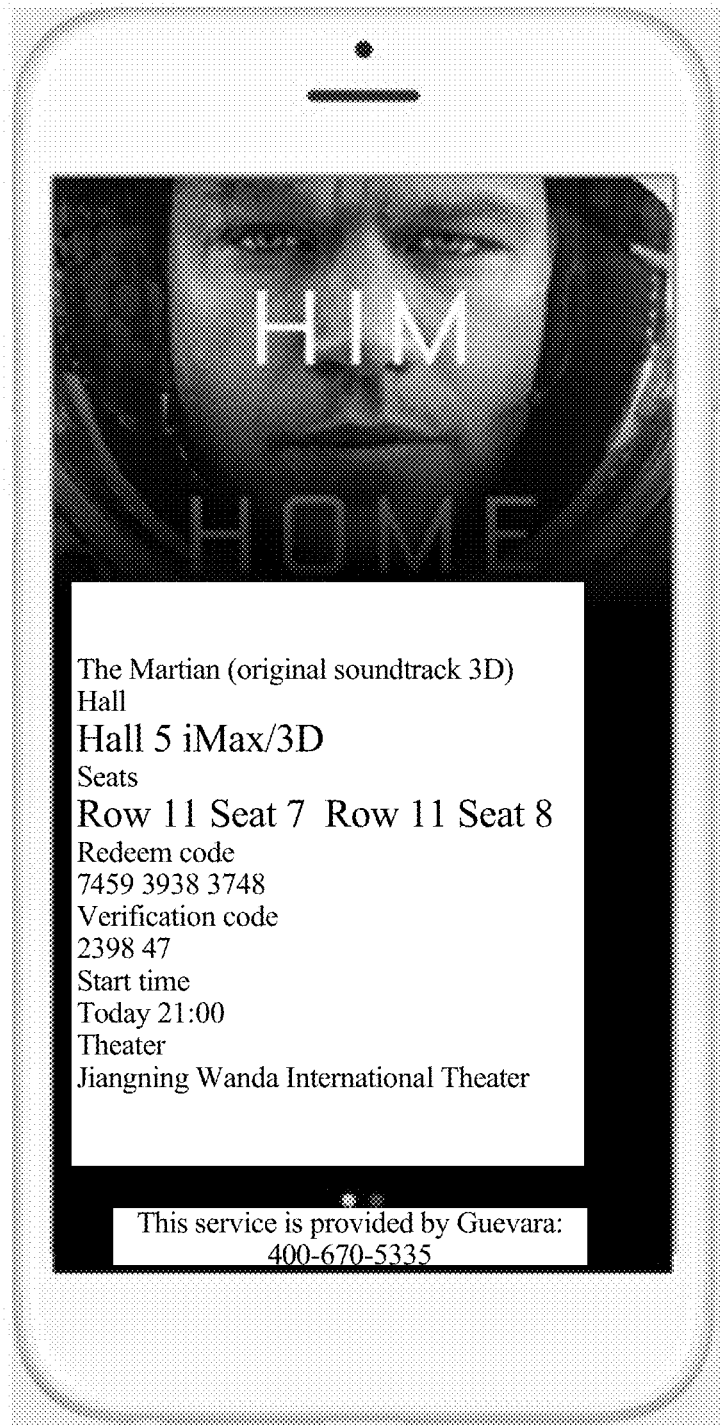
Figure 12A:
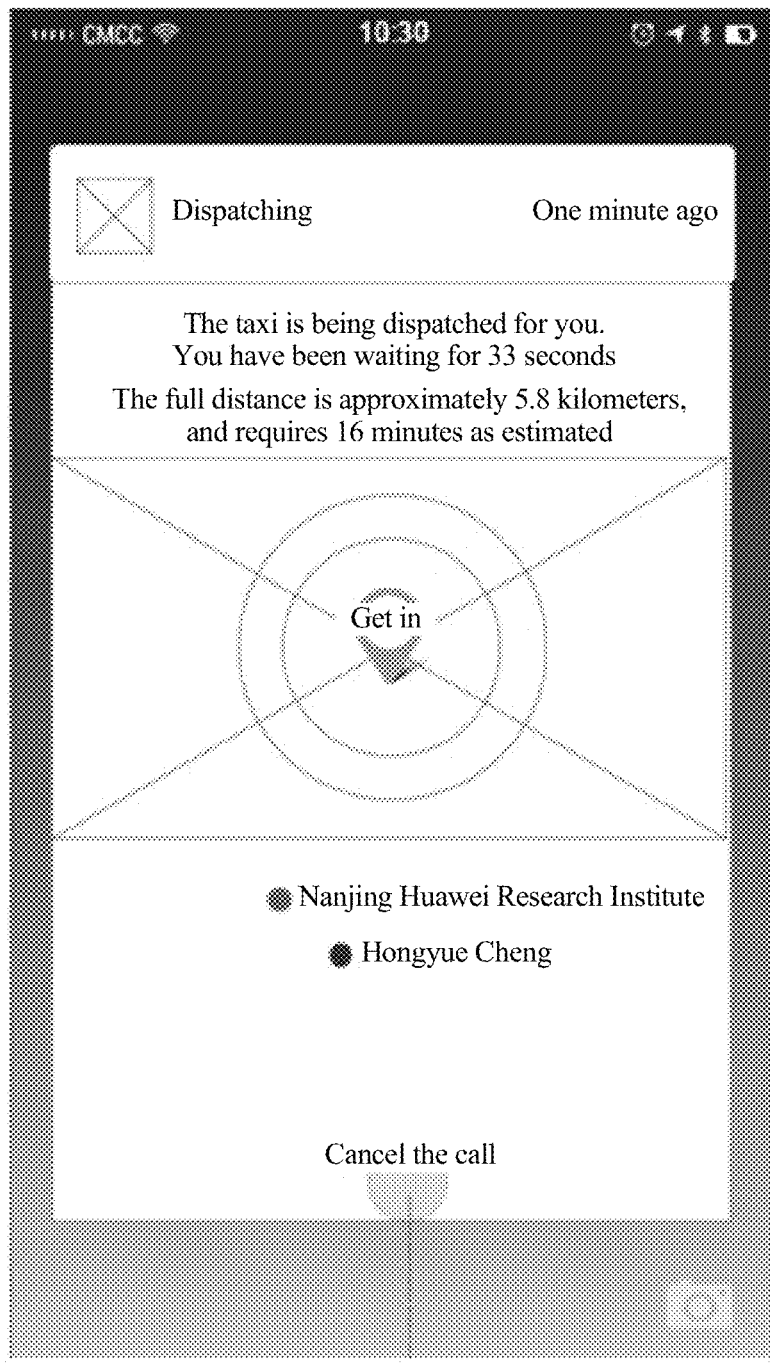
FIG. 12(a) to FIG. 12(e) are schematic diagrams of an interface for pushing a notification at each stage according to embodiments of some specific scenarios.
Figure 12B:
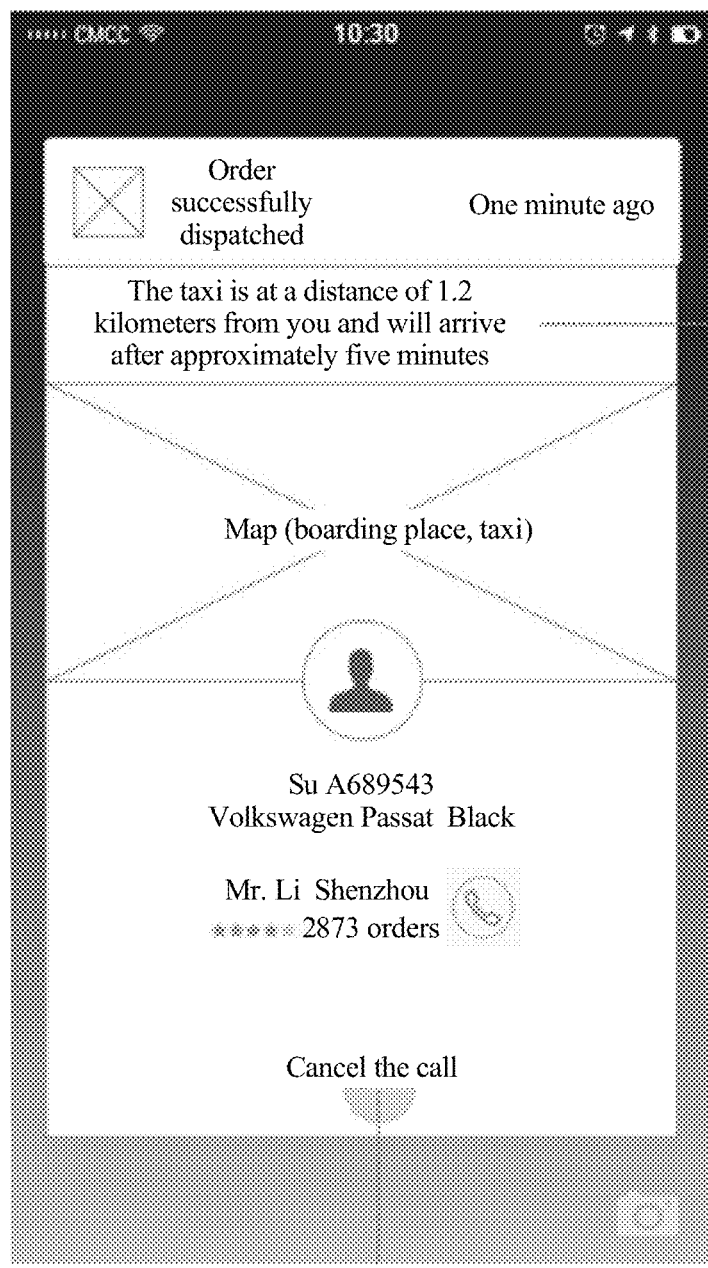
Figure 12C:
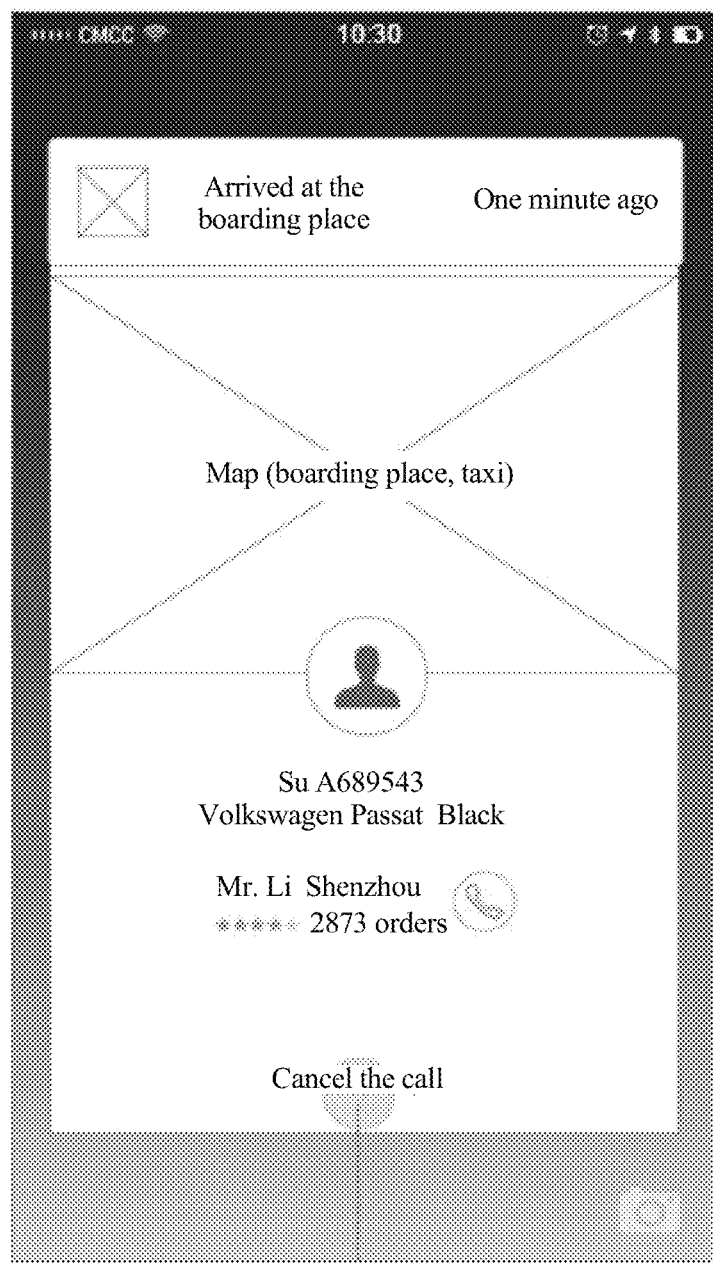
Figure 12D:
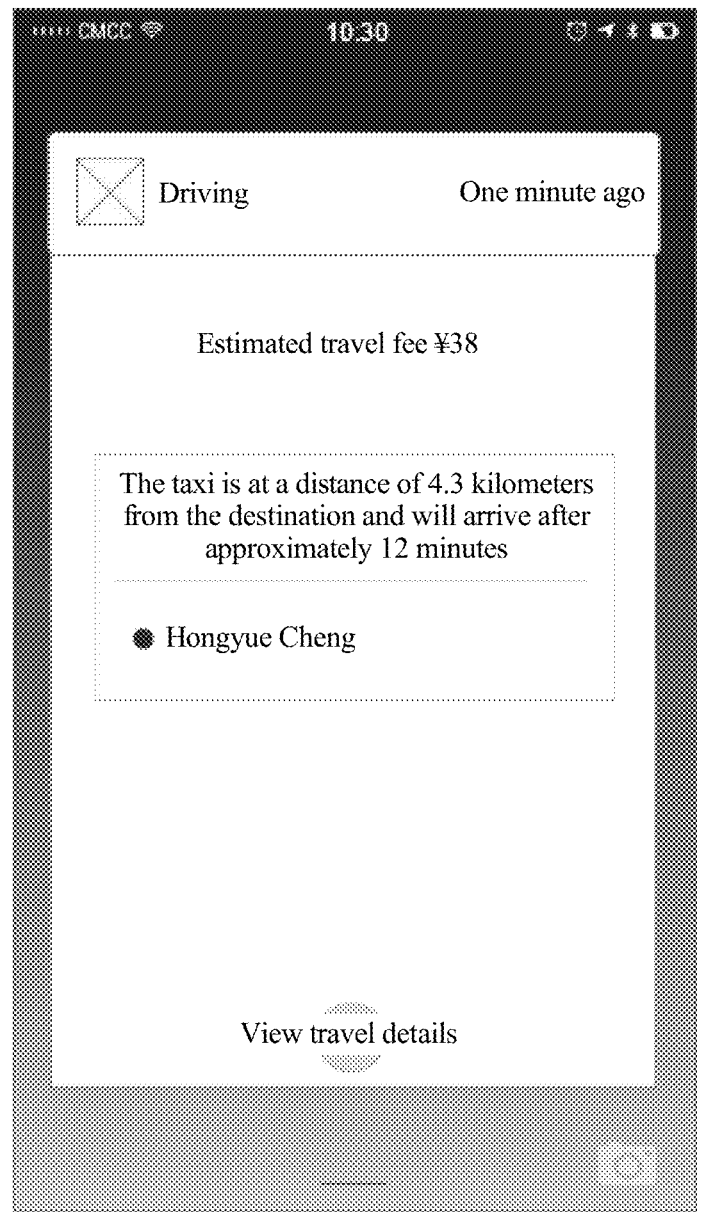
Figure 12E:

FIG. 11(*a*) and FIG. 11(*b*) are schematic diagrams of an interface for pushing a notification at each stage according to an embodiment of a fourth specific scenario in the present disclosure. With reference to FIG. 6 and FIG. 7A and FIG. 7B, the following describes a notification push process after a movie ticket is successfully reserved.

In step 301, an information engine module detects that a mobile phone receives a new message, and analyzes information in the new message, to determine that the information is service-type content and a service type is ticket, and specifically, movie ticket; and/or (b) the information engine module detects that a user has performed an operation such as purchasing in a ticket APP (specifically, a movie ticket), and the information engine module is triggered to collect event information.

In step 302, the information engine module analyzes an event: The information engine module determines ticket information based on content in the message, where in this embodiment, the ticket information includes a theater name, a movie title, a start time, a theater place, a hall number, a seat number, and the like, and transmits an analysis result to a decision engine module for subsequent action decision.

When a movie ticket service exists on the mobile phone, the information engine module collects corresponding environment parameters "time" and "place" based on the service type. When determining, based on the collected information, that the user arrives at a theater, the decision engine module determines that a preset service notification condition is met, and performs notification at each reminder stage in an event development process.

(1) Redemption reminder: A movie notification is pushed to a display engine module. In this embodiment, main content of notification details includes a redeem code, a verification code, and the like. In this case, the user can redeem the code for a movie ticket, as shown in FIG. 11(*a*).

(2) Seat guidance reminder: The decision engine module pushes a movie ticket notification update to the display engine module 10 minutes before the opening, to mainly indicate a hall and a seat, as shown in FIG. 11(*b*).

(3) Notification cleaning: When the decision engine module determines, based on information collected by the information engine module, that the user is seated, the decision engine module determines that a preset service notification condition is met, and specifically, a notification cleaning condition is met in step 308. In this case, the decision engine module pushes a reminder cleaning notification to the display engine module, and the display engine module cleans the notification. In this case, the user is aware that the notification disappears.

A corresponding reminder is also provided in another abnormal scenario, and details are not described herein.

FIG. 12(*a*) to FIG. 12(*e*) are schematic diagrams of an interface for pushing a notification at each stage according to an embodiment of a fifth specific scenario in the present disclosure. With reference to FIG. 6 and FIG. 7A and FIG. 7B, the following describes a notification push process by using a taxi hailing event as an example.

In step 301, a taxi hailing service exists on a mobile phone.

In step 302, an information engine module analyzes an event: The information engine module collects a user motion status and a current service status, and then transmits an analysis result to a decision engine module for subsequent action decision.

In step 303, the decision engine module determines whether a service notification update condition is met: The decision engine module determines that the user is currently hailing a taxi and is in an order dispatch state, and in this case, the service notification update condition is met, and a reminder is pushed to a display engine module.

In step 304, the display engine module displays the reminder to the user according to an interaction specification based on time details pushed by the decision system.

(1) Taxi dispatch reminder: The decision engine module determines, based on collected event information, that a service provider is dispatching an order, and in this case, a message indicating that an order is currently being dispatched is displayed in a notification interface, as shown in FIG. 12(*a*). An estimated wait event, a distance and a time, and a start place are displayed on an event display page, a place at which the user is to get in the taxi is displayed on a map in a display interface, and an action region for canceling the call is provided.

(2) Driver departure reminder: When determining, based on the collected event information, that the order is successfully dispatched, the decision engine module pushes a notification, as shown in FIG. 12(*b*). "Order successfully dispatched" and taxi dispatch information are displayed on the event display page, the boarding place of the user or a taxi location is displayed on the map in the display interface, and the action region for canceling the call is provided.

(3) Taxi arrival reminder: When determining, based on the collected event information, that the taxi has arrived at the boarding place, the decision engine module pushes a notification, as shown in FIG. 12(*c*). "Arrived at the boarding place" and the taxi dispatch information are displayed on the event display page, the boarding place of the user or the taxi location is displayed on the map in the display interface, and the action region for canceling the call is provided.

(4) Travel start reminder: After determining, based on the collected event information, that the user gets in the taxi, the decision engine module pushes a notification, as shown in FIG. 12(*d*). "Driving" is displayed on the event display page, an estimated travel time and travel fee are displayed, and the action region for viewing travel details is provided.

(5) Payment reminder: When determining, based on collected time information, that a destination is reached, the decision engine module pushes a notification, as shown in FIG. 12(*e*). On the event display page, a total fee for this travel is displayed on the event display page, and the user can tap "OK" in the action region to make a corresponding payment, or the payment is automatically performed in background. The reminder automatically disappears after being viewed by the user or automatically disappears after no operation is performed for a period of time.

A corresponding reminder is also provided in another abnormal scenario, and details are not described herein.

FIG. 13(*a*) to FIG. 13(*g*) are schematic diagrams of an interface for pushing a notification at each stage according to an embodiment of a sixth specific scenario in the present disclosure. With reference to FIG. 6 and FIG. 7A and FIG. 7B, the following describes a notification push process by using an express event as an example.

In step 301, an information engine module detects that a mobile phone receives a new message, and analyzes information in the new message, to determine that the information is service-type content and a service type is express, and/or the information engine module detects that a user has logistics related information in a shopping APP, and the information engine module is triggered to collect information.

In step 302, the information engine module analyzes an event: The information engine module determines information about an express service company and logistics status information, and transmits an analysis result to a decision engine module for subsequent action decision.

Figure 13A:
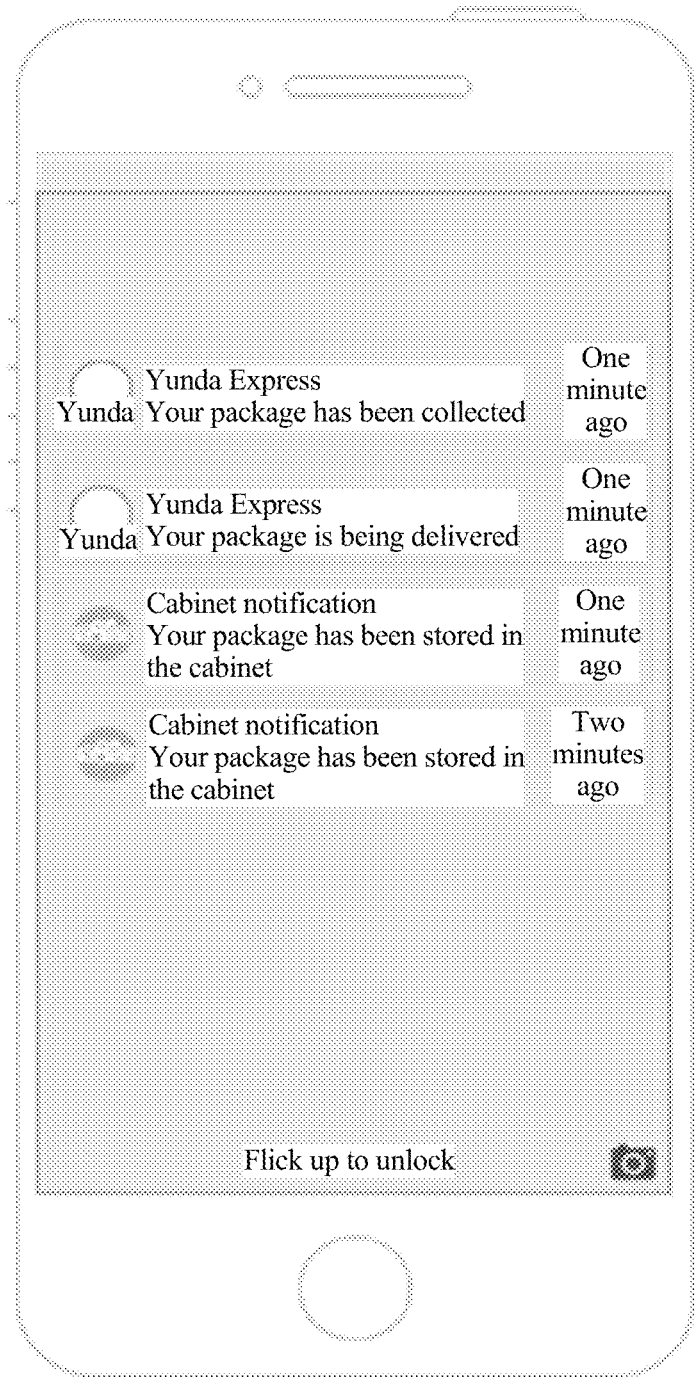
FIG. 13(a) to FIG. 13(g) are schematic diagrams of an interface for pushing a notification at each stage according to embodiments of some specific scenarios.
Figure 13B:
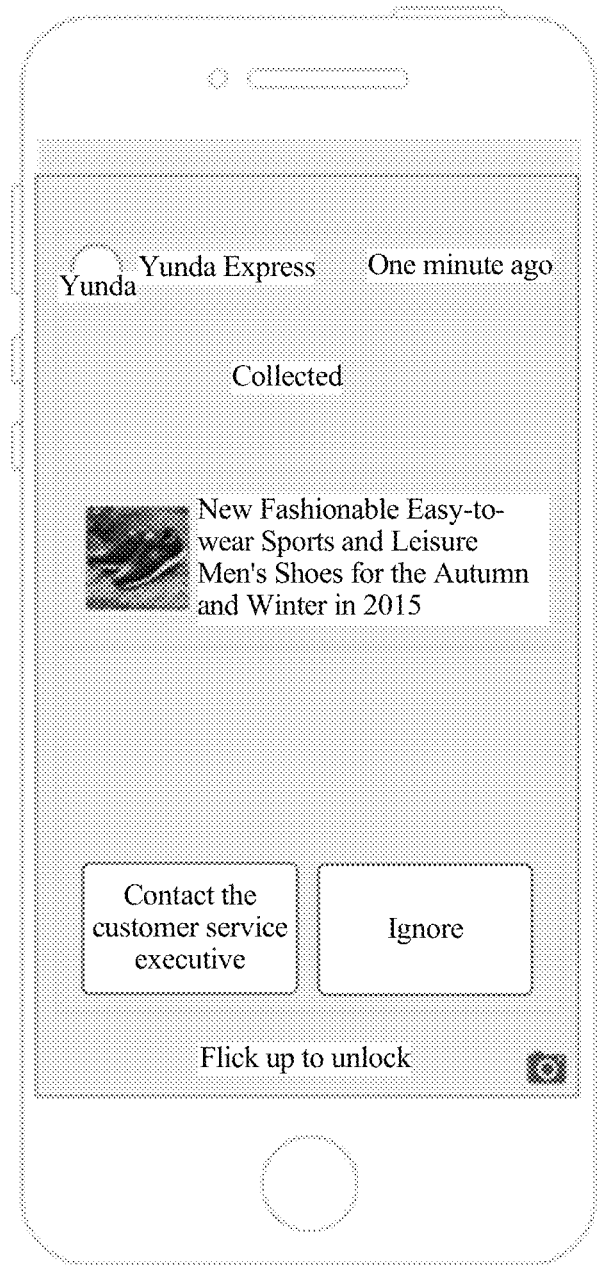
Figure 13C:
Figure 13D:
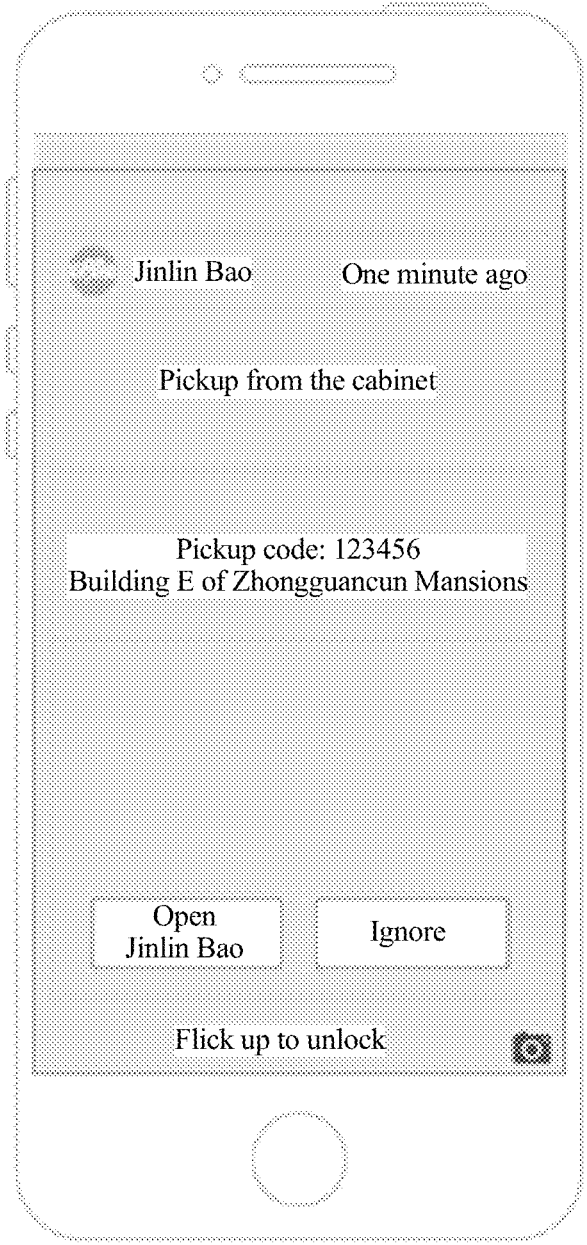
Figure 13E:
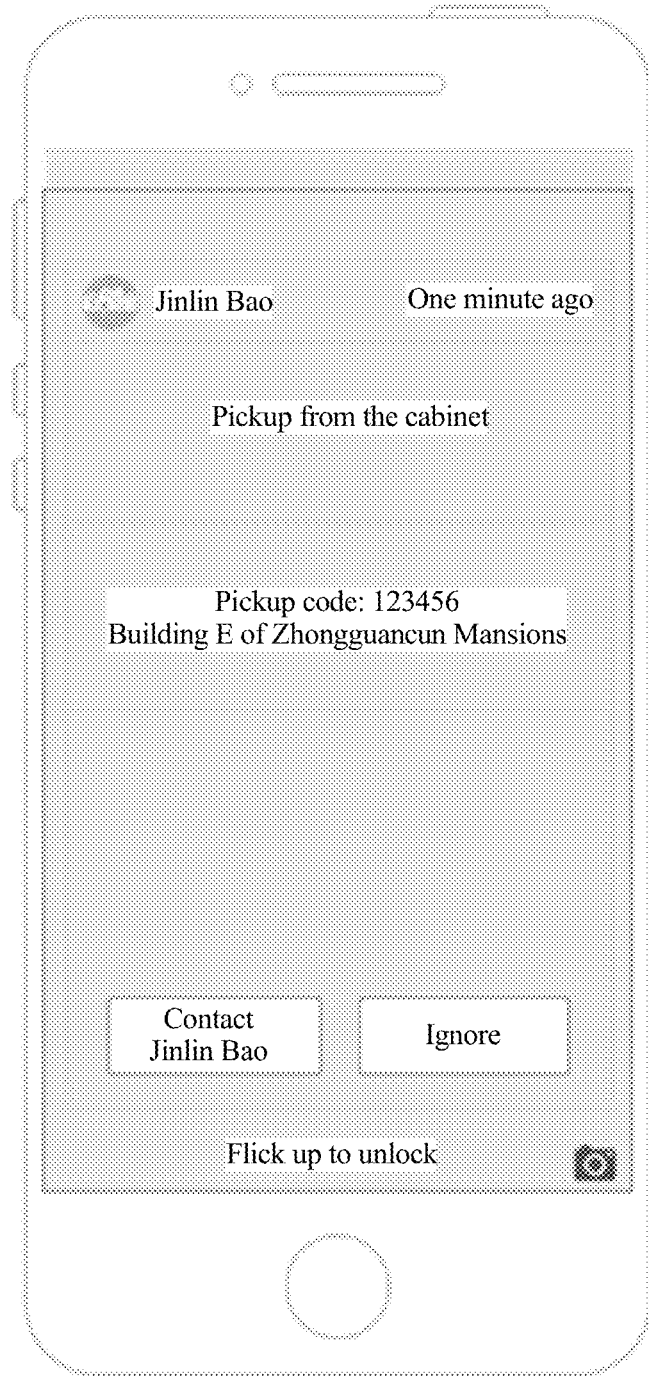
Figure 13F:
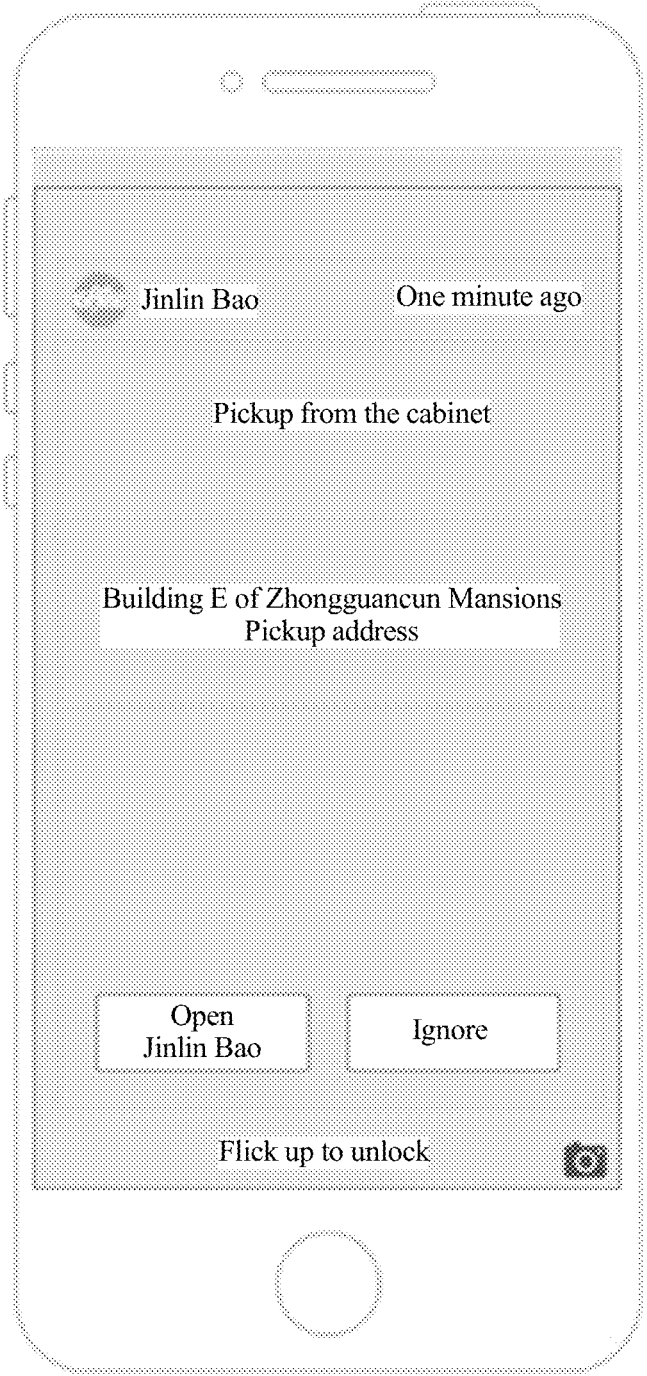
Figure 13G:
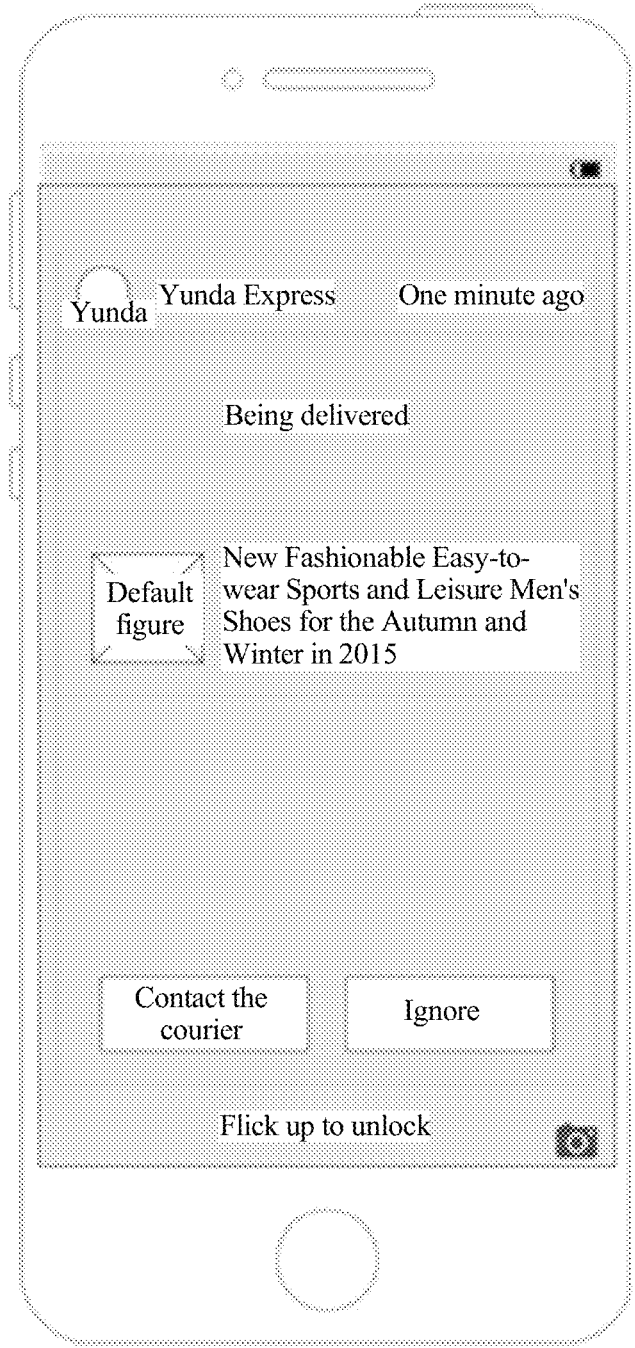

In step 303, the decision engine module determines whether a service notification update condition is met: When there is a change in logistics information, the decision engine module pushes a notification. As shown in FIG. 13(a), a plurality of notification SMS messages of express information are displayed in a form of a notification list. When the user taps each of the notifications, a corresponding event display page is displayed through jumping based on a collected express status, separately shown in FIG. 13(b), FIG. 13(c), FIG. 13d), FIG. 13(e), FIG. 13(f), and FIG. 13(g). Content displayed on the event display page includes information such as the express service company, an express progress, article delivery details, a pickup place, and a key. In addition, operable services, for example, contacting a customer service executive, ignoring a message, and contacting a courier, are provided in an action region.

A corresponding reminder is also provided in another abnormal scenario, and details are not described herein.

Figure 14A:
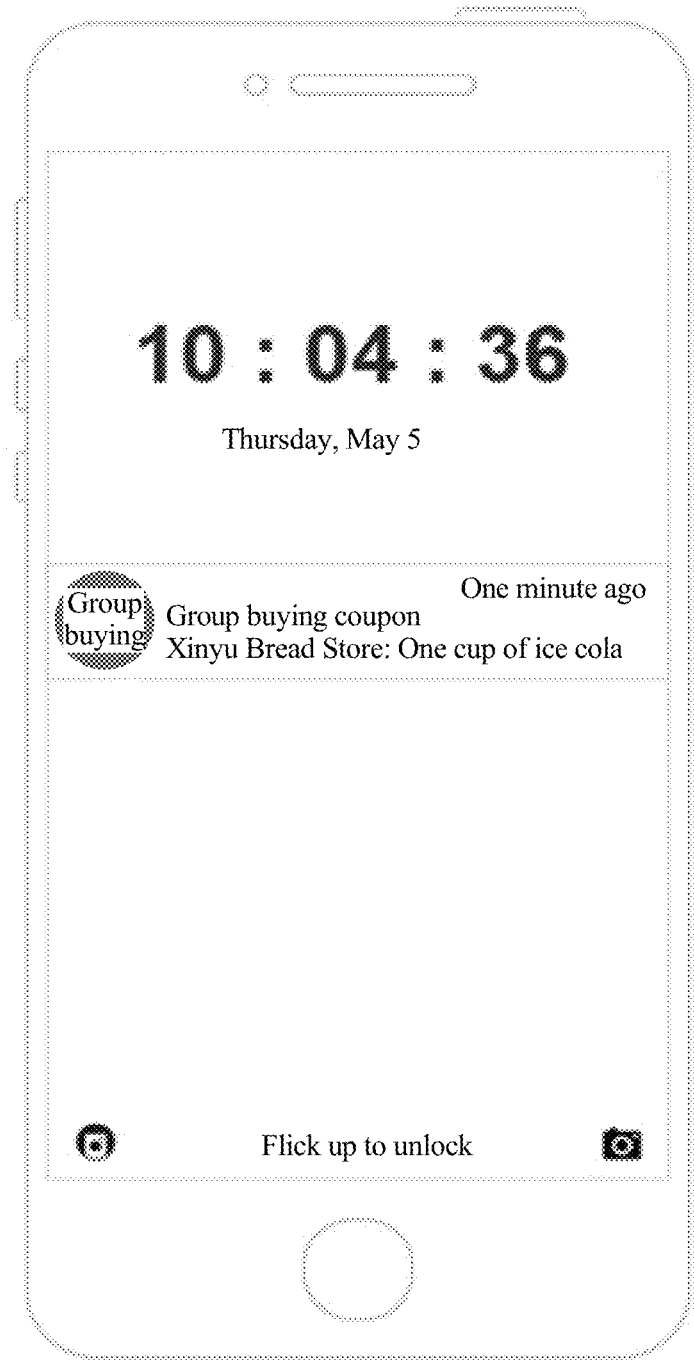
FIG. 14(a) and FIG. 14(b) are schematic diagrams of an interface for pushing a notification at each stage according to embodiments of some specific scenarios.
Figure 14B:

FIG. 14(a) and FIG. 14(b) are schematic diagrams of an interface for pushing a notification at each stage according to an embodiment of a seventh specific scenario in the present disclosure. With reference to FIG. 6 and FIG. 7A and FIG. 7B, the following describes a notification push process by using a group buying event as an example.

In step 301, an information engine module detects that a mobile phone receives a new message, and analyzes information in the new message, to determine that the information is service-type content and a service type is group buying, and/or the information engine module detects that a user has performed an operation such as purchasing in a group buying APP, and the information engine module is triggered to collect information.

In step 302, the information engine module analyzes an event: The information engine module determines group buying information based on content in the message, where in this embodiment, the group buying information includes a store name, a product name, a group buying validity period, store business hours, a store place, and the like, and transmits an analysis result to a decision engine module for subsequent action decision.

When a group buying service exists on a mobile phone, the information engine module collects corresponding environment parameters "time" and "place" based on the service type. When determining, based on the collected information, that the user arrives at a store, the decision engine module determines that a service notification update condition is met, and provides a notification at each stage.

(1) Redemption reminder: A grouping buying coupon notification is pushed to a display engine module, as shown in FIG. 14(a). In this embodiment, the user taps a notification list on a lock screen, to display an event display page. Main content of notification details on the event display page includes a redeem code and the like. In this case, the user can redeem the redeem code for consumption, as shown in FIG. 14(b).

Persons skilled in the art should understand that the foregoing descriptions of the specific scenarios are only examples intended to help understanding, but are not limited to the foregoing embodiments, and specific scenarios of subsequently occurring events that feature continuity in which a user needs to be notified, for example, bargains rush reminding, ticket reservation for a concert, and red envelope grabbing, can be incorporated herein by reference provided that they are applicable to the present disclosure.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

The invention claimed is:

1. A method for pushing a notification on a mobile terminal having a display, the method comprising:
    obtaining an express event corresponding to express information of a user;
    displaying first association information related to the express event in a first notification page in a notification interface of the display when the express event is in first express status, the first association information comprising first express status information corresponding to the first express status, and the first express status comprising at least one of the following: collected, being delivered or to be picked up; and
    displaying second association information related to the express event in a second notification page in a notification interface of the display when the express event is updated to a second express status after the first association information is displayed, wherein the second association information comprising second express status information corresponding to the second express status, and the second express status comprising at least one of the following: being delivered, to be picked up or signed;
    wherein when the first express status is collected, the second express status is one of being delivered, to be picked up or signed;
    when the first express status is being delivered, the second express status is to be picked up or signed; and
    when the first express status is to be picked up, the second express status is signed;
    wherein multiple notification pages are displayed in a notification interface on the display for displaying multiple to-be-notified events, and each of the multiple notification pages corresponds to an event type, and wherein the first notification page is one of the multiple notification pages, and the first notification page corresponds to an express event type.

2. The method according to claim 1, wherein the first association information and/or the second association information further comprises at least one of the following: express service company, delivery details, a pickup place, or a pickup code.

3. The method according to claim 1, wherein the second association information replaces the first association information, and the second association information is displayed in a region where the first association information was displayed.

4. The method according to claim 1, wherein the first notification page and/or the second notification page comprises at least one of the following: a title region, a primary information region, a secondary information region, or an action region.

5. The method according to claim 1, wherein the notification interface comprises an express notification classification identifier, wherein the express notification classification identifier is a notification list or a classification icon.

6. The method according to claim 5, further comprising: in response to an operation on the express notification classification identifier, displaying an express event display page corresponding to the express notification classification identifier.

7. The method according to claim 6, wherein the express event display page comprises at least one of the following: express service company, delivery details, a pickup place, or a pickup code.

8. The method according to claim 1, wherein the multiple notification pages comprise at least one notification classification identifier, and the operations further comprise:
in response to an operation on the notification classification identifier, displaying an event display page corresponding to the notification classification identifier, wherein the notification classification identifier is a notification list or a classification icon.

9. The method according to claim 1, wherein the method further comprises:
determining a notification cleaning condition based on the express event, wherein the notification cleaning condition comprises at least one of the following: a cleaning time condition, a cleaning place condition, a cleaning user behavior condition, or an express status; and
deleting the currently displayed first notification page or the currently displayed second notification page of the express event when the notification cleaning condition is met.

10. The method according to claim 1, wherein the event type is a type of services including at least one of the following: music, schedule, express, group buying, or ticket.

11. The method according to claim 1, wherein the notification interface is displayed on a lock screen and/or an unlock screen or an extended home screen panel to a left of a home screen of the mobile terminal.

12. A mobile terminal, comprising:
a display;
one or more processors; and
a memory configured to store a computer program, wherein
the one or more processors coupled to the memory are configured to execute the computer program to perform operations, the operations comprising:
obtaining an express event corresponding to express information of a user;
displaying first association information related to the express event in a first notification page in a notification interface of the display when the express event is in first express status, the first association information comprising first express status information corresponding to the first express status, and the first express status comprising at least one of the following: collected, being delivered or to be picked up; and
displaying second association information related to the express event in a second notification page in a notification interface of the display when the express event is updated to a second express status after the first association information is displayed, wherein the second association information comprising second express status information corresponding to the second express status, and the second express status comprising at least one of the following: being delivered, to be picked up or signed;
wherein when the first express status is collected, the second express status is one of being delivered, to be picked up or signed;
when the first express status is being delivered, the second express status is to be picked up or signed; and
when the first express status is to be picked up, the second express status is signed;
wherein multiple notification pages are displayed in a notification interface on the display for displaying multiple to-be-notified events, and each of the multiple notification pages corresponds to an event type, and wherein the first notification page is one of the multiple notification pages, and the first notification page corresponds to an express event type.

13. The mobile terminal according to claim 12, wherein the first association information and/or the second association information further comprises at least one of the following: express service company, delivery details, a pickup place, or a pickup code.

14. The mobile terminal according to claim 12, wherein the second Association information replaces the first association information, and the second association information is displayed in a region where the first association information was displayed.

15. The mobile terminal according to claim 12, wherein the first notification page and/or the second notification page comprises at least one of the following: a title region, a primary information region, a secondary information region, or an action region.

16. The mobile terminal according to claim 12, wherein the notification interface comprises an express notification classification identifier, wherein the express notification classification identifier is a notification list or a classification icon.

17. The mobile terminal according to claim 16, wherein the operations further comprise: in response to an operation on the express notification classification identifier, displaying an express event display page corresponding to the express notification classification identifier.

18. The mobile terminal according to claim 17, wherein the express event display page comprises at least one of the following: express service company, delivery details, a pickup place, or a pickup code.

19. The mobile terminal according to claim 12,
wherein the multiple notification pages comprise at least one notification classification identifier, and the operations further comprise:
in response to an operation on the notification classification identifier, displaying an event display page corresponding to the notification classification identifier, wherein the notification classification identifier is a notification list or a classification icon.

20. The mobile terminal according to claim 19, wherein the event display page comprises at least one of the following: a title region, a primary information region, a secondary information region, or an action region.

\* \* \* \* \*